United States Patent
Ong

(10) Patent No.: US 8,427,593 B2
(45) Date of Patent: Apr. 23, 2013

(54) MULTI-DOMAIN VERTICAL ALIGNMENT LIQUID CRYSTAL DISPLAYS USING PIXELS HAVING FRINGE FIELD AMPLIFYING REGIONS

(75) Inventor: Hiap L. Ong, Warren, NJ (US)

(73) Assignees: Hiap L. Ong (TW); Kyoritsu Optronics Co., Ltd. (TW)

( * ) Notice: Subject to any disclaimer, the term of this patent is extended or adjusted under 35 U.S.C. 154(b) by 623 days.

(21) Appl. No.: 12/573,087

(22) Filed: Oct. 2, 2009

(65) Prior Publication Data

US 2010/0157184 A1 Jun. 24, 2010

Related U.S. Application Data

(63) Continuation-in-part of application No. 12/018,675, filed on Jan. 23, 2008, now Pat. No. 8,018,537, and a continuation-in-part of application No. 11/751,454, filed on May 21, 2007, now Pat. No. 8,107,030.

(51) Int. Cl.
   *G02F 1/141* (2006.01)

(52) U.S. Cl.
   USPC .............................................. 349/37; 349/108

(58) Field of Classification Search .................. 349/48, 349/37, 33, 106, 41, 141, 108, 129, 130
   See application file for complete search history.

(56) References Cited

U.S. PATENT DOCUMENTS 7,663,708 B2 * 2/2010 Wang et al. .................... 349/37

* cited by examiner

*Primary Examiner* — Thoi Duong
(74) *Attorney, Agent, or Firm* — Silicon Valley Patent Group, LLP; Edward S. Mao

(57) ABSTRACT

A multi-domain vertical alignment liquid crystal display that does not require physical features on the substrate (such as protrusions and ITO slits) is disclosed. Each pixel of the MVA LCD is subdivided into color components, which are further divided into color dots. Each pixel also contains fringe field amplifying regions that separate the color dots of a pixel. The voltage polarity of the color dots and fringe field amplifying regions are arranged so that fringe fields in each color dot causes multiple liquid crystal domains in each color dot. Specifically, the color dots and fringe field amplifying regions of the display are arranged so that neighboring polarized elements have opposite polarities.

36 Claims, 53 Drawing Sheets

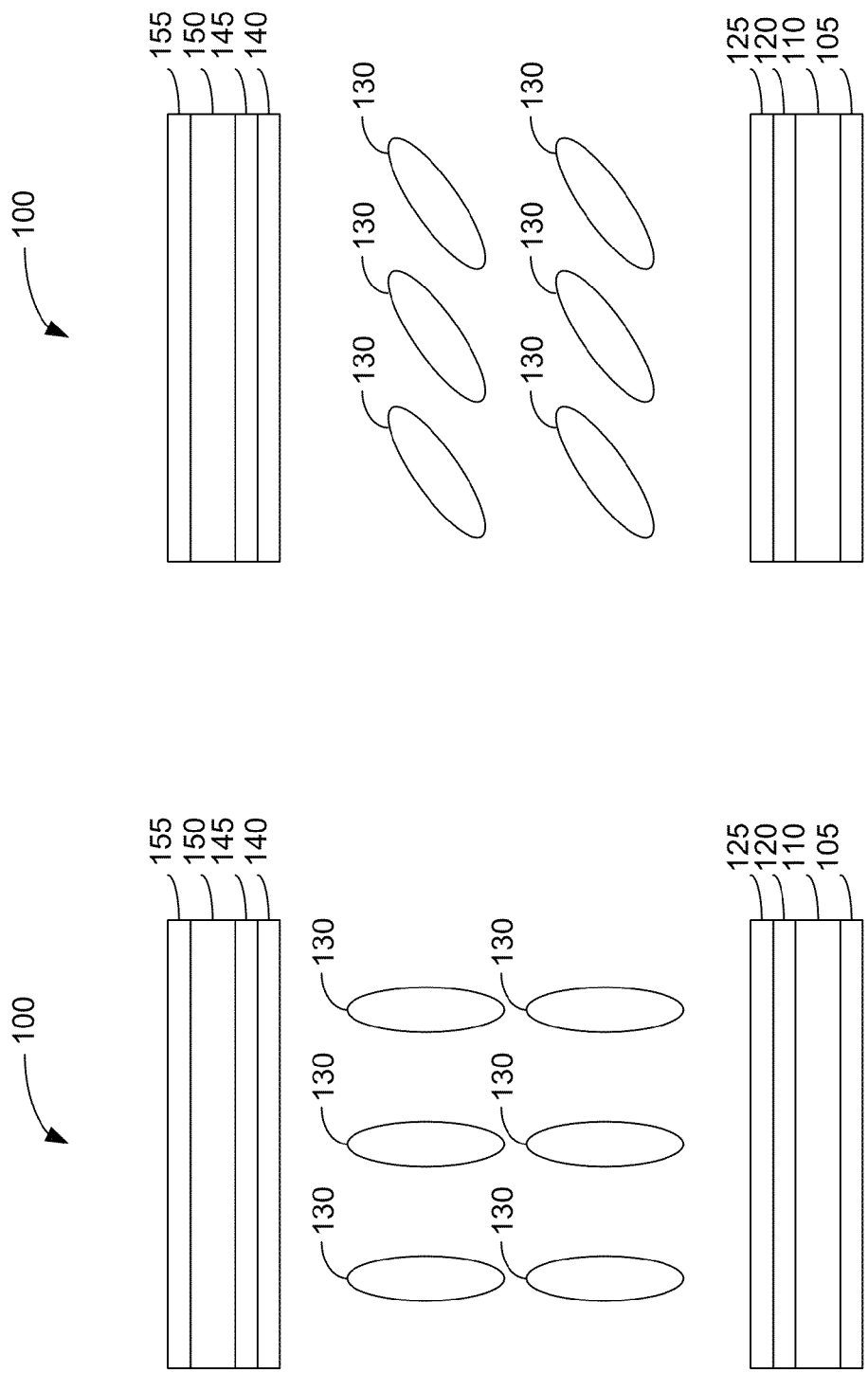

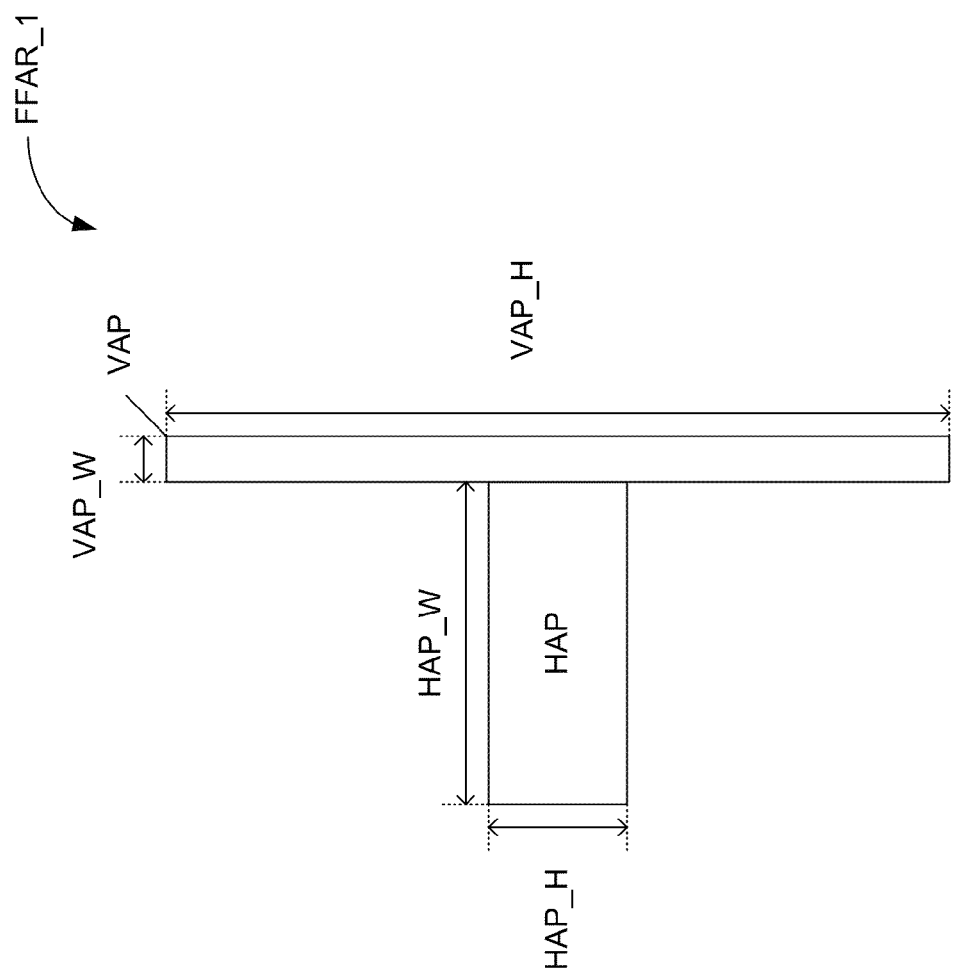

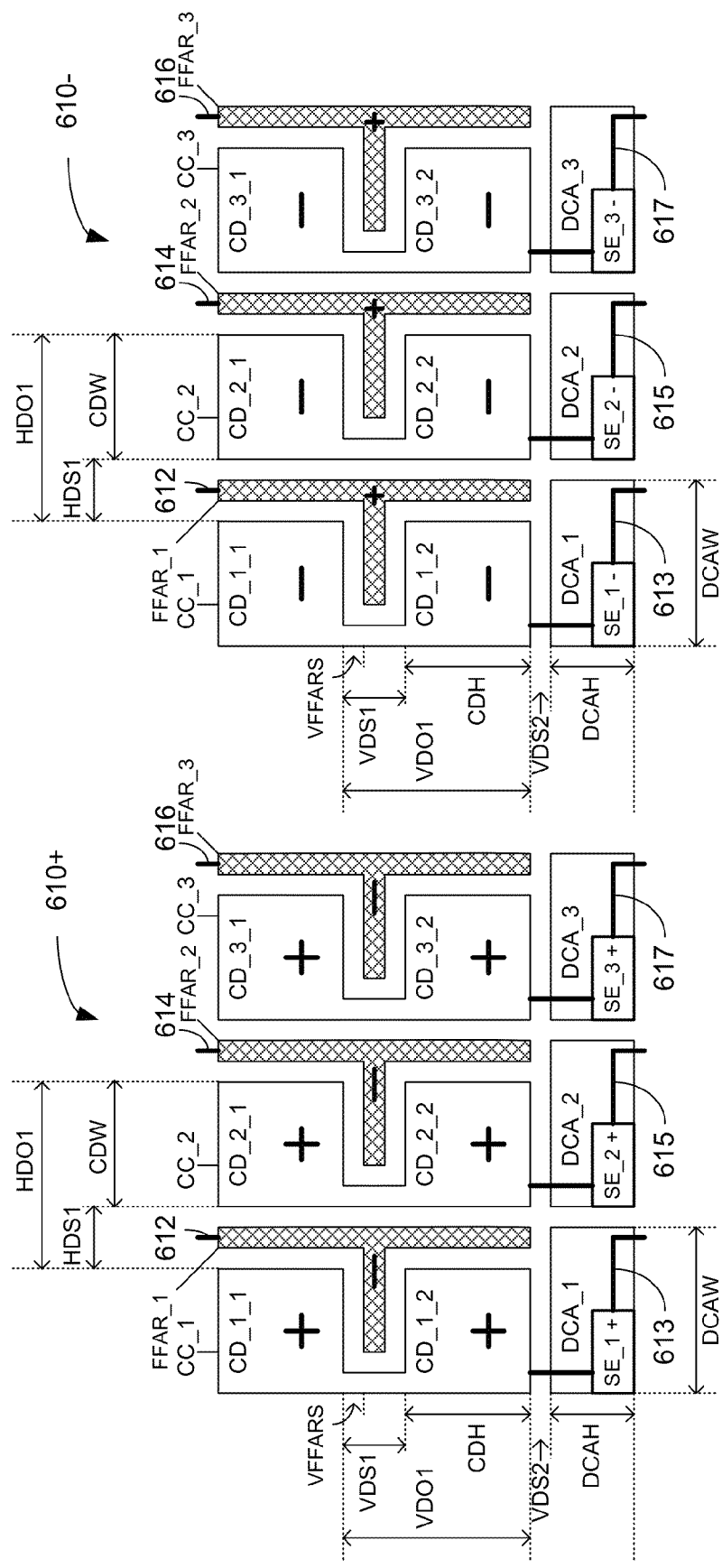

MULTI-DOMAIN VERTICAL ALIGNMENT LIQUID CRYSTAL DISPLAYS USING PIXELS HAVING FRINGE FIELD AMPLIFYING REGIONS

RELATED APPLICATIONS

The present application is a Continuation-In-Part of and claims the benefit of U.S. Utility patent application Ser. No. 12/018,675 (Publication Serial Number US 2008/0291348 A1), entitled "Pixels Having Polarity Extension Regions for Multi-Domain Vertical Alignment Liquid Crystal Displays" by Hiap L. Ong, filed Jan. 23, 2008, which is incorporated herein in its entirety by reference. U.S. Utility patent Ser. No. 12/018,675 is a Continuation-In-Part of and claims the benefit of U.S. Utility patent application Ser. No. 11/751,454 (Publication serial number US 2008/0002072 A1), entitled "Pixels Using Associated Dot Polarity for Multi-Domain Vertical Alignment Liquid Crystal Displays" by Hiap L. Ong, filed May 21, 2007.

The present application is also a Continuation-In-Part of and claims the benefit of U.S. Utility patent application Ser. No. 11/751,454 (Publication serial number US 2008/0002072 A1), entitled "Pixels Using Associated Dot Polarity for Multi-Domain Vertical Alignment Liquid Crystal Displays" by Hiap L. Ong, filed May 21, 2007, which is incorporated herein in its entirety by reference. U.S. Utility patent application Ser. No. 11/751,454 claimed the benefit of U.S. Provisional Patent Application Ser. No. 60/799,815, entitled "Multi-domain vertical alignment liquid crystal display with row inversion drive scheme", by Hiap L. Ong, filed on May 22, 2006; U.S. Provisional Patent Application Ser. No. 60/799,815, entitled "Multi-domain Vertical Alignment liquid crystal display with row inversion drive scheme", by Hiap L. Ong, filed May 22, 2006; and U.S. Provisional Patent Application Ser. No. 60/799,843, entitled "Method To Conversion of Row Inversion To Have Effective Pixel Inversion Drive Scheme", by Hiap L. Ong, filed May 22, 2006.

BACKGROUND OF THE INVENTION

1. Field of the Invention

The present invention relates to liquid crystal displays (LCDs). More specifically, the present invention relates large-pixel multi-domain vertical alignment LCDs, which can be manufactured with smooth substrates.

2. Discussion of Related Art

Liquid crystal displays (LCDs), which were first used for simple monochrome displays, such as calculators and digital watches, have become the dominant display technology. LCDs are used routinely in place of cathode ray tubes (CRTs) for both computer displays and television displays. Various drawbacks of LCDs have been overcome to improve the quality of LCDs. For example, active matrix displays, which have largely replaced passive matrix displays, reduce ghosting and improve resolution, color gradation, viewing angle, contrast ratios, and response time as compared to passive matrix displays.

However, the primary drawbacks of conventional twisted nematic LCDs are the very narrow viewing angle and low contrast ratio. Even the viewing angle of active matrixes is much smaller than the viewing angle for CRT. Specifically, while a viewer directly in front of an LCD receives a high quality image, other viewers to the side of the LCD would not receive a high quality image. Multi-domain vertical alignment liquid crystal displays (MVA LCDs) were developed to improve the viewing angle and contrast ratio of LCDs. FIGS. 1(a)-1(c) illustrate the basic functionality of a pixel of a vertical alignment LCD 100. For clarity, the LCD of FIG. 1 uses only a single domain. Furthermore, for clarity, the LCDs of FIGS. 1(a)-1(c) (and FIG. 2) described in terms of gray scale operation.

LCD 100 has a first polarizer 105, a first substrate 110, a first electrode 120, a first alignment layer 125, liquid crystals 130, a second alignment layer 140, a second electrode 145, a second substrate 150, and a second polarizer 155. Generally, first substrate 110 and second substrate 150 are made of a transparent glass. First electrode 120 and second electrode 145 are made of a transparent conductive material such as ITO (Indium Tin Oxide). First alignment layer 125 and second alignment layer 140, which are typically made of a polyimide (PI) layer, align liquid crystals 130 vertically in a resting state. In operation, a light source (not shown) sends light from beneath first polarizer 105, which is attached to first substrate 110. First polarizer 105 is generally polarized in a first direction and second polarizer 155, which is attached to second substrate 150, is polarized perpendicularly to first polarizer 105. Thus, light from the light source would not pass through both first polarizer 105 and second polarizer 155 unless the light polarization is rotated by 90 degrees between first polarizer 105 and second polarizer 155. For clarity, very few liquid crystals are shown. In actual displays, liquid crystals are rod like molecules, which are approximately 5 angstroms in diameter and 20-25 angstroms in length. Thus, there are over 12 million liquid crystal molecules in a pixel that is 120 μm width by 300 μm length by 3 μm height.

In FIG. 1(a), liquid crystals 130 are vertically aligned. In the vertical alignment, liquid crystals 130 would not rotate light polarization from the light source. Thus, light from the light source would not pass through LCD 100 and gives a completely optical black state and a very high contrast ratio for all color and all cell gap. Consequently MVA LCDs provide a big improvement on the contrast ratio over the conventional low contrast twisted nematic LCDs. However, as illustrated in FIG. 1(b), when an electric field is applied between first electrode 120 and second electrode 145, liquid crystals 130 reorientate to a tilted position. Liquid crystals in the tilted position rotate the polarization of the polarized light coming through first polarizer 105 by ninety degrees so that the light can then pass through second polarizer 155. The amount of tilting, which controls the amount of light passing through the LCD (i.e., brightness of the pixel), is proportional to the strength of the electric field. Generally, a single thin-film-transistor (TFT) is used for each pixel. However for color displays, a separate TFT is used for each color component (typically, Red, Green, and Blue)

However, the light passing through LCD 120 is not uniform to viewers at different viewing angles. As illustrated in FIG. 1(c), a viewer 172 that is left of center would see a bright pixel because the broad (light rotating) side of liquid crystals 130 face viewer 172. A viewer 174 that is centered on the pixel would see a gray pixel because the broad side of liquid crystals 130 is only partially facing viewer 174. A viewer 176 that is right of center would see a dark pixel because the broad side of liquid crystals 130 is barely facing viewer 176.

Multi-domain vertical alignment liquid crystal displays (MVA LCDs) were developed to improve the viewing angle problems of single-domain vertical alignment LCDs. FIG. 2 illustrates a pixel of a multi-domain vertical alignment liquid crystal display (MVA LCD) 200. MVA LCD 200 includes a first polarizer 205, a first substrate 210, a first electrode 220, a first alignment layer 225, liquid crystals 235, liquid crystals 237, protrusions 260s, a second alignment layer 240, a second electrode 245, a second substrate 250, and a second polarizer

255. Liquid crystals 235 form the first domain of the pixel and liquid crystals 237 form the second domain of the pixel. When an electric field is applied between first electrode 220 and second electrode 245, protrusions 260 cause liquid crystals 235 to tilt in a different direction than liquid crystals 237. Thus, a viewer 272 that is left of center would see the left domain (liquid crystals 235) as black and the right domain (liquid crystals 237) as white. A viewer 274 that is centered would see both domains as gray. A viewer 276 that is right of center would see the left domain as white and the right domain as black. However, because the individual pixels are small, all three viewers would perceive the pixel as being gray. As explained above, the amount of tilting of the liquid crystals is controlled by the strength of the electric field between electrodes 220 and 245. The level of grayness perceived by the viewer directly related to the amount of tilting of the liquid crystals. MVA LCDs can also be extended to use four domains so that the LC orientation in a pixel is divided into 4 major domains to provide wide symmetrical viewing angles both vertically and horizontally.

Thus, multi-domain vertical alignment liquid crystal displays, provide wide symmetrical viewing angles, however, the cost of manufacturing MVA LCDs are very high due to the difficulty of adding protrusions to the top and bottom substrates and the difficulty of properly aligning the protrusions on the top and bottom substrates. Specifically, a protrusion on the bottom substrate must be located at the center of two protrusions on the top substrate; any misalignment between the top and bottom substrates will reduce the product yield. Other techniques of using physical features to the substrates, such as ITO slits, which have been used in place of or in combination with the protrusions, are also very expensive to manufacture. Furthermore, the protrusions and ITO slits inhibit light transmission and thus reduce the brightness of the MVA LCDs. Hence, there is a need for a method or system that can provide multi-domain vertical alignment liquid crystal displays, without the need for difficult to manufacture physical features such as protrusions and ITO-slits, and without the need to have ultra precise alignment of the top and bottom substrates.

SUMMARY

Accordingly, the present invention provides an Amplified Intrinsic Fringe Field MVA LCD (AIFF MVA LCD) that does not require protrusions or ITO slits. Thus manufacturing of AIFF MVA LCDs in accordance with the present invention is less expensive than conventional MVA LCDs. Specifically, embodiments of the present invention use novel pixel designs that provide amplified intrinsic fringe fields to create the multiple domains in the AIFF MVA LCD. For example, in accordance with one embodiment of the present invention, pixels are sub-divided into color components having multiple color dots (CDs). In addition the pixels contain fringe field amplifying regions that extend along a first side and a second side of a color dot. The fringe field amplifying regions are configured to have a first polarity when the color dot has a second polarity to amplify the fringe fields of the color dot.

In some embodiments of the present invention a display includes a first pixel and a second pixel. The first pixel includes a first first-pixel color component, a first first-pixel fringe field amplifying region, and a first first-pixel switching element. Similarly the second pixel has a first second-pixel color component, a first second-pixel fringe field amplifying region, and a first second-pixel switching element. The first first-pixel color component includes a first first-pixel-first-component color dot. The first first-pixel fringe field amplifying region extends along a first side of the first first-pixel-first-component color dot and a second side of the first first-pixel-first-component color dot. The first first-first-pixel switching element is coupled to the first first-pixel color component.

In one embodiment of the present invention, the display includes a first fringe field amplifying region switching element that is coupled to the first first-pixel fringe field amplifying region and the first second-pixel fringe field amplifying region. In this embodiment, the first first-pixel switching element and the first-second pixel switching element are configured to have a first polarity when the first fringe field amplifying region switching element is configured to have a second polarity.

The present invention will be more fully understood in view of the following description and drawings.

BRIEF DESCRIPTION OF THE DRAWINGS

FIG. 4(*c*) is an enlarged view of a fringe field amplifying region in accordance with one embodiment of the present invention.

FIG. 4(*d*) illustrates a portion of a liquid crystal display in accordance with one embodiment of the present invention.

FIG. 4(*e*) illustrates the source lines and gate lines of a liquid crystal display in accordance with one embodiment of the present invention.

FIGS. 4(*f*) and 4(*g*) illustrate a pixel design in accordance with one embodiment of the present invention.

FIG. 4(*h*) illustrates a portion of a liquid crystal display in accordance with one embodiment of the present invention.

FIG. 4(*i*) illustrates a pixel design in accordance with one embodiment of the present invention.

FIG. 4(*j*) illustrates a pixel design in accordance with one embodiment of the present invention.

FIGS. 4(*k*), 4(*l*), and 4(*m*) illustrate portions of a liquid crystal display in accordance with one embodiment of the present invention.

FIG. 4(*n*) illustrates a pixel design in accordance with one embodiment of the present invention.

FIG. 4(*o*) illustrates a pixel design in accordance with one embodiment of the present invention.

FIG. 4(*p*) illustrates a pixel design in accordance with one embodiment of the present invention.

FIGS. 4(*q*), 4(*r*), and 4(*s*) illustrate portions of a liquid crystal display in accordance with one embodiment of the present invention.

FIG. 5(*c*) illustrates a portion of a liquid crystal display in accordance with one embodiment of the present invention.

FIG. 6(*c*) illustrates a portion of a liquid crystal display in accordance with one embodiment of the present invention.

DETAILED DESCRIPTION

As explained above, conventional MVA LCDs are very expensive to manufacture due to the use of physical features, such as protrusions or ITO slits, for creating the multiple domains of each pixel. However, MVA LCDs in accordance with the principles of the present invention use fringe fields to create multiple-domains and do not require the use of physical features (such as protrusions or ITO slits) on the substrate. Furthermore, without the requirement of physical features the difficulty of aligning the physical features of the top and bottom substrate is also eliminated. Thus, MVA LCDs in accordance with the present invention are higher yield and less expensive to manufacture than conventional MVA LCDs.

Figure 1C:
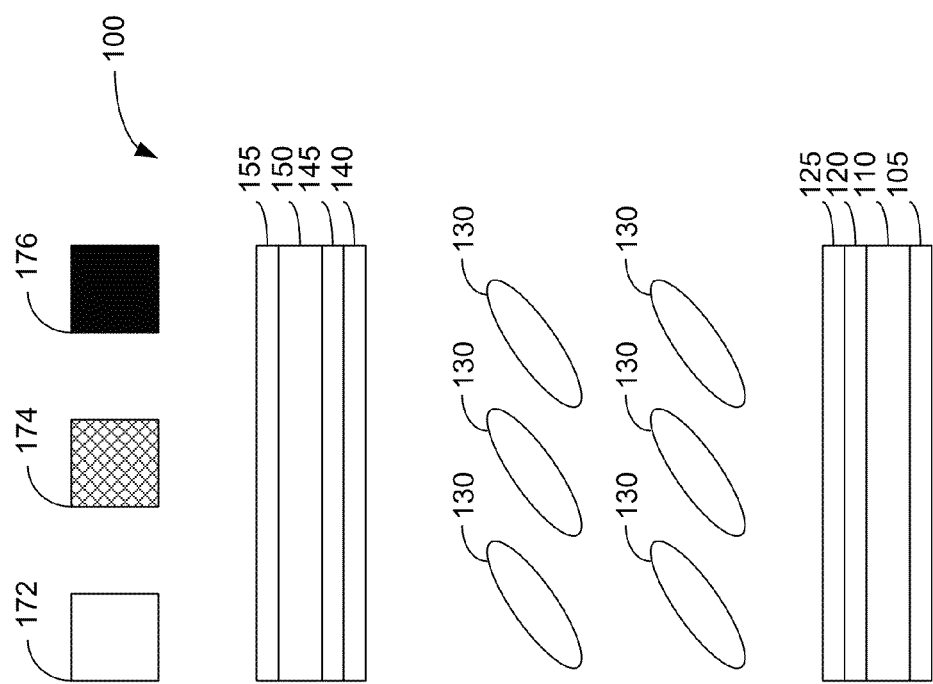
FIGS. 1(*a*)-1(*c*) are three illustrations of a pixel of a conventional single domain vertical alignment LCD.
Figure 2:
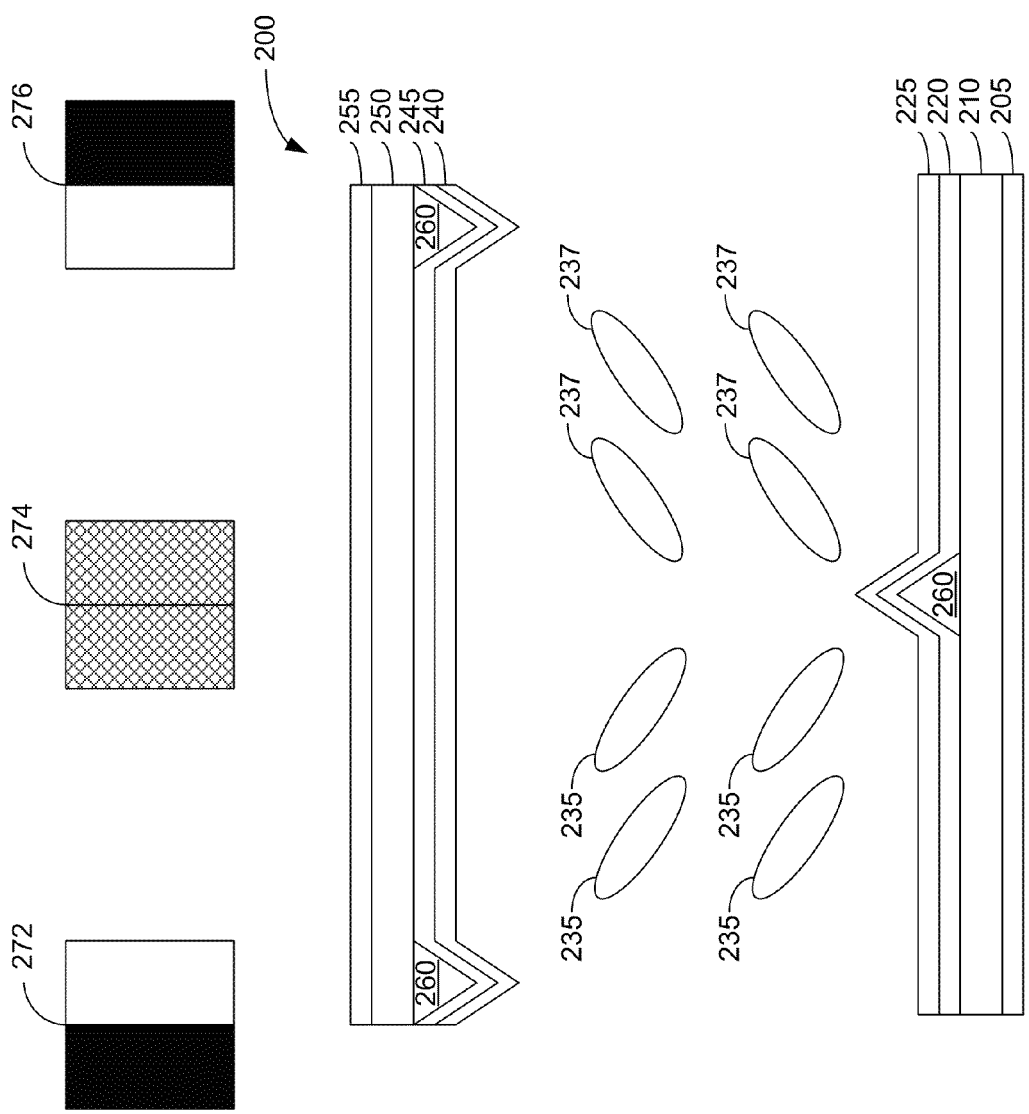
FIG. 2 is an illustration of a pixel of a conventional multi-domain vertical alignment LCD.
Figure 3A:
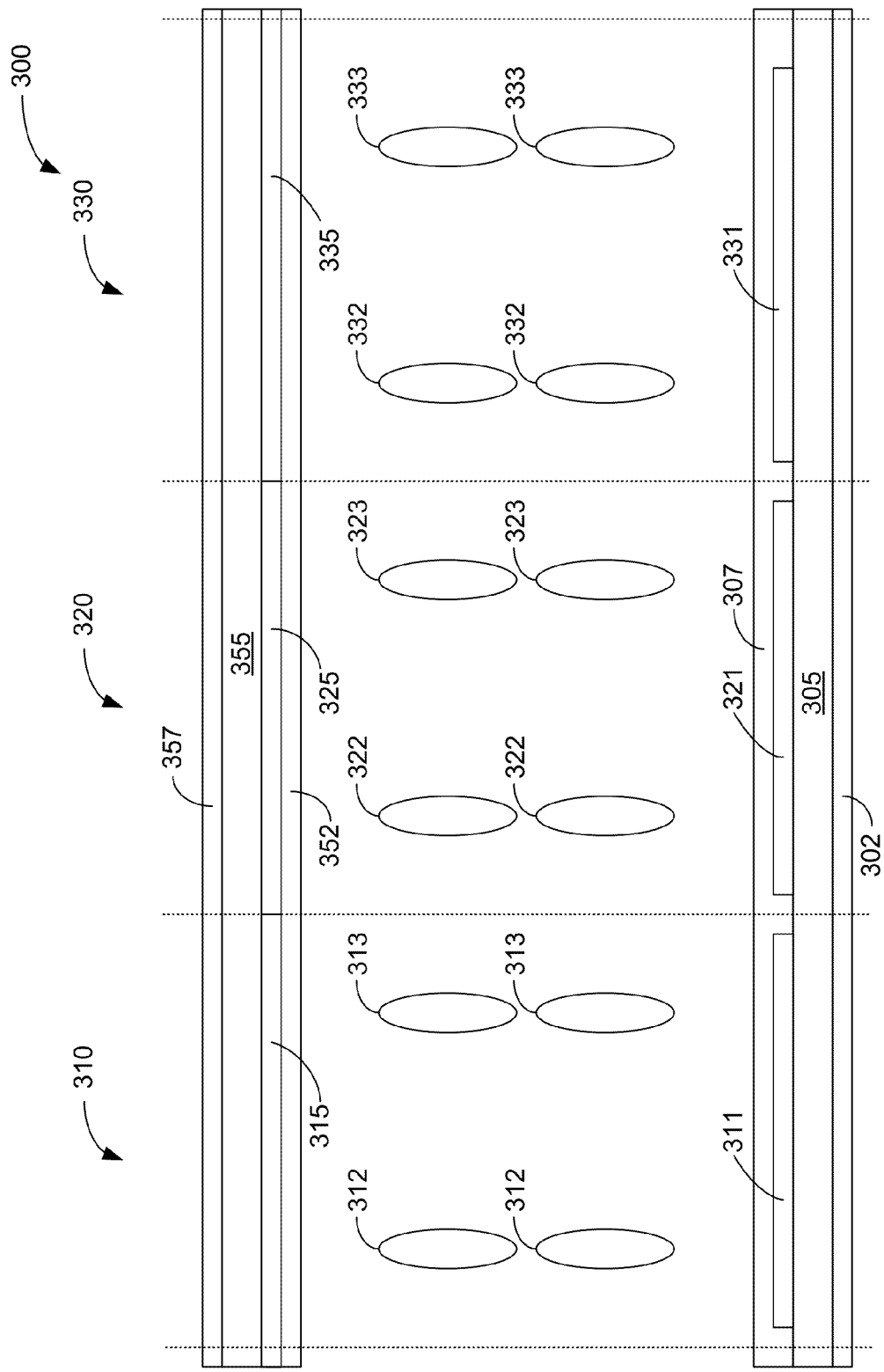
FIGS. 3(*a*)-3(*b*) illustrate a multi-domain vertical alignment liquid crystal display in accordance with one embodiment of the present invention.
Figure 3B:
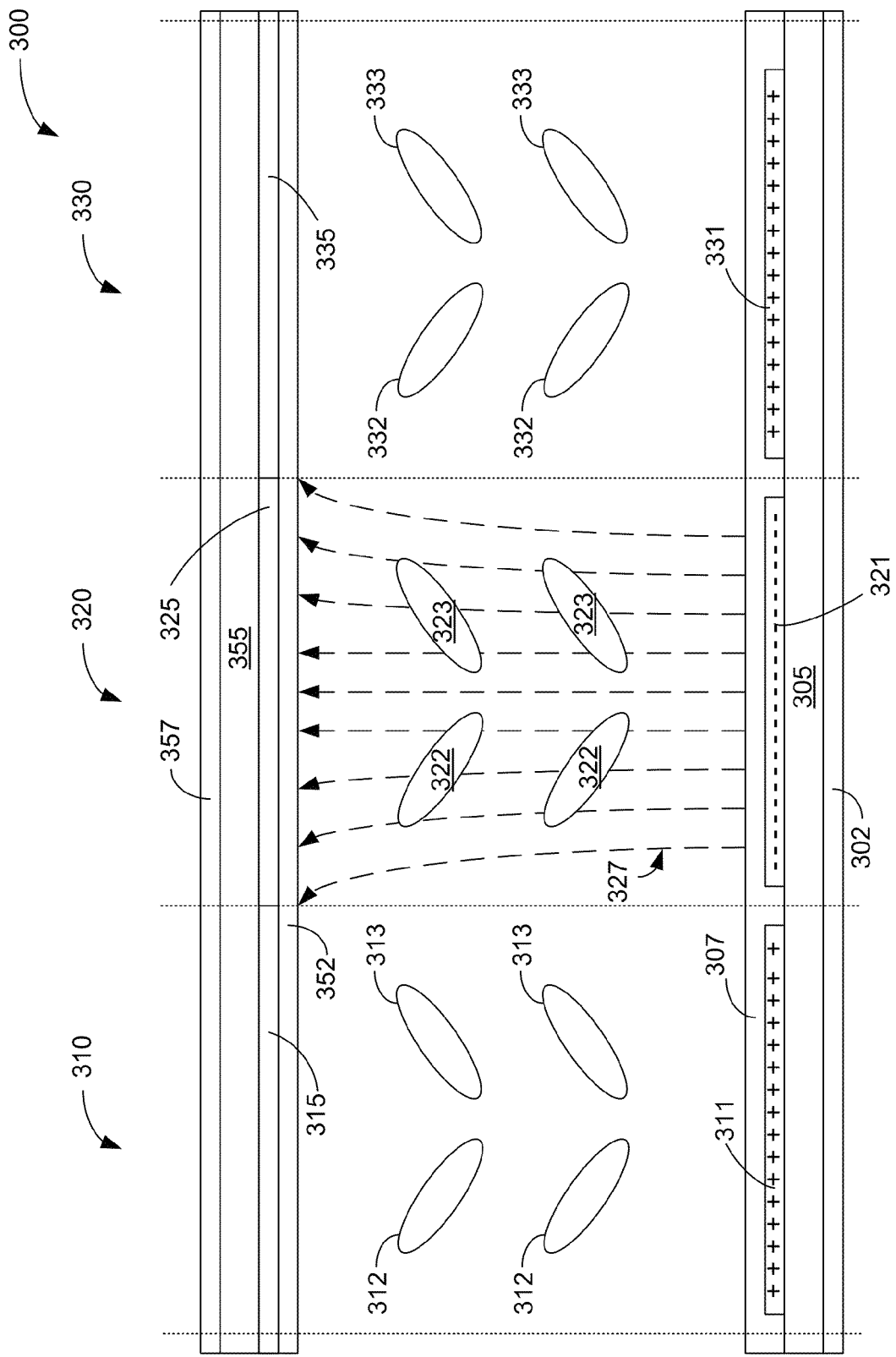

FIGS. 3(a) and 3(b) illustrate the basic concept used in accordance with the present invention to create a multi-domain vertical alignment liquid crystal display (MVA LCD) 300 without resorting to physical features on the substrates. Specifically FIG. 3 shows pixels 310, 320, and 330 in between a first substrate 305 and a second substrate 355. A first polarizer 302 is attached to first substrate 305 and a second polarizer 357 is attached to second substrate 355. Pixel 310 includes a first electrode 311, liquid crystals 312, liquid crystals 313 and a second electrode 315. Pixel 320 includes a first electrode 321, liquid crystals 322, liquid crystals 323 and a second electrode 325. Similarly, pixel 330 includes a first electrode 331, liquid crystals 332, liquid crystals 333 and a second electrode 335. The electrodes are typically constructed using a transparent conductive material such as ITO. Furthermore, a first alignment layer 307 covers the electrodes on first substrate 305. Similarly a second alignment layer 352 covers the electrodes on second substrate 355. Both LC alignment layers 307 and 352 provide a vertical LC alignment. As explained in more detail below, electrodes 315, 325, and 335 are held at a common voltage V_Com. Therefore, to ease manufacturing, electrodes 315, 325, and 335 are created as a single structure (as shown in FIGS. 3(a) and 3(b)). MVA LCD 300 operates pixels 310, 320, and 330 using alternating polarities. For example, if the polarities of pixels 310 and 330 are positive then the polarity of pixel 320 would be negative. Conversely, if the polarities of pixel 310 and 330 are negative then the polarity of pixel 320 would be positive. Generally, the polarity of each pixel would switch between frames, but the pattern of alternating polarities is maintained in each frame. In FIG. 3(a), pixels 310, 320, and 330 are in the "OFF" state, i.e. with the electric field between the first and second electrodes turned off. In the "OFF" state some residual electric field may be present between the first and second electrode. However, the residual electric field is generally too small to tilt the liquid crystals.

In FIG. 3(b), pixels 310, 320, and 330 are in the "ON" state. 3(b) uses "+" and "−" to denote the voltage polarity of the electrodes. Thus, electrodes 311, and 331 have positive voltage polarity and electrodes 321 has negative voltage polarity. Substrate 355 and electrodes 315, 325, and 335 are kept at common voltage V_com. The voltage polarity is defined with respect to the V_com voltage, where a positive polarity is obtained for voltages higher than V_com, and a negative polarity is obtained for voltage smaller than V_com. Electric field 327 (illustrated using field lines) between electrodes 321 and 325 causes liquid crystals 322 and liquid crystals 323 to tilt. In general, without protrusions or other features the tilting direction of the liquid crystals is not fixed for liquid crystals with a vertical LC alignment layers at 307 and 352. However, the fringe field at the edges of the pixel can influence the tilting direction of the liquid crystals. For example, electric field 327 between electrode 321 and electrode 325 is vertical around the center of pixel 320 but is tilted to the left in the left part of the pixel, and tiled to the right in the right part of the pixel. Thus, the fringe field between electrode 321 and electrode 325 cause liquid crystals 323 to tilt to the right to form one domain and cause liquid crystals 322 to tilt to the left to from a second domain. Thus, pixel 320 is a multi-domain pixel with a wide symmetrical viewing angle Similarly, the electric field (not shown) between electrode 311 and electrode 315 would have fringe fields that cause liquid crystals 313 to reorientate and tilt to the right in the right side in pixel 312 and cause liquid crystals 312 to tilt to the left in the left side in pixel 310. Similarly, the electric field (not shown) between electrode 331 and electrode 335 would have fringe fields that cause liquid crystals 333 to tilt to the right in the right side in pixel 330 and cause liquid crystals 332 to tilt to the left in the left side in pixel 330.

Alternating polarity of adjacent pixels amplifies the fringe field effect in each pixel. Therefore, by repeating the alternating polarity pattern between rows of pixels (or columns of pixels), a multi domain vertical alignment LCD is achieved without physical features. Furthermore, an alternating polarity checkerboard pattern can be used to create four domains in each pixel.

However, fringe field effects are relatively small and weak, in general. Consequently, as pixels become larger, the fringe fields at the edge of the pixels would not reach all the liquid crystals within a pixel. Thus, in large pixels the direction of tilting for the liquid crystals not near the edge of the pixels would exhibit random behavior and would not produce a multi-domain pixel. Generally, fringe field effects of pixels would not be effective to control liquid crystal tilt when the pixels become larger than 40-60 μm. Therefore, for large pixel LCDs a novel pixel division method is used to achieve multi-domain pixels. Specifically, for color LCDs, pixels are divided into color components. Each color component is controlled by a separate switching device, such as a thin-film transistor (TFT). Generally, the color components are red, green, and blue. In accordance with the present invention, the color components of a pixel are further divided into color dots.

The polarity of each pixel switches between each successive frame of video to prevent image quality degradation, which may result from twisting the liquid crystals in the same direction in every frame. However, the dot polarity pattern switching may cause other image quality issues such as flicker if all the switching elements are of the same polarity. To minimize flicker, the switching elements (e.g. are transistors) are arranged in a switching element driving scheme that include positive and negative polarities. Furthermore, to minimize cross talk the positive and negative polarities of the switching elements should be arranged in a uniform pattern, which provides a more uniform power distribution. Various switching element driving schemes are used by the embodiments of the present invention. The three main switching element driving schemes are switching element point inversion driving scheme, switching element row inversion driving scheme, and switching element column inversion driving scheme. In the switching element point inversion driving scheme, the switching elements form a checkerboard pattern of alternating polarities. In the switching element row inversion driving scheme, the switching elements on each row have the same polarity; however, each switching element in one row has the opposite polarity as compared to the polarity of switching elements in adjacent rows. In the switching element column inversion driving scheme, the switching elements on each column have the same polarity; however, a switching element in one column has the opposite polarity as compared to the polarity of switching elements in adjacent columns. While the switching element point inversion driving scheme provides the most uniform power distribution, the complexity and additional costs of switching element point inversion driving scheme over switching element row inversion driving scheme or switching element column inversion driving scheme may not be cost effective. Thus, most LCD displays for low cost or low voltage applications are manufactured using switching element row inversion driving scheme while switching element point inversion driving scheme is usually reserved for high performance applications.

Pixels in accordance with embodiments of the present invention include various key components arranged in novel arrangements to achieve high quality low cost display units. For example, pixel can include color components, color dots, fringe field amplifying regions (FFAR), switching elements, device component areas, and associated dots. The device component area encompasses the area occupied by the switching elements and/or storage capacitor as well as the area that was used to manufacture the switching elements and/or storage capacitors. For clarity, a different device component area is defined for each switching element.

Associated dots and fringe field amplifying regions are electrically polarized areas that are not part of the color components. In many embodiments of the present invention, associated dots covers the device component areas. For these embodiments, the associated dots are manufactured by depositing an insulating layer over the switching element and/or storage capacitors. Followed by depositing an electrically conductive layer to form the associated dot. The associated dots are electrically connected to specific switching element and or other polarized components (such as color dots). The storage capacitors are electrically connected to specific switching element and color dot electrodes to compensate and offset the capacitance change on the liquid crystal cells during the switching-on and switching-off processes of the liquid crystal cells. Consequently, the storage capacitors are used to reduce the cross-talk effects during the switching-on and switching-off processes of the liquid crystal cells. A patterning mask is used when it is necessary to form the patterned electrode for the associated dots. Generally, a black matrix layer is added to form a light shield for the associated dot. However, in some embodiments of the present invention, a color layer is added to the associated dot to improve the color performance or to achieve a desired color pattern or shading. In some embodiments of the present invention, the color layer is manufactured on top or underneath the switching element. Other embodiments may also place a color layer on top of the glass substrate of the display.

In other embodiments of the present invention, the associated dot is an area independent of the switching elements. Furthermore, some embodiments of the present invention have additional associated dots not directly related to the switching elements. Generally, the associated dot includes an active electrode layer such as ITO or other conductive layer, and is connected to a nearby color dot or powered in some other manner. For opaque associated dots, a black matrix layer can be added on the bottom of the conductive layer to form the opaque area. In some embodiments of the present invention, the black matrix can be fabricated on the ITO glass substrate side to simplify the fabrication process. The additional associated dots improve the effective use of display area to improve the aperture ratio and to form the multiple liquid crystal domains within the color dots. Some embodiments of the present invention use associate dots to improve color performance. For example, careful placement of associated dots can allow the color of nearby color dots to be modified from the usual color pattern.

Fringe field amplifying regions (FFARs) are more versatile than associated dots. Specifically, fringe field amplifying regions may have non-rectangular shapes, although generally, the overall shape of the fringe field amplifying regions can be divided into a set of rectangular shapes. Furthermore, fringe field amplifying regions extend along more than one side of a color dot. In addition, fringe field amplifying regions may be used in place of associated dots in some embodiments of the present invention. Specifically, in these embodiments the fringe field amplifying region covers the device component areas but also extend along more than one side of color dots adjacent to the device component areas.

In general, the color dots, device component areas, and associated dots are arranged in a grid pattern and are separated from adjacent neighbors by a horizontal dot spacing HDS and a vertical dot spacing VDS. When fringe field amplifying regions are used in place of associated dots, part of the fringe field amplifying regions would also fit in the grid pattern. In some embodiments of the present invention multiple vertical dot spacings and multiple horizontal dot spacings may be used. Each color dot, associated dot, and device component area has two adjacent neighbors (e.g. color dots, associated dots, or device component areas) in a first dimension (e.g. vertical) and two adjacent neighbors in a second dimension (e.g. horizontal). Furthermore, two adjacent neighbors can be aligned or shifted. Each color dot has a color dot height CDH and a color dot width CDW. Similarly, each associated dot has an associated dot height ADH and an associated dot width ADW. Furthermore, each device component area has device component area height DCAH and a device component area width DCAW. In some embodiments of the present invention, color dots, associated dots and device component areas are the same size. However in many embodiments of the present invention color dots, associated dots and device component areas could be of different size or shapes. For example in many embodiments of the present invention associated dots have a smaller height than color dots. In many applications, the height for the color dots is increased to improve the stability of the MVA structure and improve optical transmission to increase the display brightness.

Figures 4A, 4B:
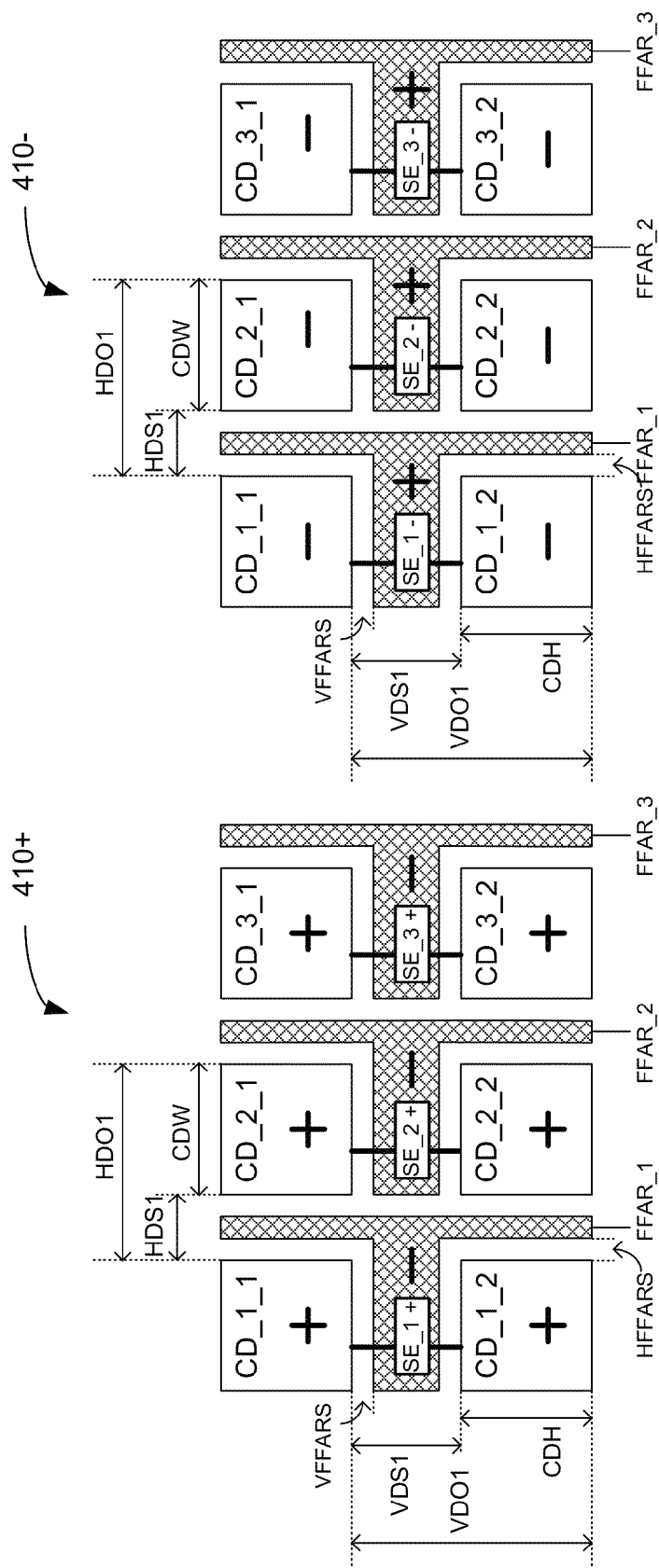
FIGS. 4(*a*)-4(*b*) illustrate a pixel design in accordance with one embodiment of the present invention.

FIGS. 4(a) and 4(b) show different dot polarity patterns of a pixel design 410 (labeled 410+ and 410− as described below) that is often used in displays having a switching element row inversion driving scheme. In actual operation a pixel will switch between a first dot polarity pattern and a second dot polarity pattern between each image frame. For clarity, the dot polarity pattern, in which the first color dot of the first color component has a positive polarity, is referred to as the positive dot polarity pattern. Conversely, the dot polarity pattern in which the first color dot of the first color component has a negative polarity is referred to as the negative dot polarity pattern. Specifically, in FIG. 4(a), pixel design 410 has a positive dot polarity pattern (and is thus labeled 410+) and in FIG. 4(b), pixel design 410 has a negative dot polarity pattern (and is thus labeled 410−). Furthermore, the polarity of each polarized component in the various pixel designs are indicated with "+" for positive polarity or "−" for negative polarity.

Pixel design 410 has three color components CC_1, CC_2 and CC_3 (not labeled in FIGS. 4(a)-4(b)). Each of the three color components includes two color dots. For clarity, the color dots are referenced as CD_X_Y, where X is a color component (from 1 to 3 in FIGS. 4(a)-4(b)) and Y is a dot number (from 1 to 2 in FIGS. 4(a)-4(b)). Pixel design 410 also includes a switching element (referenced as SE_1, SE_2, and SE_3) for each color component and a fringe field amplifying region (referenced as FFAR_1, FFAR_2, and FFAR_3) for each color component. Switching elements SE_1, SE_2, and SE_3 are arranged in a row. Device component areas around each switching element are covered by the fringe field amplifying regions and are thus not specifically labeled in FIGS. 4(a) and 4(b). Fringe field amplifying regions FFAR_1, FFAR_2, and FFAR_3 are also arranged in a row and described in more detail in FIG. 4(c).

First color component CC_1 of pixel design 410 has two color dots CD_1_1 and CD_1_2. Color dots CD_1_1 and CD_1_2 form a column and are separated by a vertical dot pacing VDS1. In other words, color dots CD_1_1 and CD_1_2 are horizontally aligned and vertically separated by vertical dot spacing VDS1. Furthermore, color dots CD_1_1 and CD_1_2 are vertically offset by vertical dot offset VDO1 which is equal to vertical dot spacing VDS1 plus the color dot height CDH. Switching element SE_1 is located in between color dots CD_1_1 and CD_1_2 so that color dot CD_1_1 is on a first side of the row of switching elements and color dot CD_1_2 is on a second side of the row of switching elements. Switching element SE_1 is coupled to the electrodes of color dots CD_1_1 and CD_1_2 to control the voltage polarity and voltage magnitude of color dots CD_1_1 and CD_1_2.

Similarly, second color component CC_2 of pixel design 410 has two color dots CD_2_1 and CD_2_2. Color dots CD_2_1 and CD_2_2 form a second column and are separated by a vertical dot spacing VDS1. Thus, color dots CD_2_1 and CD_2_2 are horizontally aligned and vertically separated by vertical dot spacing VDS1. Switching element SE_2 is located in between color dots CD_2_1 and CD_2_2 so that color dot CD_2_1 is on the first side of the row of switching elements and color dot CD_2_2 is on a second side of the row of switching elements. Switching element SE_2 is coupled to the electrodes of color dots CD_2_1 and CD_2_2 to control the voltage polarity and voltage magnitude of color dots CD_2_1 and CD_2_2. Second color component CC_2 is vertically aligned with first color component CC_1 and separated from color component CC_1 by a horizontal dot spacing HDS1, thus color components CC_2 and CC_1 are horizontally offset by a horizontal dot offset HDO1, which is equal to horizontal dot spacing HDS1 plus the color dot width CDW. Specifically with regards to the color dots, color dot CD_2_1 is vertically aligned with color dots CD_1_1 and horizontally separated by horizontal dot spacing HDS1. Similarly, color dot CD_2_2 is vertically aligned with color dots CD_2_1 and horizontally separated by horizontal dot spacing HDS1. Thus color dot CD_1_1 and color dot CD_2_1 form a first row of color dots and color dot CD_1_2 and color dot CD_2_2 form a second row of color dots.

Similarly, third color component CC_3 of pixel design 410 has two color dots CD_3_1 and CD_3_2. Color dots CD_3_1 and CD_3_2 form a third column and are separated by a vertical dot spacing VDS1. Thus, color dots CD_3_1 and CD_3_2 are horizontally aligned and vertically separated by vertical dot spacing VDS1. Switching element SE_3 is located in between color dots CD_3_1 and CD_3_2 so that color dot CD_3_1 is on the first side of the row of switching elements and color dot CD_3_2 is on a second side of the row of switching elements. Switching element SE_3 is coupled to the electrodes of color dots CD_3_1 and CD_3_2 to control the voltage polarity and voltage magnitude of color dots CD_3_1 and CD_3_2. third color component CC_3 is vertically aligned with second color component CC_2 and separated from color component CC_2 by horizontal dot spacing HDS1, thus color components CC_3 and CC_2 are horizontally offset by a horizontal dot offset HDO1. Specifically with regards to the color dots, color dot CD_3_1 is vertically aligned with color dots CD_2_1 and horizontally separated by horizontal dot spacing HDS1. Similarly, color dot CD_3_2 is vertically aligned with color dots CD_2_2 and horizontally separated by horizontal dot spacing HDS1. Thus color dot CD_3_1 is on the first row of color dots and color dot CD_3_2 is on the second row of color dots.

For clarity, the color dots of pixel design 410 are illustrated with color dots having the same color dot height CDH. However, some embodiments of the present invention may have color dots with different color dot heights. For example in one embodiment of the present invention that is a variant of pixel design 410, color dots CD_1_1, CD_2_1 and CD_3_1 have a smaller color dot height than color dots CD_1_2, CD_2_2, and CD_3_2.

Pixel design 410 also includes fringe field amplifying regions FFAR_1, FFAR_2, and FFAR_3. FIG. 4(c) shows a more detailed view of fringe field amplifying region FFAR_1 of pixel design 410. For clarity fringe field amplifying regions FFAR_1 is conceptually divided into a vertical amplifying portion VAP and a horizontal amplifying portion HAP. In FIG. 4(c) horizontal amplifying portion HAP is vertically centered on and extends to the left of vertical amplifying portion VAP. Use of horizontal amplifying portions and vertical amplifying portions allows clearer description of the placement of fringe field amplifying region FFAR1. In most embodiments of the present invention, the electrodes of the fringe field amplifying regions are formed by one contiguous conductor. Horizontal amplifying portion HAP has a horizontal amplifying portion width HAP_W and a horizontal amplifying portion height HAP_H. Similarly, vertical amplifying portion VAP has a vertical amplifying portion width VAP_W and a vertical amplifying portion height HAP_H. Fringe field amplifying regions FFAR_2 and FFAR_3 have the same shape as fringe field amplifying region FFAR_1. In embodiments of the present invention having different sized color dots, horizontal amplifying region HAP would be located in between the color dots rather than centered on vertical amplifying portion VAP.

As shown in FIG. 4(a), fringe field amplifying regions FFAR_1, FFAR_2, and FFAR_3 are placed in between the color dots of pixel design 410. Specifically, fringe field amplifying region FFAR_1 is placed so that the horizontal amplifying portion of fringe field amplifying region FFAR_1 lies in between color dots CD_1_1 and CD_1_2 and is separated from color dots CD_1_1 and CD_1_2 by a vertical fringe field amplifying region spacing VFFARS. The vertical amplifying portion of fringe field amplifying region FFAR_1 is placed to the right of color dots CD_1_1 and CD_1_2 and is separated from color dots CD_1_1 and CD_1_2 by a horizontal fringe field amplifying region spacing HFFARS. Thus, fringe field amplifying region FFAR_1 extends along the bottom and the right side of color dot CD_1_1 and along the top and right side of color dot CD_1_2. Furthermore, this placement also causes the vertical amplifying portion of fringe field amplifying region FFAR_1 to be in between color dots CD_1_1 and CD_2_1 and in between color dots CD_1_2 and CD_2_2.

Similarly, fringe field amplifying region FFAR_2 is placed so that the horizontal amplifying portion of fringe field amplifying region FFAR_2 lies in between color dots CD_2_1 and CD_2_2 and is separated from color dots CD_2_1 and CD_2_2 by a vertical fringe field amplifying region spacing VFFARS. The vertical amplifying portion of fringe field amplifying region FFAR_2 is placed to the right of color dots CD_2_1 and CD_2_2 and is separated from color dots CD_2_1 and CD_2_2 by a horizontal fringe field amplifying region spacing HFFARS. Thus, fringe field amplifying region FFAR_1 extends along the bottom and the right side of color dot CD_2_1 and along the top and right side of color dot CD_2_2. This placement also causes the vertical amplifying portion of fringe field amplifying region FFAR_2 to be in between color dots CD_2_1 and CD_3_1 and in between color dots CD_2_2 and CD_3_2.

Fringe field amplifying region FFAR_3 is placed so that the horizontal amplifying portion of fringe field amplifying region FFAR_3 lies in between color dots CD_3_1 and CD_3_2 and is separated from color dots CD_3_1 and CD_3_2 by a vertical fringe field amplifying region spacing VFFARS. The vertical amplifying portion of fringe field amplifying region FFAR_3 is placed to the right of color dots CD_3_1 and CD_3_2 and is separated from color dots CD_3_1 and CD_3_2 by a horizontal fringe field amplifying region spacing HFFARS. Thus, fringe field amplifying region FFAR_3 extends along the bottom and the right side of color dot CD_3_1 and along the top and right side of color dot CD_3_2.

The polarities of the color dots, fringe field amplifying regions, and switching elements are shown using "+" and "−" signs. Thus, in FIG. 4(a), which shows the positive dot polarity pattern of pixel design 410+, all the switching elements (i.e. switching elements SE_1, SE_2, and SE_3); all the color dots (i.e. color dots CD_1_1, CD_1_2, CD_2_1, CD_2_2, CD_3_1, and 3_2) have positive polarity. However, all the fringe field amplifying regions (i.e. fringe field amplifying regions FFAR_1, FFAR_2, and FFAR_3) have negative polarity.

FIG. 4(b) shows pixel design 410 with the negative dot polarity pattern. For the negative dot polarity pattern, all the switching elements (i.e. switching elements SE_1, SE_2, and SE_3) and all the color dots (i.e. color dots CD_1_1, CD_1_2, CD_2_1, CD_2_2, CD_3_1, and 3_2) have negative polarity. However, all the fringe field amplifying regions (i.e. fringe field amplifying regions FFAR_1, FFAR_2, and FFAR_3) have positive polarity.

As explained above fringe fields in each of the color dots are amplified if adjacent components have opposite polarities. Pixel design 410 makes use of the fringe field amplifying regions to enhance and stabilize the formation of multiple domain in the liquid crystal structure. In general, the polarities of the polarized components are assigned so that a color dot of a first polarity has neighboring polarized components of the second polarity. For example for the positive dot polarity pattern of pixel design 410 (FIG. 4(a)), color dot CD_2_2 has positive polarity. However the neighboring polarized components (fringe field amplifying regions FFAR_2 and FFAR_1) have negative polarity. Thus, the fringe field of color dot CD_2_2 is amplified. Furthermore, as explained below, the polarity reversing scheme is carried out at the display level as well so that the color dot of another pixel that is placed next to color dot CD_1_2 would have negative polarity (see FIG. 4(d)).

Figure 4D:
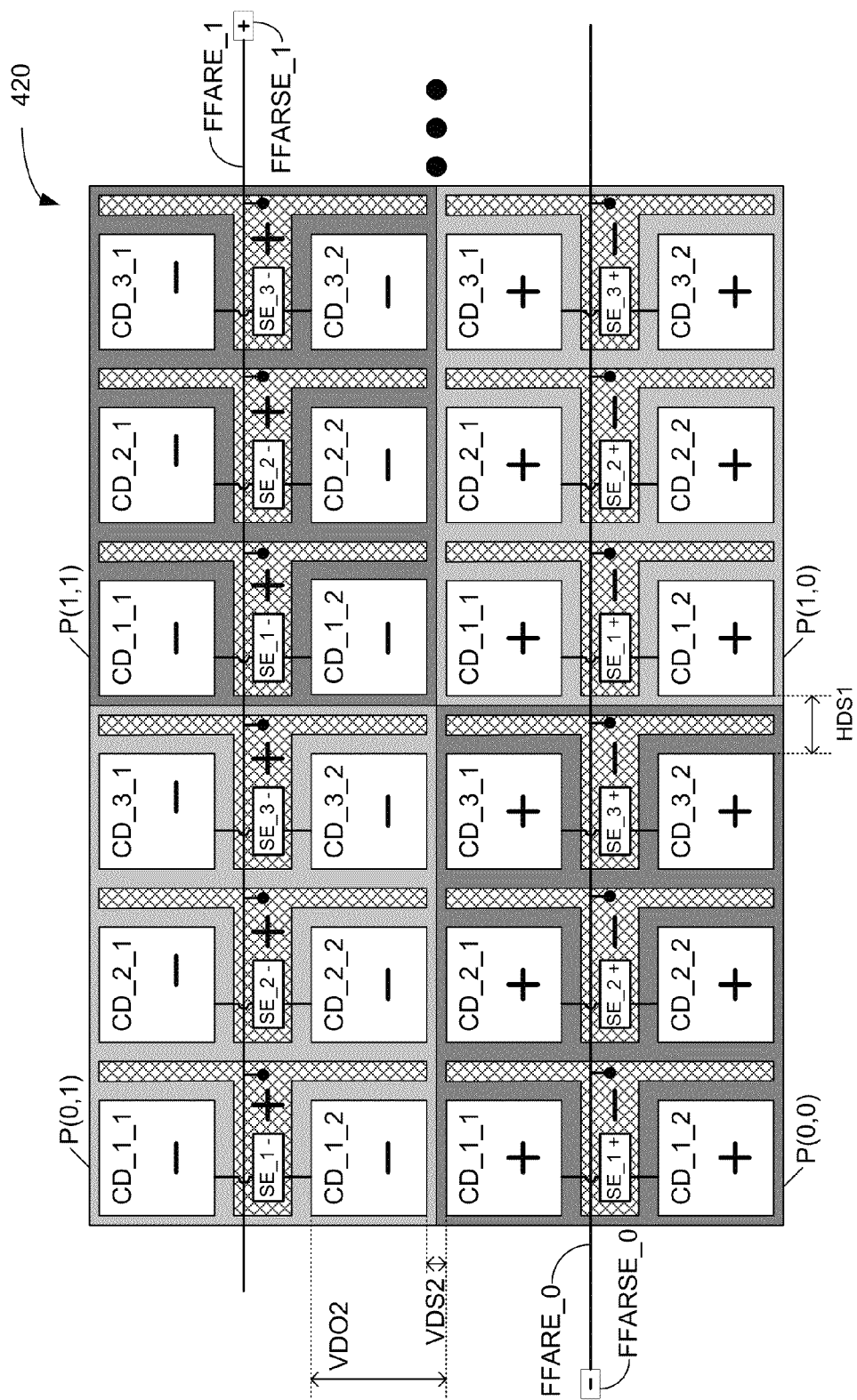

Because, all the switching elements in pixel design 410 have the same polarity and the fringe field amplifying regions require the opposite polarity, the fringe field amplifying regions are driven by an external polarity source, i.e. a polarity source from outside the specific pixel of pixel design 410. Various sources of opposite polarity can be used in accordance with differing embodiments of the present invention. For example specific fringe field amplifying region switching elements may be used (as shown in FIG. 4(d) in accordance with some embodiments of the present invention) or switching elements of nearby pixels having an opposite dot polarity could also used to drive the fringe field amplifying regions (as shown in FIG. 5(c) in accordance with another embodiment of the present invention).

Figure 4E:
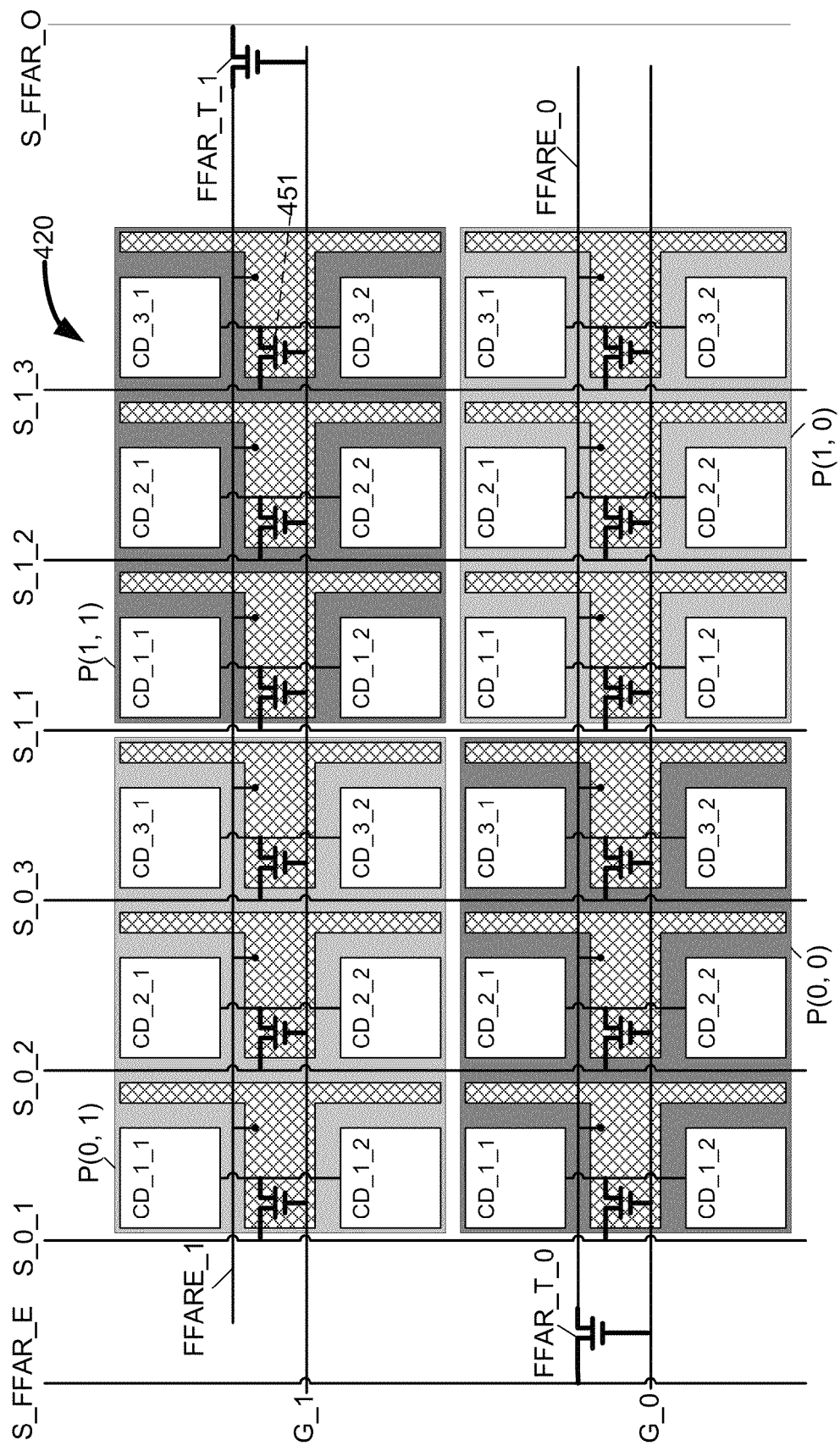
Figures 4F, 4G:
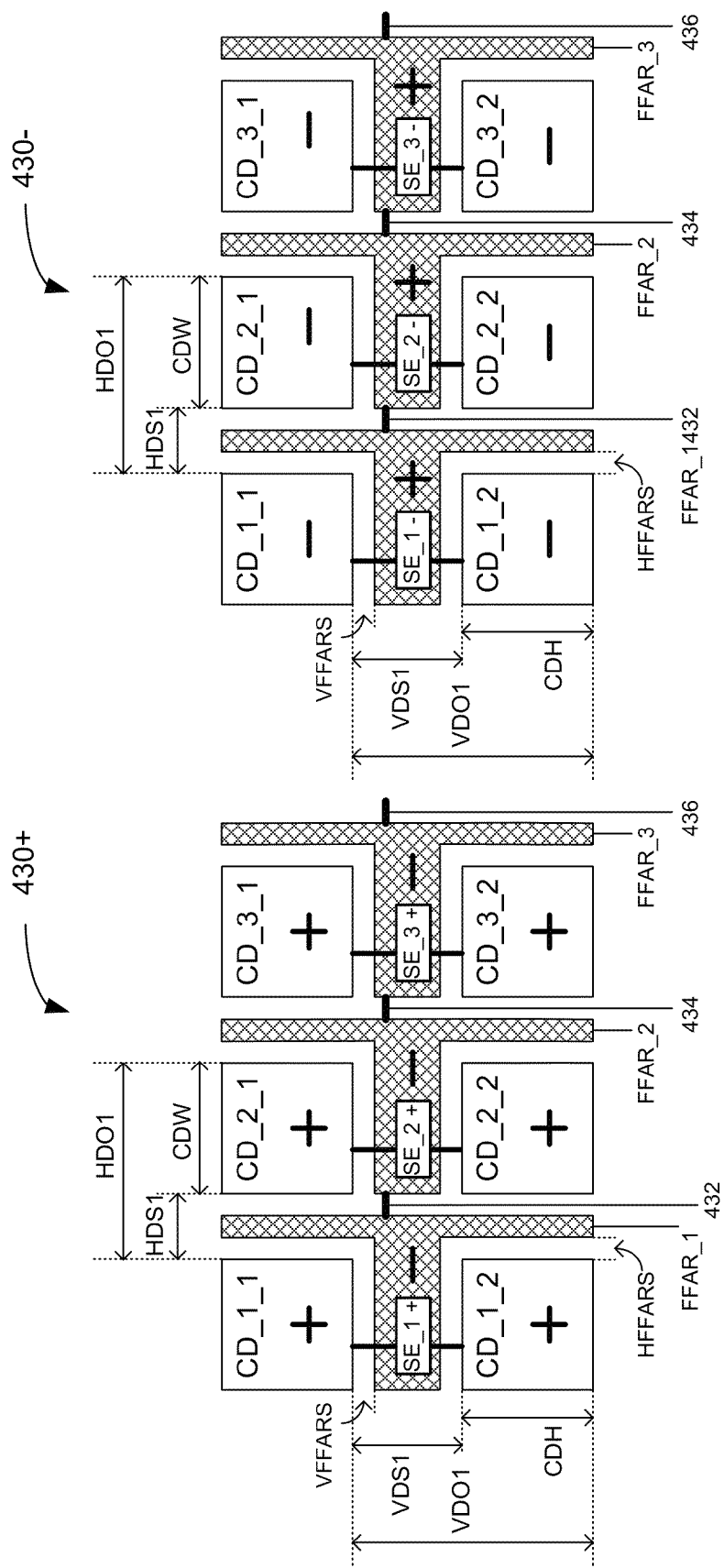
Figure 4H:
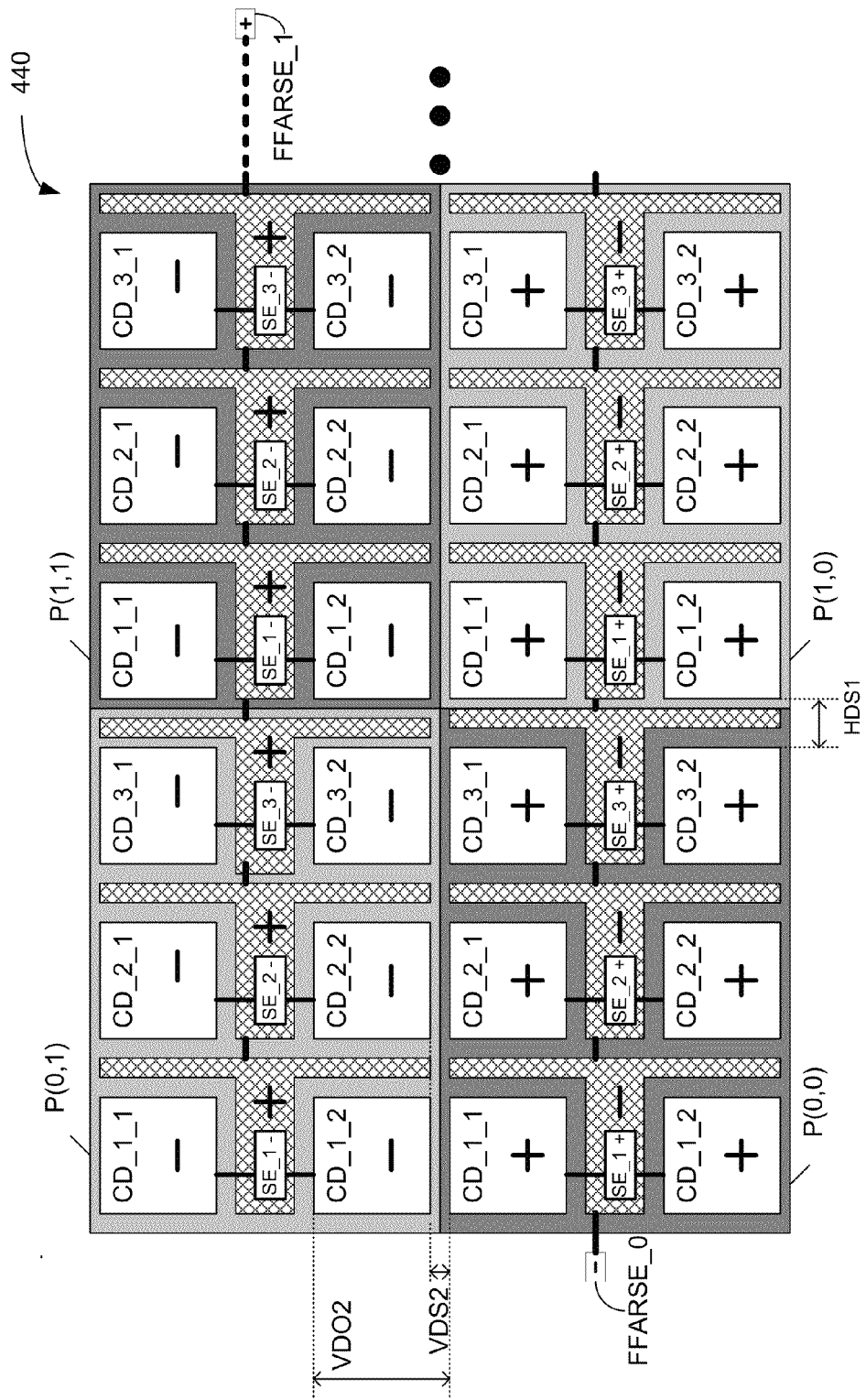

Pixels using pixel design 410 of FIGS. 4(a) and 4(b) can be used in displays using switching element row inversion driving schemes. FIG. 4(d) shows a portion of display 420 using pixels P(0, 0), P(1, 0), P(0, 1), and P(1, 1) of pixel design 410 with a switching element row inversion driving scheme. Display 420 could have thousands of rows with thousand of pixels on each row. The rows and columns would continue from the portion shown in FIG. 4(d) in the manner shown in FIG. 4(d). For clarity, the gate lines and source lines that control the switching elements are omitted in FIG. 4(d). Gate lines and source lines are illustrated in FIG. 4(e). Furthermore, to better illustrate each pixel, the area of each pixel is shaded; this shading is only for illustrative purposes in FIG. 4(d) and has no functional significance. In the displays presented herein, a pixel P(x, y) is in the x-th column (from the left and the y-th row starting from the bottom, with pixel P(0,0) being the bottom left corner. In display 420 the pixels are arranged so that all pixels in a row have the same dot polarity pattern (positive or negative) and each successive row should alternate between positive and negative dot polarity pattern. Thus, pixels P(0, 0) and P(1, 0) in the first row (i.e. row 0) have positive dot polarity pattern and pixels P(0, 1) and P(1, 1) in the second row (i.e. row 1) have the negative dot polarity pattern. However, at the next frame the pixels will switch dot polarity patterns. Thus in general a pixel P(x, y) has a first dot polarity pattern when y is even and a second dot polarity pattern when y is odd.

Pixels on each row of pixels are vertically aligned and separated horizontally so that the right most color dots of a pixel are separated from the left most color dot of an adjacent pixel by horizontal dot spacing HDS1. Pixels on a column of pixels are horizontally aligned and separated by a vertical dot spacing VDS2.

As explained above, the fringe field amplifying regions of a pixel of pixel design 410 receives proper polarity from outside the pixel. Thus in display 420, each row of pixels has a corresponding fringe field amplifying region switching element coupled to a fringe field amplifying electrode that extends across display 420. The fringe field amplifying regions of the pixels in the corresponding row of pixels are coupled to the corresponding fringe field amplifying electrode to receive voltage polarity and voltage magnitude from the fringe field amplifying region switching element. Specifically for row 0, fringe field amplifying region switching element FFARSE_0 is on the left side of display 420. Fringe field amplifying region electrode FFARE_0 is coupled to fringe field amplifying region switching element FFARSE_0 and extends across display 420. Fringe field amplifying regions in the pixels of row 0 are coupled to fringe field amplifying region electrode FFARE_0. Specifically, the fringe field amplifying regions of pixel P(0, 0) and pixel P(1, 0) are coupled to fringe field amplifying region electrode FFARE_0. For row 1, fringe field amplifying region switching element FFARSE_1 is on the right side of display 420. Fringe field amplifying region electrode FFARE_1 is coupled to fringe field amplifying region switching element FFARSE_1 and extends across display 420. Fringe field amplifying regions in the pixels of row 1 are coupled to fringe field amplifying region electrode FFARE_1. Specifically, the fringe field amplifying regions of pixel P(0, 1) and pixel P(1, 1) are coupled to fringe field amplifying region electrode FFARE_1. In FIG. 4(*d*), fringe field amplifying region switching elements FFARSE_0 and FFARSE_1 have negative polarity and positive polarity respectively. However in the next frame the polarities are reversed. Some embodiments of the present invention may put all the fringe field amplifying region switching elements on the same side of the display.

Due to the switching of polarities on each row in display 420, if a color dot has the first polarity, any neighboring polarized components have the second polarity. For example, color dot CD_3_2 of pixel P(0, 1) has negative polarity while, color dot CD_3_1 of pixel P(0, 0), fringe field amplifying regions FFAR_2 and FFAR_3 of pixel P(0, 1) have positive polarity. In a particular embodiment of the present invention, each color dot has a width of 40 micrometers and a height of 60 micrometers. Each fringe field amplifying region has a vertical amplifying portion width of 5 micrometers, a vertical amplifying portion height of 145 micrometers, a horizontal amplifying portion width of 45 micrometers, a horizontal amplifying height of 5 micrometers. Horizontal dot spacing HDS1 is 15 micrometers, vertical dot spacing VDS1 is 25 micrometers, horizontal fringe field amplifying spacing HFFARS is 5 micrometers, and vertical fringe field amplifying spacing VFFARS is 5 micrometers.

FIG. 4(*e*) illustrates the same portion of a display 420 as FIG. 4(*d*) (i.e., pixels P(0, 0), P(1, 0), P(0, 1), and P(1, 1)) using transistors as switching elements. However, FIG. 4(*e*) emphasizes the gate and source lines and thus for clarity some pixel details (such as polarity which are shown in FIG. 4(*d*)) are omitted in FIG. 4(*e*). To better illustrate each pixel, the area of each pixel is shaded; this shading is only for illustrative purposes in FIG. 4(*e*) and has no functional significance. FIG. 4(*e*) is drawn showing source lines (S_0_1, S_0_2, S_0_3, S_1_1, S_1_2, and S_1_3,) and gate lines (G_0, and G_1). In general, a source line S_X_Z and gate line G_Y is used for the color component CC_Z of pixel P(X, Y). The source terminal of a transistor is coupled to a source line and the gate terminal of the transistor is coupled to a gate line. The drain terminal of the transistor is coupled to the electrode of the various color components. For clarity, transistors, which are used as the switching elements in display 420, are referenced as transistor T(S_X_Z, G_Y) where S_X_Z is the source line coupled to the transistor and G_Y is the gate line coupled to the transistor. Thus transistor 451 in FIG. 4(*e*) is referenced herein as transistor T(S_1_3, G_1) because the source terminal of transistor 451 is coupled to source line S_1_3 and the gate terminal of transistor 451 is coupled to gate line G_1. In pixel P(0, 1), which is controlled by gate line G_1 and source lines S_0_1, S_0_2, and S_0_3, the drain terminal of transistor T(S_0_1, G_1) is coupled to the electrode(s) of color component CC_1 (i.e. color dots CD_1_1 and CD_1_2). Similarly, the drain terminal of transistor T(S_0_2, G_1) is coupled to the electrode(s) of color component CC_2 (i.e. color dots CD_2_1 and 2_2) and the drain terminal of transistor T(S_0_3, G_1) is coupled to the electrode(s) of color component CC_3 (i.e. color dots CD_3_1 and CD_3_2). Furthermore, the gate terminals of transistors T(S_0_1, G_1), T(S_0_2, G_1), and T(SO_3, G_1) are coupled to gate line G_1 and the source terminals of transistors T(S_0_1, G_1), T(S_0_2, G_1), and T(SO_3, G_1) are coupled to source lines S_0_1, S_0_2, and S_0_3, respectively. Similarly, the components of pixel P(1,1) are coupled to gate line G_1 and source lines S_1_1, S_1_2, and S_1_3. The components of pixel P(0, 0) are coupled to gate line G_0 and source lines S_0_1, S_0_2, and S_0_3; and the components of pixel P(1, 0) are coupled to gate line G_0 and source lines S_1_1, S_1_2, and S_1_3.

Each gate line extends from the left side of display 420 to the right side and controls all the pixels on one row of display 420. Display 420 has one gate line for each row of pixels. Each source line runs from the top to the bottom of display 420. Display 420 has three times the number of source lines as the number of pixels on each row (i.e. one source line for each color component of each pixel in a row of pixels). During operation only one gate line is active at a time. All transistors in the active row are rendered conductive by a positive gate impulse from the active gate line. Transistors in other rows are blocked by grounding the non-active gate lines. All source lines are active at the same time and each source line provides video data to one transistor on the active row (as controlled by the active gate line). Therefore, gate lines are often called bus lines and source lines are often called data lines due to the way the gate lines and source lines operate. The voltage charges the electrode of the color component to create a desired gray scale level (color is provided by color filters). When inactive, the electrodes of the color dot are electrically isolated and thus can maintain the voltage to control the liquid crystals. However, parasitic leakage is unavoidable and eventually the charge will dissipate. For small screens with fewer rows, the leakage is not problematic because the row is "refreshed" quite often. However, for larger displays with more rows there is a longer period between refreshes. Thus, some embodiments of the present invention include one or more storage capacitors for each color dot. The storage capacitors are charged by the switching element of the color dots and provide a "maintenance" charge while the row is inactive. Generally, the data lines and bus lines are manufactured using an opaque conductor, such as Aluminum (Al) or Chromium (Cr).

As explained above, the fringe field amplifying regions of a pixel using pixel design 410 receives proper polarity from outside the pixel. Thus in display 420, each row of pixels has a corresponding fringe field amplifying region transistor coupled to a fringe field amplifying electrode that extends across display 420. The fringe field amplifying regions of the pixels in the corresponding row of pixels are coupled to the corresponding fringe field amplifying electrode to receive voltage polarity and voltage magnitude from the fringe field amplifying region transistor. Specifically for row 0, fringe field amplifying region transistor FFAR_T_0 is on the left side of display 420. Fringe field amplifying region electrode FFARE_0 is coupled to the drain terminal of fringe field amplifying region transistor FFAR_T_0 and extends across display 420. Fringe field amplifying regions in the pixels of row 0 are coupled to fringe field amplifying region electrode FFARE_0. Specifically, the fringe field amplifying regions of pixel P(0, 0) and pixel P(1, 0) are coupled to fringe field amplifying region electrode FFARE_0. The control terminal of fringe field amplifying region FFAR_T_0 is coupled to gate line G_0 and the source terminal of fringe field amplifying region transistor FFAR_T_0 is coupled to a fringe field amplifying region even source line S_FFAR_E. The polarity of the fringe field amplifying region is set to the opposite polarity of the color dots to enhance and stabilize the formation of multiple domains in the liquid crystal structure. Thus, the polarity on fringe field amplifying region even source line S_FFAR_E is the opposite of the polarity on source lines coupled to the transistors for the color dots. In general the magnitude of the voltage on fringe field amplifying region even source line S_FFAR_E is set to a fixed voltage. To reduce power usage, the fixed voltage on fringe field amplifying region even source line S_FFAR_E is set to a low voltage. In some embodiments of the present invention fringe field amplifying region even source line S_FFAR_E are controlled by a transistor at the edge of the display. In other embodiments of the present invention, fringe field amplifying region even source line S_FFAR_E are controlled by the driving circuit controlling the other source lines.

For row 1, fringe field amplifying region transistor FFAR_T_1 is on the right side of display 420. Fringe field amplifying region electrode FFARE_1 is coupled to the drain terminal of fringe field amplifying region transistor FFAR_T_1 and extends across display 420. Fringe field amplifying regions in the pixels of row 1 are coupled to fringe field amplifying region electrode FFARE_1. Specifically, the fringe field amplifying regions of pixel P(0, 1) and pixel P(1, 1) are coupled to fringe field amplifying region electrode FFARE_1. The control terminal of fringe field amplifying region FFAR_T_0 is coupled to gate line G_1 and the source terminal of fringe field amplifying region transistor FFAR_T_1 is coupled to a fringe field amplifying region odd source line S_FFAR_O. The polarity of the fringe field amplifying region is set to the opposite polarity of the color dots to enhance and stabilize the formation of multiple domains in the liquid crystal structure. Thus, the polarity on fringe field amplifying region odd source line S_FFAR_O is the opposite of the polarity on source lines coupled to the transistors for the color dots. In general the magnitude of the voltage on fringe field amplifying region odd source line S_FFAR_O is set to a fixed voltage. To reduce power usage, the fixed voltage on fringe field amplifying region odd source line S_FFAR_O is set to a low voltage. In some embodiments of the present invention fringe field amplifying region even source line S_FFAR_O are controlled by a transistor at the edge of the display. In other embodiments of the present invention, fringe field amplifying region odd source line S_FFAR_O are controlled by the driving circuit controlling the other source lines.

In display 420 the fringe field amplifying region transistors are placed on both the left side and right side of the display to improve power distribution in display 420. However some embodiments of the present invention may put all the fringe field amplifying region transistors on a single side of the display. In these embodiments all of the source terminals of the fringe field amplifying region transistors can be coupled to a single fringe field amplifying region transistor S_FFAR.

FIGS. 4(*f*) and 4(*g*) show different dot polarity patterns of a pixel design 430 (labeled 430+ and 430−) that is a variant of pixel design 410. Because the layout and polarity of the color dots, the switching elements, and the fringe field amplifying region are the same in pixel design 430 and pixel design 410 the description is not repeated. The primary difference between pixel design 430 and pixel design 410 is that in pixel design 430, the fringe field amplifying regions are coupled together by conductors within the pixel. Specifically, a conductor 432 couples the electrode of fringe field amplifying region FFAR_1 to the electrode of fringe field amplifying region FFAR_2. Similarly, a conductor 434 couples the electrode of fringe field amplifying region FFAR_2 to the electrode of fringe field amplifying region FFAR_3. Furthermore a conductor 436 is coupled to fringe field amplifying region FFAR_3 extends to the right of fringe field amplifying region FFAR_3. Conductor 436 is used to connect to a fringe field amplifying region of an adjacent pixel (see FIG. 4(*h*)). In another embodiment of the present invention, instead of coupling to fringe field amplifying region FFAR_3, conductor 436 is coupled to fringe field amplifying region FFAR_1 and extends to the left of fringe field amplifying region FFAR_1. By including internal connection between the fringe field amplifying regions, connections of the fringe field amplifying regions to the external polarity source is simplified.

FIG. 4(*h*) shows a portion of display 440 using pixels P(0, 0), P(1, 0), P(0, 1), and P(1, 1) of pixel design 430 with a switching element row inversion driving scheme. Display 440 could have thousands of rows with thousand of pixels on each row. The rows and columns would continue from the portion shown in FIG. 4(*h*) in the manner shown in FIG. 4(*h*). For clarity, the gate lines and source lines that control the switching elements are omitted in FIG. 4(*h*). The gate lines and source lines for display 430 would be identical to the gate line and source lines of display 420 as illustrated in FIG. 4(*e*). Furthermore, to better illustrate each pixel, the area of each pixel is shaded; this shading is only for illustrative purposes in FIG. 4(*h*) and has no functional significance. Like in display 420, the pixels of display 440 are arranged so that all pixels in a row have the same dot polarity pattern (positive or negative) and each successive row should alternate between positive and negative dot polarity pattern. Thus, pixels P(0, 0) and P(1, 0) in the first row (i.e. row 0) have positive dot polarity pattern and pixels P(0, 1) and P(1, 1) in the second row (i.e. row 1) have the negative dot polarity pattern. However, at the next frame the pixels will switch dot polarity patterns. Thus in general a pixel P(x, y) has a first dot polarity pattern when y is even and a second dot polarity pattern when y is odd. Because display 440 is very similar to display 420, only the differences between display 440 and display 420 are described. Specifically, due to the inclusion of internal conductors 432, 434, and 446 in pixel design 430, display 440 does not include fringe field amplifying region electrodes. Instead the fringe field amplifying region switching elements on the left side of display 400 are coupled to the first fringe field amplifying region of the leftmost pixel. For example in FIG. 4(h), fringe field amplifying region switching element FFARSE_0 is coupled to fringe field amplifying region FFAR_1 of pixel P(0, 0). The internal conductors then provide the polarity to all the fringe field amplifying regions of the pixels on the row. The fringe field amplifying region switching elements on the right side of display 400 are coupled to third fringe field amplifying region of the rightmost pixel. This is symbolically represented in FIG. 4(h) by fringe field amplifying region switching element FFARSE_1 coupled through a series of pixels (not shown) to fringe field amplifying region FFAR_3 of pixel P(1, 1). In FIG. 4(c), fringe field amplifying region switching elements FFARSE_0 and FFARSE_1 have negative polarity and positive polarity respectively. However in the next frame the polarities are reversed.

Due to the switching of polarities on each row in display 440, if a color dot has the first polarity, any neighboring polarized components have the second polarity. For example, color dot CD_3_2 of pixel P(0, 1) has negative polarity while, color dot CD_3_1 of pixel P(0, 0), fringe field amplifying regions FFAR_2 and FFAR_3 of pixel P(0, 1) have positive polarity. In a particular embodiment of the present invention, each color dot has a width of 40 micrometers and a height of 60 micrometers. Each fringe field amplifying region has a vertical amplifying portion width of 5 micrometers, a vertical amplifying portion height of 145 micrometers, a horizontal amplifying portion width of 45 micrometers, a horizontal amplifying height of 5 micrometers. Horizontal dot spacing HDS1 is 15 micrometers, vertical dot spacing VDS1 is 25 micrometers, horizontal fringe field amplifying spacing HFFARS is 5 micrometers, and vertical fringe field amplifying spacing VFFARS is 5 micrometers.

Figure 4J:
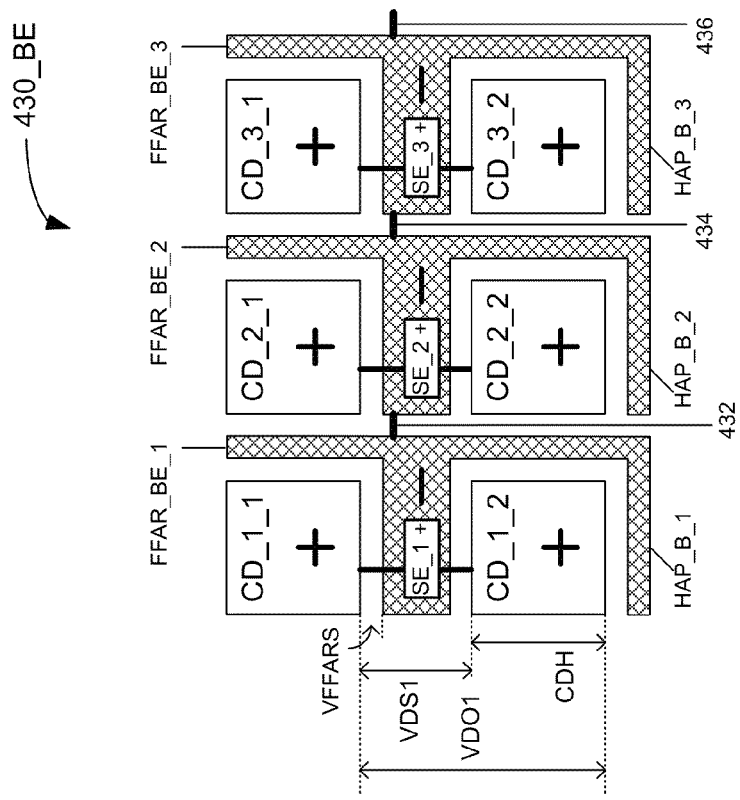
Figure 4I:
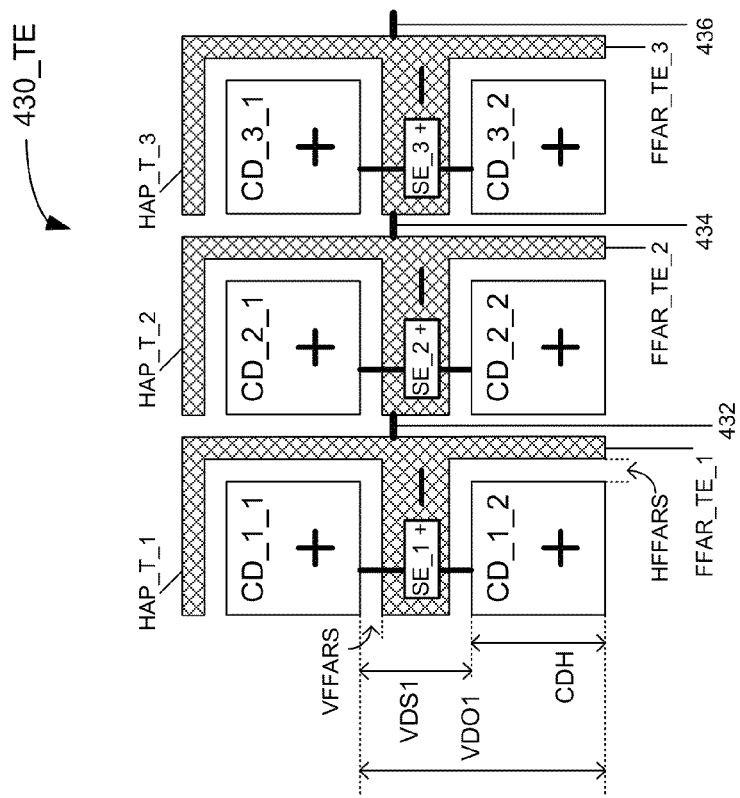

In some embodiments of the present invention the pixels at the edge of a display use edge pixel designs that are variants of the pixel design used for the non-edge pixels of the display. For example, FIGS. 4(i) and 4(j) illustrate a top edge pixel design 430_TE and a bottom edge pixel design 430_BE, respectively. Top edge pixel design 430_TE and Bottom edge pixel design 430_BE are variations of pixel design 430. For brevity the description is not repeated and only the differences between the edge pixel designs and pixel design 430 are described.

Specifically, top edge pixel design 430_TE uses a modified fringe field amplifying region FFAR. For clarity the fringe field amplifying regions in FIG. 4(i) are referred to as top edge fringe field amplifying regions and labeled FFAR_TE_1, FFAR_TE_2, and FFAR_TE_3. Top edge fringe field amplifying regions in top edge pixel design 430_TE differ from the fringe field amplifying regions of pixel design 430 by including a top horizontal amplifying portion HAP_T. Top horizontal amplifying portion HAP_T extends above the top color dot to the left of the vertical amplifying portion of the top edge fringe field amplifying region. Specifically, as shown in FIG. 4(i), top edge fringe field amplifying regions FFAR_TE_1, FFAR_TE_2, and FFAR_TE_3 include top horizontal amplifying portion HAP_T_1, HAP_T_2, and HAP_T_3, that extend over color dots CD_1_1, CD_2_1, and CD_3_1, respectively. Top horizontal portions HAP_T_1, HAP_T_2, and HAP_T_3, which provide a region of opposite polarity above color dots CD_1_1, CD_2_1, and CD_3_1, enhance the fringe field of the color dots CD_1_1, CD_2_1, and CD_3_1, respectively.

In FIG. 4(j), bottom edge pixel design 430_BE uses a modified fringe field amplifying region FFAR. For clarity, the fringe field amplifying regions in FIG. 4(j) are referred to as bottom edge fringe field amplifying regions and labeled FFAR_BE_1, FFAR_BE_2, and FFAR_BE_3. Bottom edge fringe field amplifying regions in bottom edge pixel design 430_BE differ from the fringe field amplifying regions of pixel design 430 by including a bottom horizontal amplifying portion HAP_B. Bottom horizontal amplifying portion HAP_B extends below the bottom color dot to the left of the vertical amplifying portion of the bottom edge fringe field amplifying region. Specifically, as shown in FIG. 4(j), bottom edge fringe field amplifying regions FFAR_BE_1, FFAR_BE_2, and FFAR_BE_3 include top horizontal amplifying portion HAP_B_1, HAP_B_2, and HAP_B_3, that extend below color dots CD_1_2, CD_2_2, and CD_3_2, respectively. Bottom horizontal portions HAP_B_1, HAP_B_2, and HAP_B_3, which provide a region of opposite polarity below color dots CD_1_2, CD_2_2, and CD_3_2, enhance the fringe field of the color dots CD_1_2, CD_2_2, and CD_3_2, respectively.

Figure 4K:
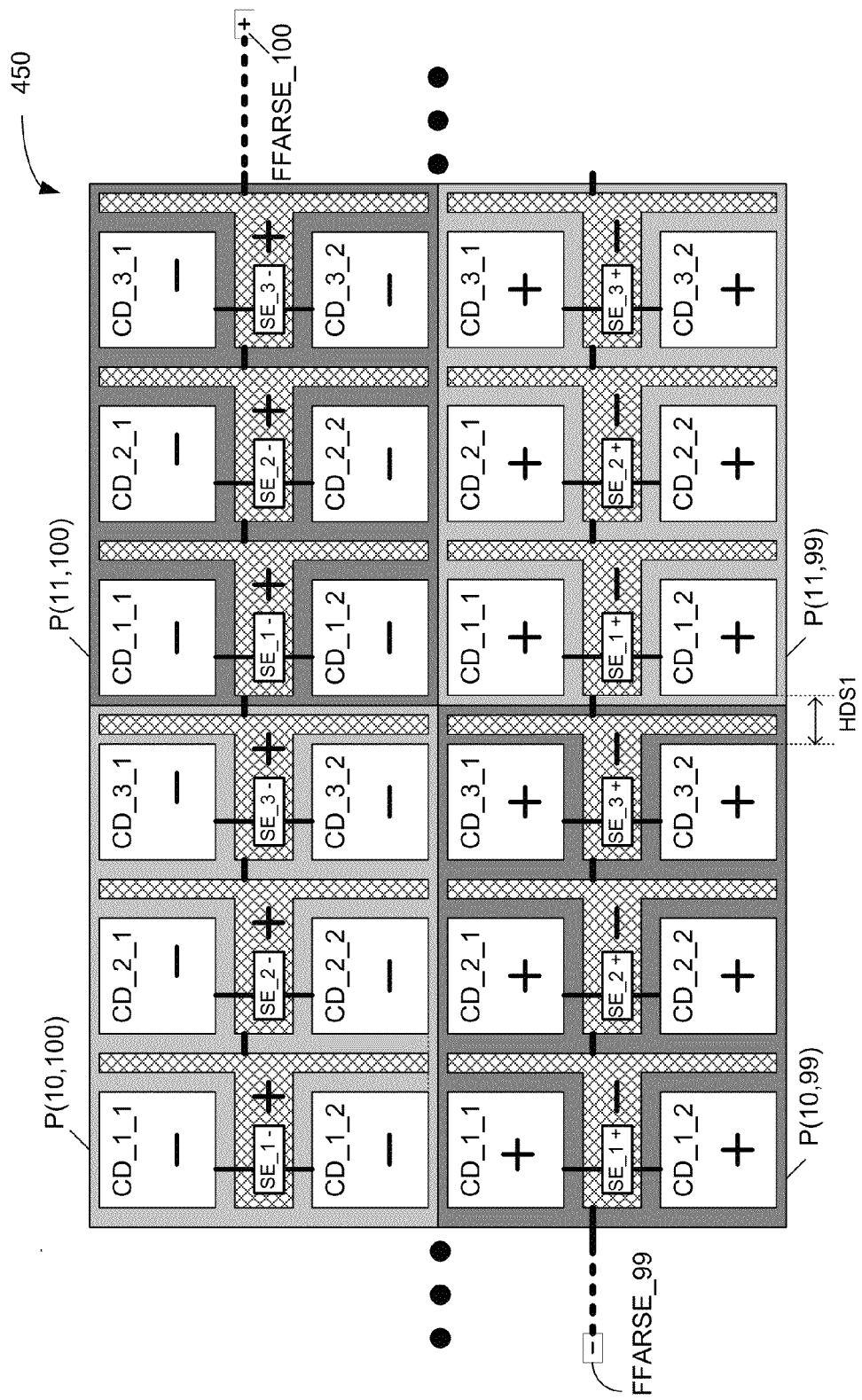
Figure 4I:
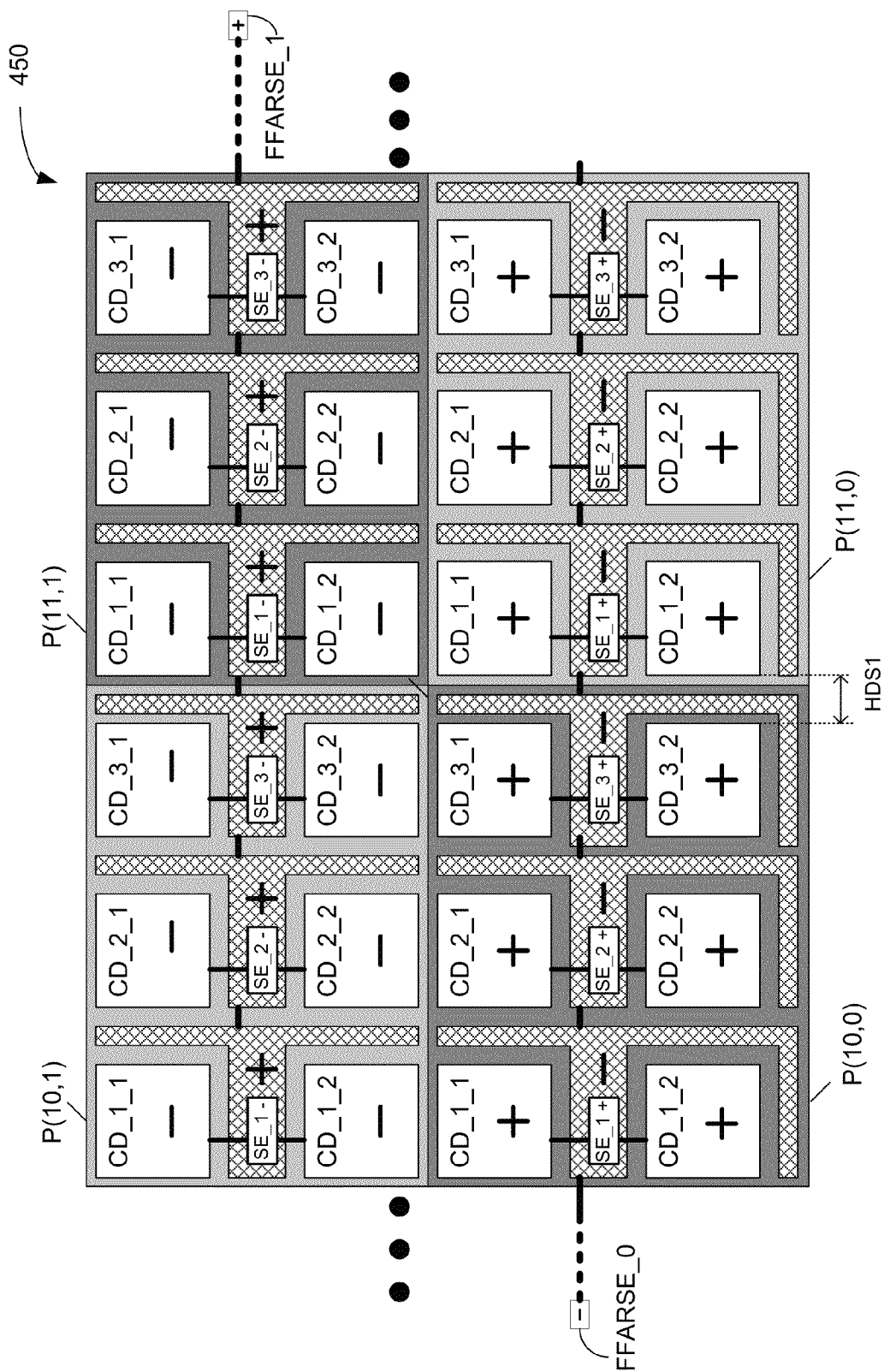
Figure 4M:
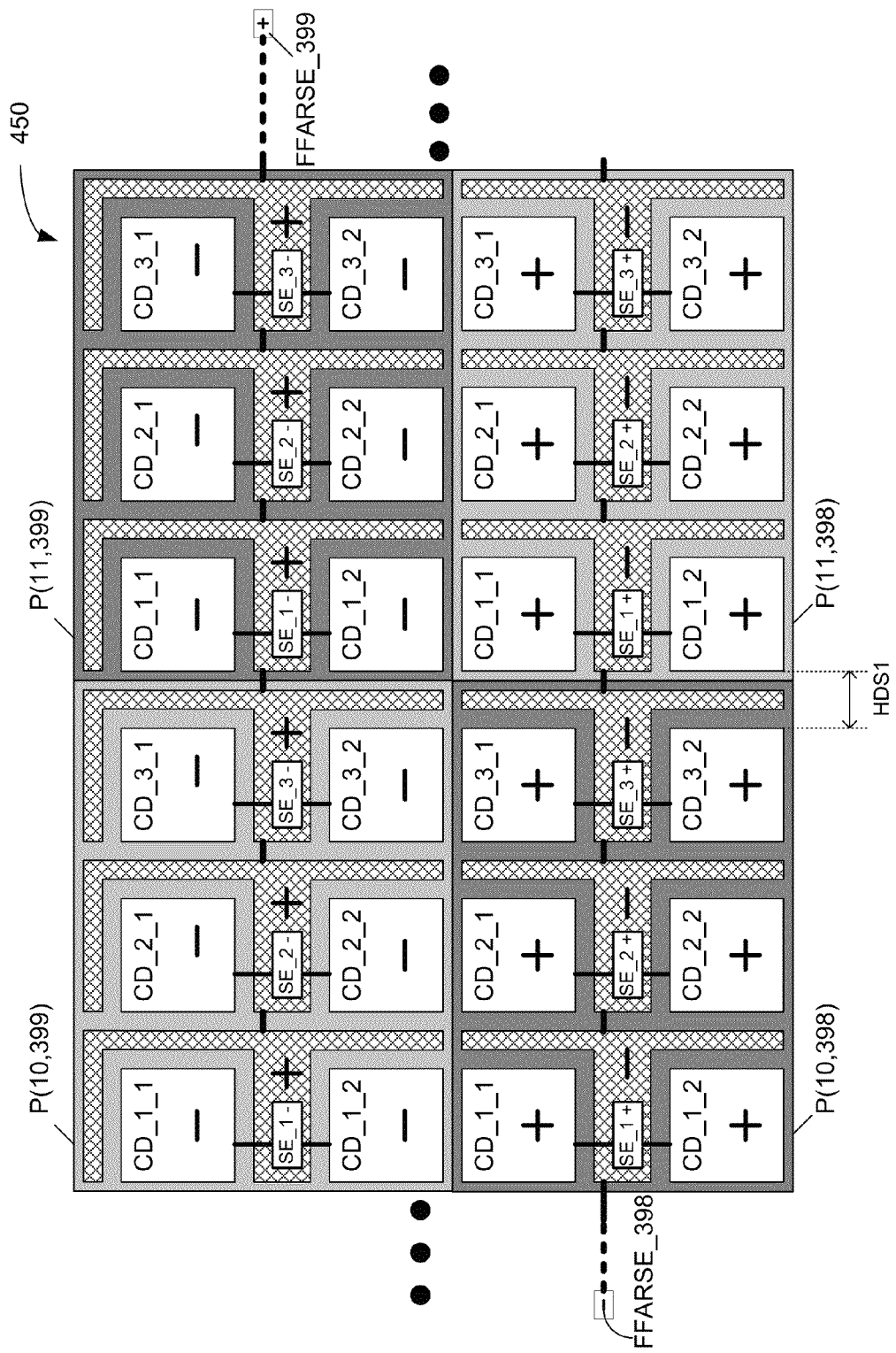

FIGS. 4(k)-4(m) illustrate different portions of a display 450 that uses pixel design 430 for most pixels, top edge pixel design 430_TE for pixels at the top of the display, and bottom edge pixel design 430_BE for pixels at the bottom of the display. Specifically, display 450 includes 400 rows (numbered 0 to 399). FIG. 4(k) illustrates pixels on row 99 and row 100 (pixels on rows 1 to 398 would be similar) for column 10 and column 11 (i.e., the general pixel of the display); FIG. 4(l) illustrate rows 0 and row 1 (i.e. the bottom edge of the display) for column 10 and column 11; and FIG. 4(m) illustrates pixels on rows 398 and 399 for column 10 and column 11 (i.e. the top edge of the display).

Specifically, FIG. 4(k) shows a portion of display 450 using pixels P(10, 99), P(11, 99), P(10, 100), and P(11, 100) of pixel design 430 with a switching element row inversion driving scheme. Each row of pixels would extend to the right and to the left. In a specific embodiment of display 450, each row contains 640 pixels. For clarity, the gate lines and source lines that control the switching elements are omitted in FIGS. 4(k), 4(l), and 4(m). The gate lines and source lines for display 450 would be identical to the gate line and source lines of display 420 as illustrated in FIG. 4(e). Furthermore, to better illustrate each pixel, the area of each pixel is shaded; this shading is only for illustrative purposes in FIG. 4(k) and has no functional significance. Like in display 420, the pixels of display 450 are arranged so that all pixels in a row have the same dot polarity pattern (positive or negative) and each successive row should alternate between positive and negative dot polarity pattern. Thus, pixels P(10, 99) and P(11, 99) in the $100^{th}$ row (i.e. row 99 because rows numbering starts at row j) have positive dot polarity pattern and pixels P(10, 100) and P(11, 100) in the 101st row (i.e. row 100) have the negative dot polarity pattern. However, at the next frame the pixels will switch dot polarity patterns. Thus in general a pixel P(x, y) has a first dot polarity pattern when y is even and a second dot polarity pattern when y is odd.

Because display 450 is very similar to display 440, only the differences between display 450 and display 440 are described. Specifically, display 450 differs from display 440 by having pixels using bottom edge pixel design 430_BE in row 0 as illustrated in FIG. 4(l) and pixels using top edge pixel design 430_BE in row 399 as illustrated in FIG. 4(k). Thus no differences are shown in FIG. 4(k), which does not illustrate the top or bottom edge of display 450.

FIG. 4(l) shows a portion of display 450 using pixels P (10, 0), P (11, 0) of bottom edge pixel design 430_BE and pixels P (10, 1), and P (11, 1) of pixel design 430. Each row of pixels would extend to the right and left. To better illustrate each pixel, the area of each pixel is shaded; this shading is only for illustrative purposes in FIG. 4(l) and has no functional significance. As explained above, the pixels of display 450 are arranged so that all pixels in a row have the same dot polarity pattern (positive or negative) and each successive row should alternate between positive and negative dot polarity pattern. Thus, pixels P(10, 0) and P(11, 0) in the first row (i.e. row 0) have positive dot polarity pattern and pixels P(10, 1) and P(11, 1) in the second row (i.e. row 1) have the negative dot polarity pattern. However, at the next frame the pixels will switch dot polarity patterns. By using bottom edge pixel design 430_BE for the pixels of the bottom row (i.e. row 0) in display 450, the performance of the color dots at the bottom of display 450 are improved due to the amplification of the fringe fields in the color dots by the bottom horizontal amplifying portion HAP_B (see FIG. 4(j)).

FIG. 4(m) shows a portion of display 450 using pixels P (10, 399), P (11, 399) of top edge pixel design 430_TE and pixels P (10, 398), and P (11, 398) of pixel design 430. Each row of pixels would extend to the left and to the right. To better illustrate each pixel, the area of each pixel is shaded; this shading is only for illustrative purposes in FIG. 4(m) and has no functional significance. As explained above, the pixels of display 450 are arranged so that all pixels in a row have the same dot polarity pattern (positive or negative) and each successive row should alternate between positive and negative dot polarity pattern. Thus, pixels P(10, 398) and P(11, 398) in row 398 have positive dot polarity pattern and pixels P(10, 399) and P(11, 399) in row 399 have the negative dot polarity pattern. However, at the next frame the pixels will switch dot polarity patterns. By using top edge pixel design 430_TE for the pixels of the top row (i.e. row 399) in display 450, the performance of the color dots at the top of display 450 are improved due to the amplification of the fringe fields in the color dots by the top horizontal amplifying portions HAP_T (see FIG. 4(i)).

Figure 4N:
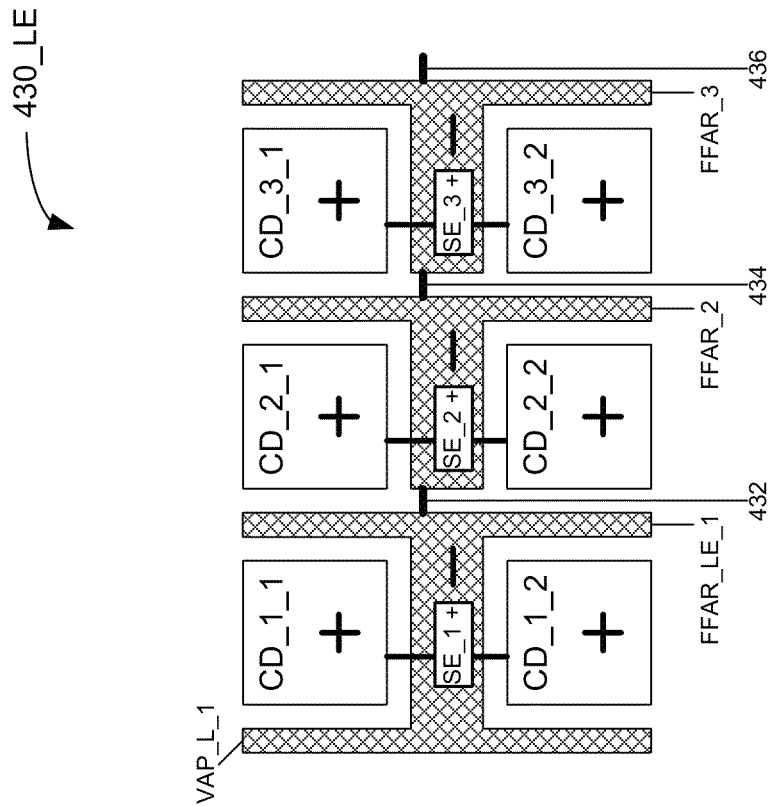

In addition to top edge pixel designs and bottom edge pixel designs, some embodiments of the present invention also include pixels using a left edge pixel design, which is a variant of the pixel design used for the non-edge pixels of the display. For example, FIG. 4(n) illustrates a left-edge pixel design 430_LE, which is a variation of pixel design 430. For brevity the description is not repeated and only the differences between the edge pixel designs and pixel design 430 are described.

Specifically, left edge pixel design 430_LE uses a modified fringe field amplifying region FFAR for the first color component. For clarity the fringe field amplifying region for the first color component in FIG. 4(n) is referred to as a left edge fringe field amplifying regions and labeled FFAR_LE_1. The fringe field amplifying regions for the second color component and the third color component in FIG. 4(n) are referred to simply as fringe field amplifying regions and labeled FFAR_2 and FFAR_3, respectively. The left edge fringe field amplifying region in left edge pixel design 430_LE differ from the fringe field amplifying regions of pixel design 430 by including a left vertical amplifying portion VAP_L. Left vertical amplifying portion VAP_T extends from the left side of horizontal amplifying region HAP (see FIG. 4(c)) and extends along the left side of the color dots. Specifically, as shown in FIG. 4(n), left edge fringe field amplifying regions FFAR_LE_1 include left vertical amplifying portion VAP_L_1 that extend along the left side of color dots CD_1_1 and CD_1_2. Left vertical portion VAP_L_1, which provides a region of opposite polarity to the left of color dots CD_1_1 and CD_1_2, enhance the fringe fields of the color dots CD_1_1 and CD_1_2.

Figure 4P:
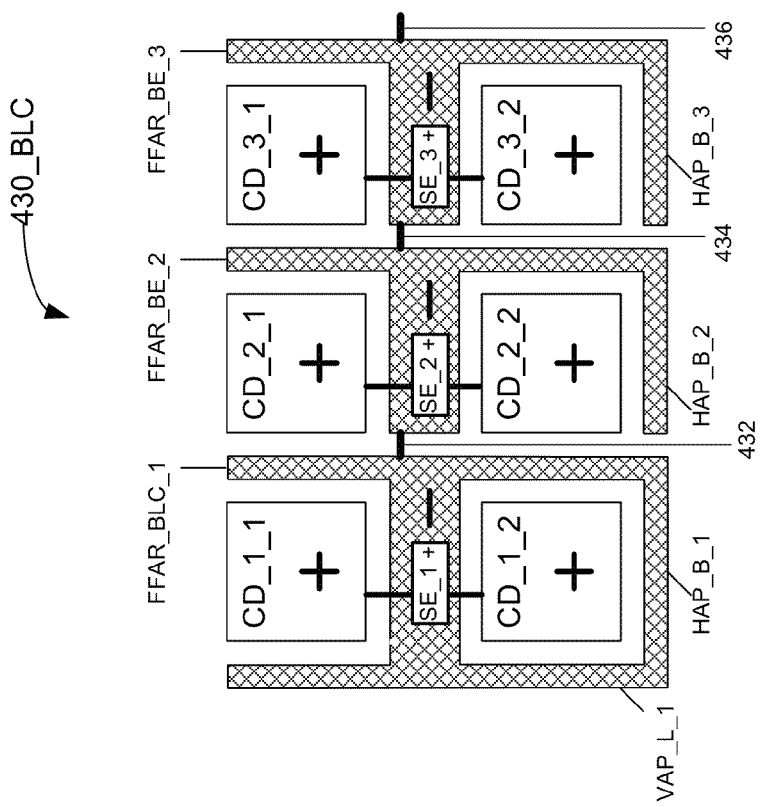
Figure 4O:
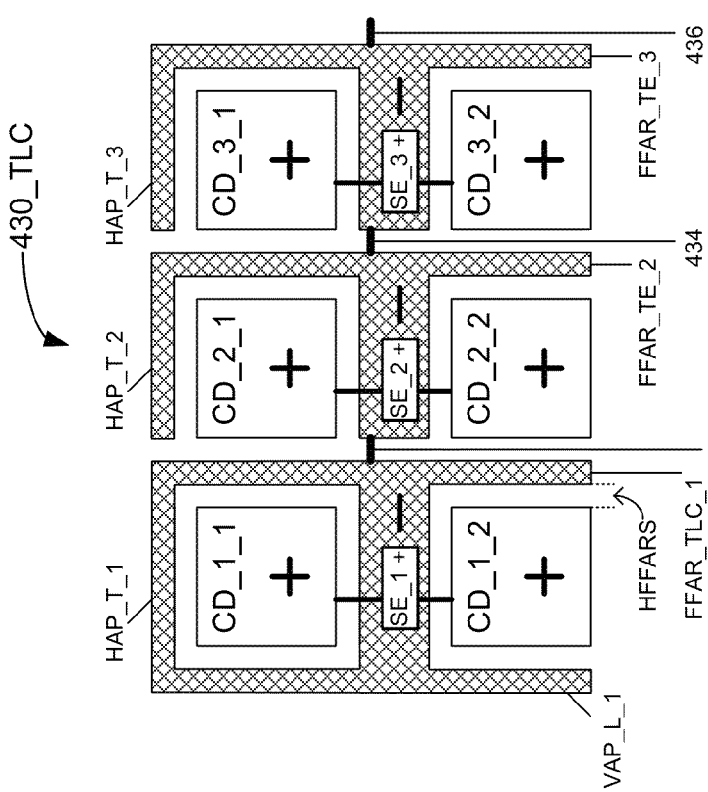

In some embodiments of the present invention, a display using pixels of top edge pixel designs, bottom edge pixel designs, and left edge pixel designs further include pixels using a top left corner pixel design and a bottom left corner pixel design, that are variants of the pixel design used for the non-edge pixels of the display. For example, FIGS. 4(o) and 4(p) illustrate a top left corner pixel design 430_TLC and a bottom left corner pixel design 430_BLC, respectively. Top left corner pixel design 430_TLC and bottom left corner pixel design 430_BLC are variations of top edge pixel design 430_TE and bottom edge pixel design 430_BE, respectively. For brevity the description is not repeated and only the differences between corner pixel designs and the edge pixel designs are described.

Specifically, top left corner pixel design 430_TLC uses a modified fringe field amplifying region FFAR for the first color component. For clarity the fringe field amplifying region for the first color component in FIG. 4(o) is referred to as a top left corner fringe field amplifying region and labeled FFAR_TLC_1. The fringe field amplifying regions for the second color component and the third color component in FIG. 4(o) are the same as the top edge fringe field amplifying regions in FIG. 4(i), and are thus referred to as top edge fringe field amplifying regions and labeled FFAR_TE_2 and FFAR_TE_3, respectively. The top left corner fringe field amplifying region in top left corner pixel design 430_TLC differ from the fringe field amplifying regions of pixel design 430 by including a left vertical amplifying portion VAP_L and a top horizontal amplifying portion HAP_T. Top horizontal amplifying portion HAP_T extends leftward from the top of vertical amplifying region VAP (see FIG. 4(c)) and extends over the top side of color dot CD_1_1. Left vertical amplifying portion VAP_L extends down from the left edge of top horizontal portion HAP_T along the left side of the color dots. Specifically, as shown in FIG. 4(o), top left corner fringe field amplifying region FFAR_TLC_1 includes a top horizontal amplifying portion HAP_T_1 that extends along the top side of color CD_1_1. Top horizontal amplifying portion HAP_T_1, which provides a region of opposite polarity for the top side of color dot CD_1_1, enhances the fringe field of color dot CD_1_1. Top left corner fringe field amplifying region FFAR_TLC_1 also includes a left vertical amplifying portion VAP_L_1 that extend along the left side of color dots CD_1_1 and CD_1_2. Left vertical portion VAP_L_1, which provides a region of opposite polarity to the left of color dots CD_1_1 and CD_1_2, enhance the fringe fields of the color dots CD_1_1 and CD_1_2.

Bottom left corner pixel design 430_BLC uses a modified fringe field amplifying region FFAR for the first color component. For clarity the fringe field amplifying region for the first color component in FIG. 4(p) is referred to as a bottom left corner fringe field amplifying region and labeled FFAR_BLC_1. The fringe field amplifying regions for the second color component and the third color component in FIG. 4(p) are the same as the bottom edge fringe field amplifying regions in FIG. 4(j) and are thus referred to as bottom edge fringe field amplifying regions and labeled FFAR_BE_2 and FFAR_BE_3, respectively. The bottom left corner fringe field amplifying region in bottom left corner pixel design 430_BLC differ from the fringe field amplifying regions of pixel design 430 by including a left vertical amplifying portion VAP_L and a bottom horizontal amplifying portion HAP_B. Bottom horizontal amplifying portion HAP_B extends leftward from the bottom of vertical amplifying region VAP (see FIG. 4(c)) and extends under the bottom side of color dot CD_1_2. Left vertical amplifying portion VAP_L extends up from the left edge of bottom horizontal portion HAP_T along the left side of the color dots. Specifically, as shown in FIG. 4(o), bottom left corner fringe field amplifying region FFAR_BLC_1 includes a bottom horizontal amplifying portion HAP_B_1 that extends along the bottom side of color CD_1_2. Bottom horizontal amplifying portion HAP_B_1, which provides a region of opposite polarity for the bottom side of color dot CD_1_2, enhances the fringe field of color dot CD_1_2. Bottom left corner fringe field amplifying region FFAR_BLC_1 also includes a left vertical amplifying portion VAP_L_1 that extend along the left side of color dots CD_1_1 and CD_1_2. Left vertical portion VAP_L_1, which provides a region of opposite polarity to the left of color dots CD_1_1 and CD_1_2, enhance the fringe fields of the color dots CD_1_1 and CD_1_2.

Figure 4Q:
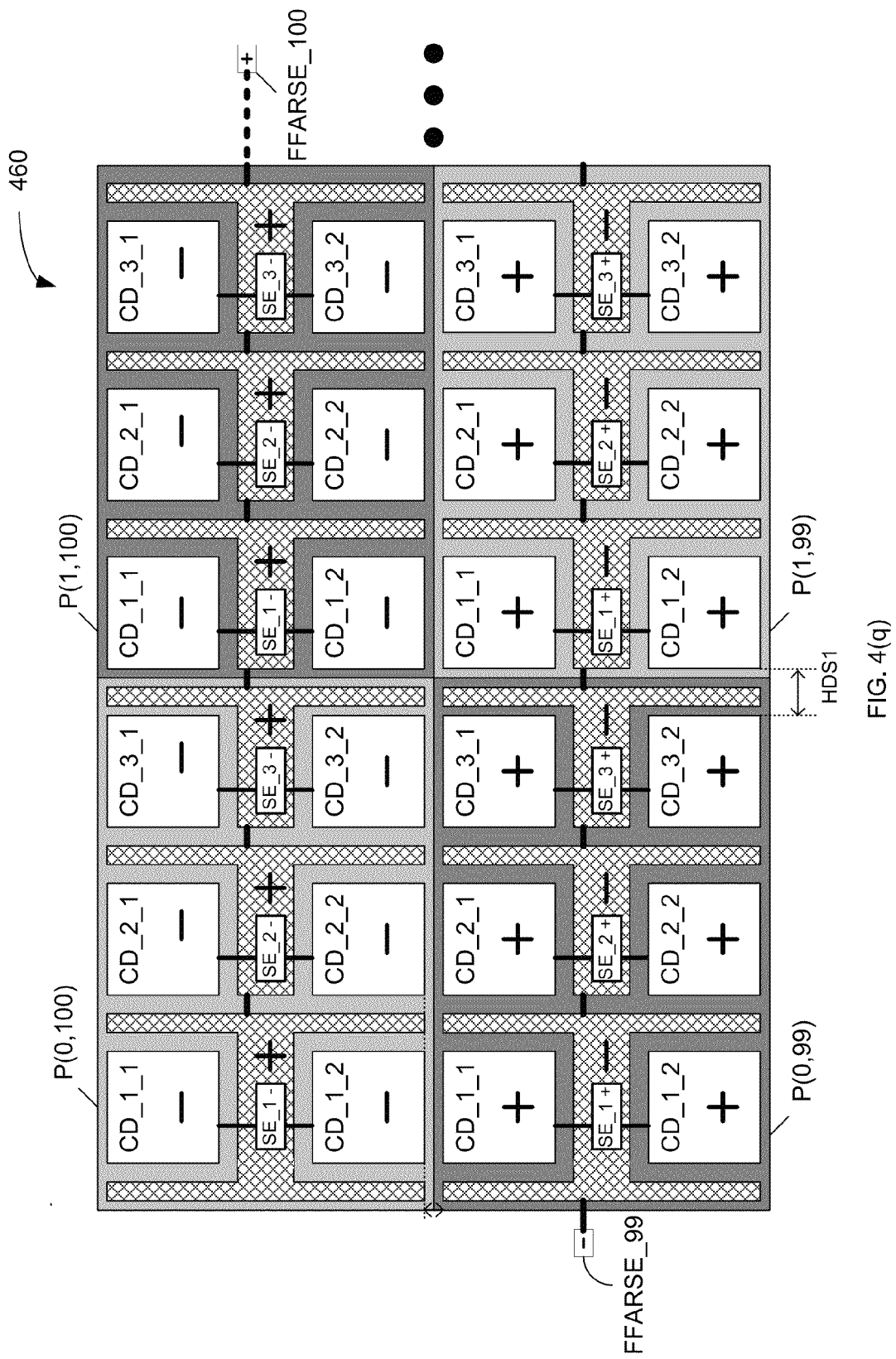
Figure 4R:
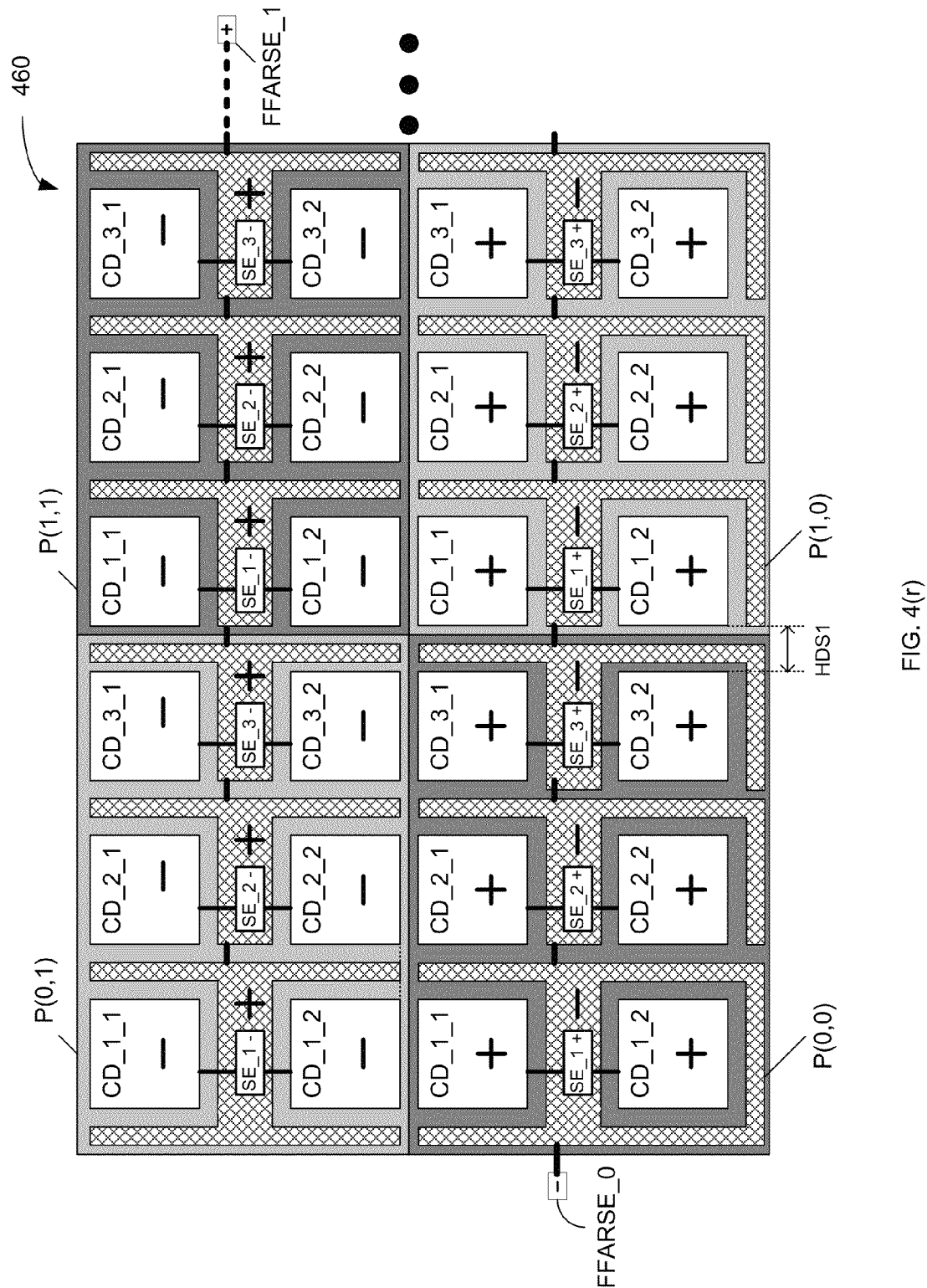
Figure 4S:
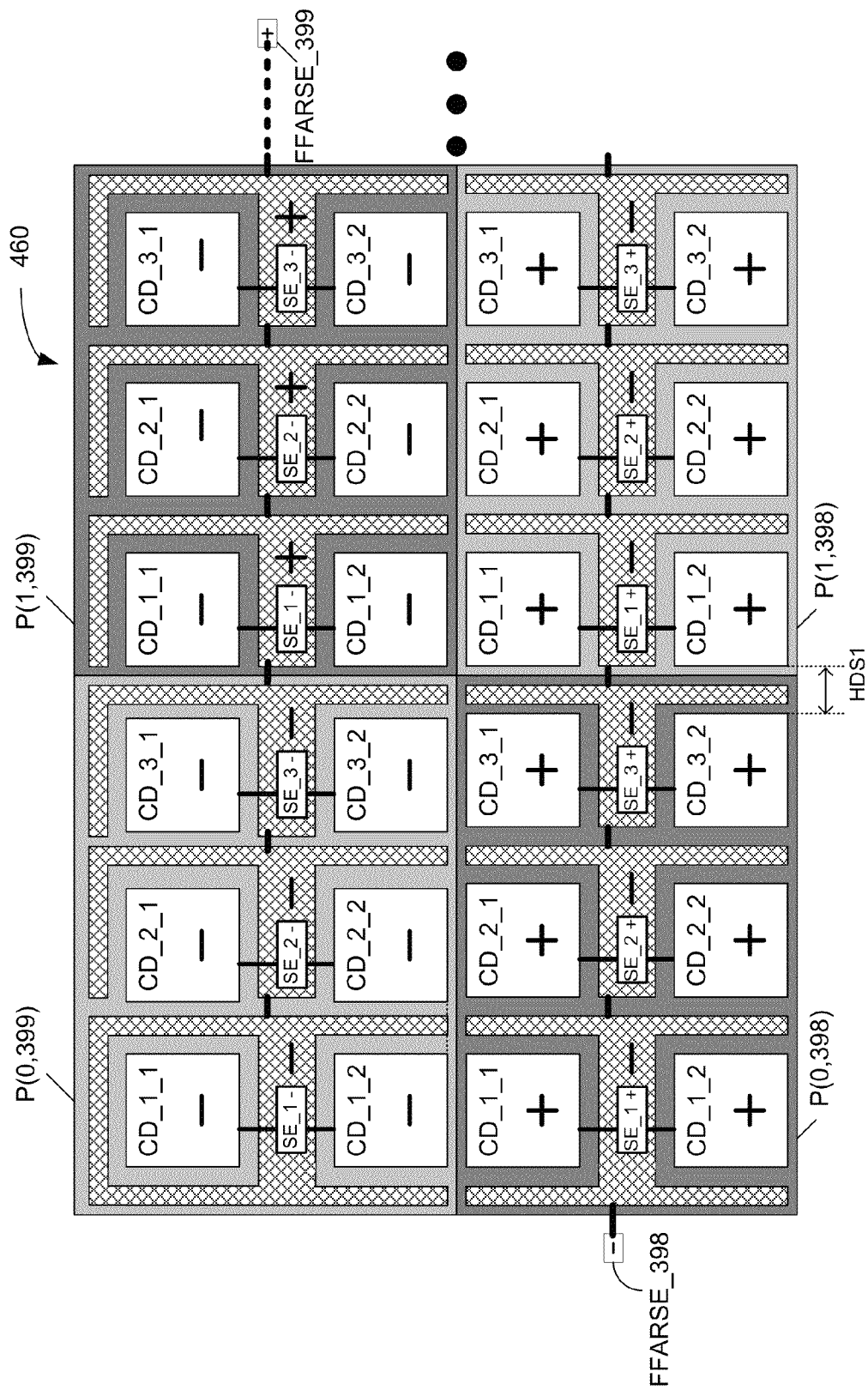

FIGS. 4(q)-4(s) illustrate different portions of a display 460 that uses pixel design 430 for most pixels, top edge pixel design 430_TE for pixels at the top edge of the display, bottom edge pixel design 430_BE for pixels at the bottom edge of the display, left edge pixel design 430_LE for pixels at the left edge of the display, top left corner pixel design 430_TLC for the pixel at the top left corner of the display, and bottom left corner pixel design 430_BLC for the pixel at the bottom left of the display. Specifically, display 460 includes 400 rows (numbered 0 to 399). FIG. 4(q) illustrates pixels on row 99 and row 100 (pixels on rows 1 to 398 would be similar) for column 0 and column 1 of the display; FIG. 4(r) illustrate rows 0 and row 1 (i.e. the bottom edge of the display) for column 0 and column 1 of the display; and FIG. 4(s) illustrates pixels on rows 398 and 399 for column 0 and column 1 of the display (i.e. the top edge of the display). The other columns of display 460 would be the same as display 450 as shown in FIGS. 4(k)-4(m). Display 460 uses switching element row inversion driving scheme.

Specifically, FIG. 4(q) shows a portion of display 460 using pixels P(0, 99), P(1, 99), P(0, 100), and P(1, 100). Pixels P(0, 99) and P(0, 100) use left edge pixel design 430_LE while Pixels P(1, 99) and P(1, 100) us pixel design 430. Each row of pixels would extend to the right using pixels of pixel design 430. In a specific embodiment of display 460, each row contains 640 pixels. For clarity, the gate lines and source lines that control the switching elements are omitted in FIGS. 4(q), 4(r), and 4(s). The gate lines and source lines for display 460 would be identical to the gate line and source lines of display 420 as illustrated in FIG. 4(e). Furthermore, to better illustrate each pixel, the area of each pixel is shaded; this shading is only for illustrative purposes in FIG. 4(q) and has no functional significance. Like in display 420, the pixels of display 460 are arranged so that all pixels in a row have the same dot polarity pattern (positive or negative) and each successive row should alternate between positive and negative dot polarity pattern. Thus, pixels P(0, 99) and P(1, 99) in the 100$^{th}$ row (i.e. row 99 because rows numbering starts at row 0) have positive dot polarity pattern and pixels P(0, 100) and P(1, 100) in the 101st row (i.e. row 100) have the negative dot polarity pattern. However, at the next frame the pixels will switch dot polarity patterns. Thus in general a pixel P(x, y) has a first dot polarity pattern when y is even and a second dot polarity pattern when y is odd.

Because display 460 is very similar to display 450, only the differences between display 460 and display 450 are described. Specifically, display 460 differs from display 450 by having pixels using left edge pixel design 430_LE in column 0 as illustrated in FIG. 4(q) except for pixel P(0,399) (i.e. the top right corner) which uses top left corner pixel design 430_TLC (as illustrated in FIG. 4(r)), and pixel P(0, 0) (i.e. the bottom left corner) which uses bottom left corner pixel design 430_BLC (as illustrated in FIG. 4(s)).

FIG. 4(r) shows a portion of display 460 having pixel P (0, 0) of bottom left corner pixel design 430_BLC, pixel P (1, 0) of bottom edge pixel design 430_BE, pixel P(0, 1) of left edge pixel design 430_LE, and P (1, 1) of pixel design 430. Each row of pixels would extend to the right. To better illustrate each pixel, the area of each pixel is shaded; this shading is only for illustrative purposes in FIG. 4(r) and has no functional significance. As explained above, the pixels of display 460 are arranged so that all pixels in a row have the same dot polarity pattern (positive or negative) and each successive row should alternate between positive and negative dot polarity pattern. Thus, pixels P(0, 0) and P(1, 0) in the first row (i.e. row 0) have positive dot polarity pattern and pixels P(0, 1) and P(1, 1) in the second row (i.e. row 1) have the negative dot polarity pattern. However, at the next frame the pixels will switch dot polarity patterns. By using bottom left corner pixel design 430_BLC, for pixel P(0,0) are improved due to the amplification of the fringe fields in the color dots in pixel P(0,0). Furthermore, by using bottom edge pixel design 430_BE the performance of the color dots at the bottom of display 460 are improved due to the amplification of the fringe fields in the color dots.

FIG. 4(s) shows a portion of display 460 using pixel P(0, 399) of top left corner pixel design 430_TLC, P (1, 399) of top edge pixel design 430_TE, pixel P(0, 398) of left edge pixel design 430_LE, and P(1, 398) of pixel design 430. Each row of pixels would extend to the right. To better illustrate each pixel, the area of each pixel is shaded; this shading is only for illustrative purposes in FIG. 4(s) and has no functional significance. As explained above, the pixels of display 460 are arranged so that all pixels in a row have the same dot polarity pattern (positive or negative) and each successive row should alternate between positive and negative dot polarity pattern. Thus, pixels P(0, 398) and P(1, 398) in row 398 have positive dot polarity pattern and pixels P(0, 399) and P(1, 399) in row 399 have the negative dot polarity pattern. However, at the next frame the pixels will switch dot polarity patterns. By using top left corner pixel design 430_TLC for pixel P(0, 399), the performance of the color dots in pixel P(0,399) are improved due to the amplification of the fringe fields in the color dots in pixel P(0,399). Furthermore, by using top edge pixel design 430_TE for the pixels of the top row (i.e. row 399) in display 460, the performance of the color dots at the top of display 450 are improved due to the amplification of the fringe fields in the color dots.

As in display 440 (described above), due to the switching of polarities on each row in display 460, if a color dot has the first polarity, any neighboring polarized components have the second polarity. For example, color dot CD_3_2 of pixel P(0, 1) has negative polarity while, color dot CD_3_1 of pixel P(0, 0), fringe field amplifying regions FFAR_2 and FFAR_3 of pixel P(0, 1) have positive polarity. In a particular embodiment of the present invention, each color dot has a width of 40 micrometers and a height of 60 micrometers. Each fringe field amplifying region has a vertical amplifying portion width of 5 micrometers, a vertical amplifying portion height of 145 micrometers, a horizontal amplifying portion width of 45 micrometers, a horizontal amplifying height of 5 micrometers. Horizontal dot spacing HDS1 is 15 micrometers, vertical dot spacing VDS1 is 25 micrometers, horizontal fringe field amplifying spacing HFFARS is 5 micrometers, and vertical fringe field amplifying spacing VFFARS is 5 micrometers.

Figures 5A, 5B:
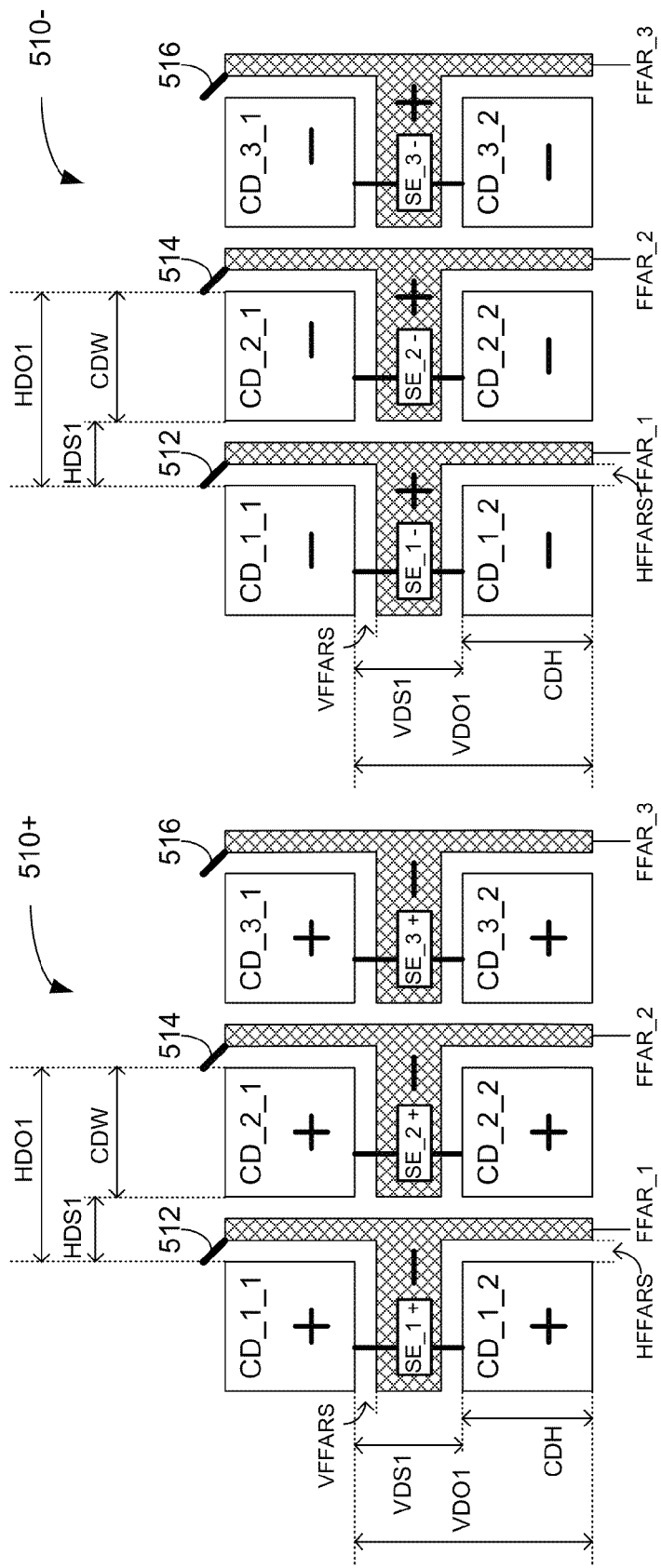
FIGS. 5(*a*)-5(*b*) illustrate a pixel design in accordance with one embodiment of the present invention.
Figure 5C:
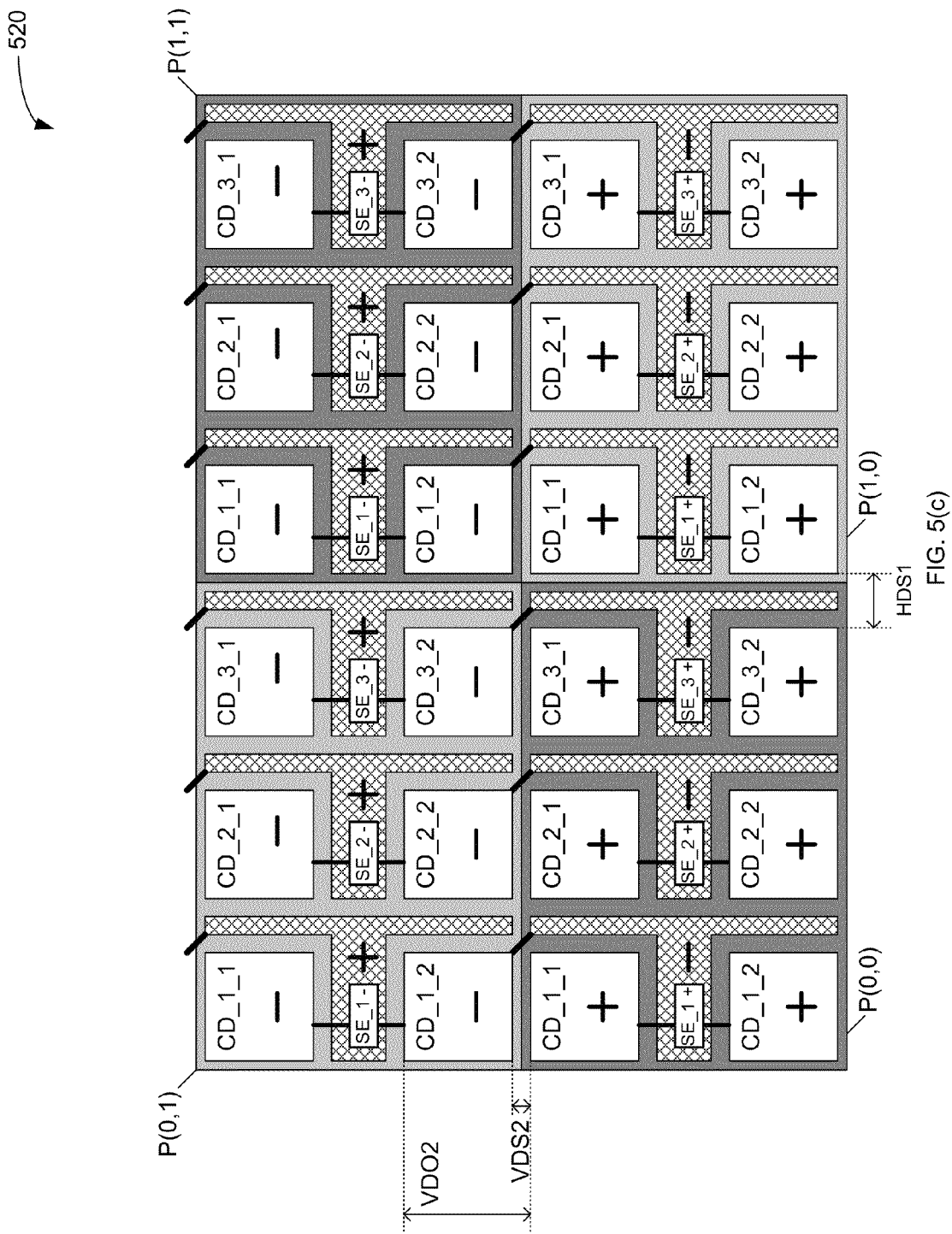

FIGS. 5(a) and 5(b) show different dot polarity patterns of a pixel design 510 (labeled 510+ and 510−) that is a variant of pixel design 410. Because the layout and polarity of the color dots, the switching elements, and the fringe field amplifying region are the same in pixel design 510 and pixel design 410 the description is not repeated. The primary difference between pixel design 510 and pixel design 410 is that pixel design 510 includes conductor to facilitate coupling the fringe field amplifying regions to switching elements in other pixels. Specifically, a conductor 512 of a current pixel would couple the electrode of fringe field amplifying region FFAR_1 to switching element SE_1 (see FIG. 5(c)) of a pixel above the current pixel. The connection to the switching element would be via the electrodes of the color dots of the pixel above the current pixel. Similarly, a conductor 514 of a current pixel would couple the electrode of fringe field amplifying region FFAR_2 to switching element SE_2 (see FIG. 5(c)) of a pixel above the current pixel. The connection to the switching element would be via the electrodes of the color dots of the pixel above the current pixel. A conductor 516 of a current pixel would couple the electrode of fringe field amplifying region FFAR_3 to switching element SE_3 (see FIG. 5(c)) of a pixel above the current pixel. The connection to the switching element would be via the electrodes of the color dots of the pixel above the current pixel.

These connections are better shown in FIG. 5(c), which shows a portion of display 520 using pixels P(0, 0), P(1, 0), P(0, 1), and P(1, 1) of pixel design 510 with a switching element row inversion driving scheme. Display 520 could have thousands of rows with thousand of pixels on each row. The rows and columns would continue from the portion shown in FIG. 5(c) in the manner shown in FIG. 5(c). For clarity, the gate lines and source lines that control the switching elements are omitted in FIG. 5(c). The gate lines and source lines for display 520 would be identical to the gate line and source lines of display 420 as illustrated in FIG. 4(e) except that display 520 does not include use fringe field amplifying region switching elements. Furthermore, to better illustrate each pixel, the area of each pixel is shaded; this shading is only for illustrative purposes in FIG. 5(c) and has no functional significance. Like in display 420, the pixels of display 520 are arranged so that all pixels in a row have the same dot polarity pattern (positive or negative) and each successive row should alternate between positive and negative dot polarity pattern. Thus, pixels P(0, 0) and P(1, 0) in the first row (i.e. row 0) have positive dot polarity pattern and pixels P(0, 1) and P(1, 1) in the second row (i.e. row 1) have the negative dot polarity pattern. However, at the next frame the pixels will switch dot polarity patterns. Thus in general a pixel P(x, y) has a first dot polarity pattern when y is even and a second dot polarity pattern when y is odd. Because display 520 is very similar to display 420, only the differences between display 520 and display 420 are described. Specifically, due to the inclusion of internal conductors 512, 514, and 516 in pixel design 520, display 520 does not include fringe field amplifying region electrodes or fringe field amplifying region switching elements. Instead the fringe field amplifying regions of a first pixel receive voltage polarity and voltage magnitude from a second pixel. Specifically, the second pixel is the pixel above the first pixel. For example, the electrodes of fringe field amplifying region FFAR_1 of pixel P(0, 0) is coupled to switching elements SE_1 of pixel P(0, 1) via the electrodes of color dots CD_1_2 of pixel P(0, 1). Similarly, the electrodes of fringe field amplifying regions FFAR_2 and FFAR_3 of pixel P(0, 0) are coupled to switching elements SE_2, and SE_3 of pixel P(0, 1) via color dots CD_2_2, and CD_3_2 of pixel P(0, 1), respectively.

Due to the switching of polarities on each row in display 520, if a color dot has the first polarity, any neighboring polarized components have the second polarity. For example, color dot CD_3_2 of pixel P(0, 1) has negative polarity while, color dot CD_3_1 of pixel P(0, 0), fringe field amplifying regions FFAR_2 and FFAR_3 of pixel P(0, 1) have positive polarity. In a particular embodiment of the present invention, each color dot has a width of 40 micrometers and a height of 60 micrometers. Each fringe field amplifying region has a vertical amplifying portion width of 5 micrometers, a vertical amplifying portion height of 145 micrometers, a horizontal amplifying portion width of 45 micrometers, a horizontal amplifying height of 5 micrometers. Horizontal dot spacing HDS1 is 15 micrometers, vertical dot spacing VDS1 is 25 micrometers, horizontal fringe field amplifying spacing HFFARS is 5 micrometers, and vertical fringe field amplifying spacing VFFARS is 5 micrometers.

Variants of pixel design 510 such as a bottom edge pixel design, a top edge pixel design, a left edge pixel design, a top left corner picture design, and a bottom left corner pixel design can be created using the various fringe field amplifying regions described above. These variants would be used in a similar manner as described above with respect to display 450 and display 460.

FIGS. 6(a) and 6(b) show different dot polarity patterns of a pixel design 610 (labeled 610+ and 610− as described below) that can be used in displays having a switching element row inversion driving scheme. In actual operation a pixel will switch between a first dot polarity pattern and a second dot polarity pattern between each image frame. Specifically, in FIG. 6(a), pixel design 610 has a positive dot polarity pattern (and is thus labeled 610+) and in FIG. 6(b), pixel design 610 has a negative dot polarity pattern (and is thus labeled 610−). Furthermore, the polarity of each polarized component in the various pixel designs are indicated with "+" for positive polarity or "−" for negative polarity.

Pixel design 610 has three color components CC_1, CC_2 and CC_3. Each of the three color components includes two color dots. Pixel design 610 also includes a switching element (referenced as SE_1, SE_2, and SE_3) for each color component and a fringe field amplifying region (referenced as FFAR_1, FFAR_2, and FFAR_3) for each color component. Switching elements SE_1, SE_2, and SE_3 are arranged in a row. Device component areas DCA_1, DCA_2, and DCA_3 are defined around switching element SE_1, SE_2, and SE_3. Device component areas DCA_1, DCA_2, and DCA_3 have a device component area height DCAH and a device component width DCAW.

First color component CC_1 of pixel design 610 has two color dots CD_1_1 and CD_1_2. Color dots CD_1_1 and CD_1_2 form a column and are separated by a vertical dot pacing VDS1. In other words, color dots CD_1_1 and CD_1_2 are horizontally aligned and vertically separated by vertical dot spacing VDS1. Furthermore, color dots CD_1_1 and CD_1_2 are vertically offset by vertical dot offset VDO1 which is equal to vertical dot spacing VDS1 plus the color dot height CDH. As illustrated by the connection between color dots CD_1_1 and CD_1_2, in some embodiments of the present invention the electrodes of color dot CD_1_1 and CD_1_2 are coupled together in the same process steps as the formation of the electrodes. Device component area DCA_1 is located below color dot CD_1_2 and separated from color dot CD_1_2 by a vertical dot spacing VDS2. Switching element SE_1 is located within device component area DCA_1.

Thus, color dot CD_1_2 is located between color dot CD_1_1 and switching element SE_1. Switching element SE_1 is coupled to the electrodes of color dots CD_1_1 and CD_1_2 to control the voltage polarity and voltage magnitude of color dots CD_1_1 and CD_1_2.

Similarly, second color component CC_2 of pixel design 610 has two color dots CD_2_1 and CD_2_2. Color dots CD_2_1 and CD_2_2 form a second column and are separated by a vertical dot spacing VDS1. Thus, color dots CD_2_1 and CD_2_2 are horizontally aligned and vertically separated by vertical dot spacing VDS1. Device component area DCA_2 is located below color dot CD_2_2 and separated from color dot CD_1_2 by vertical dot spacing VDS2. Switching element SE_2 is located within device component area DCA_2. Switching element SE_2 is coupled to the electrodes of color dots CD_2_1 and CD_2_2 to control the voltage polarity and voltage magnitude of color dots CD_2_1 and CD_2_2. Second color component CC_2 is vertically aligned with first color component CC_1 and separated from color component CC_1 by a horizontal dot spacing HDS1, thus color components CC_2 and CC_1 are horizontally offset by a horizontal dot offset HDO1, which is equal to horizontal dot spacing HDS1 plus the color dot width CDW. Specifically with regards to the color dots, color dot CD_2_1 is vertically aligned with color dots CD_1_1 and horizontally separated by horizontal dot spacing HDS1. Similarly, color dot CD_2_2 is vertically aligned with color dots CD_2_1 and horizontally separated by horizontal dot spacing HDS1. Thus color dot CD_1_1 and color dot CD_2_1 form a first row of color dots and color dot CD_1_2 and color dot CD_2_2 form a second row of color dots.

Similarly, third color component CC_3 of pixel design 610 has two color dots CD_3_1 and CD_3_2. Color dots CD_3_1 and CD_3_2 form a third column and are separated by a vertical dot spacing VDS1. Thus, color dots CD_3_1 and CD_3_2 are horizontally aligned and vertically separated by vertical dot spacing VDS1. Device component area DCA_3 is located below color dot CD_3_2 and separated from color dot CD_3_2 by a vertical dot spacing VDS2. Switching element SE_3 is located within device component area DCA_3. Switching element SE_3 is coupled to the electrodes of color dots CD_3_1 and CD_3_2 to control the voltage polarity and voltage magnitude of color dots CD_3_1 and CD_3_2. Third color component CC_3 is vertically aligned with second color component CC_2 and separated from color component CC_2 by horizontal dot spacing HDS1, thus color components CC_3 and CC_2 are horizontally offset by a horizontal dot offset HDO1. Specifically with regards to the color dots, color dot CD_3_1 is vertically aligned with color dots CD_2_1 and horizontally separated by horizontal dot spacing HDS1. Similarly, color dot CD_3_2 is vertically aligned with color dots CD_2_2 and horizontally separated by horizontal dot spacing HDS1. Thus color dot CD_3_1 is on the first row of color dots and color dot CD_3_2 is on the second row of color dots.

Pixel design 610 also includes fringe field amplifying regions FFAR_1, FFAR_2, and FFAR_3. The fringe field amplifying regions of FIGS. 6(*a*)-6(*b*) have the same basic shape as the fringe field amplifying regions of FIG. 4(*a*)-4(*b*). Thus the same nomenclature (i.e. horizontal amplifying portion HAP and vertical amplifying portion VAP are used again.)

As shown in FIG. 6(*a*), fringe field amplifying regions FFAR_1, FFAR_2, and FFAR_3 are placed in between the color dots of pixel design 610. Specifically, fringe field amplifying region FFAR_1 is placed so that the horizontal amplifying portion of fringe field amplifying region FFAR_1 lies in between color dots CD_1_1 and CD_1_2 and is separated from color dots CD_1_1 and CD_1_2 by a vertical fringe field amplifying region spacing VFFARS. However, unlike fringe field amplifying regions of pixel design 410, the fringe field amplifying regions of pixel design 610 do not extend to the end of the left side of color dots CD_1_1 and CD_1_2 due to the interconnection between color dots CD_1_1 and CD_1_2. The vertical amplifying portion of fringe field amplifying region FFAR_1 is placed to the right of color dots CD_1_1 and CD_1_2 and is separated from color dots CD_1_1 and CD_1_2 by a horizontal fringe field amplifying region spacing HFFARS. Thus, fringe field amplifying region FFAR_1 extends along the bottom and the right side of color dot CD_1_1 and along the top and right side of color dot CD_1_2. Furthermore, this placement also causes the vertical amplifying portion of fringe field amplifying region FFAR_1 to be in between color dots CD_1_1 and CD_2_1 and in between color dots CD_1_2 and CD_2_2.

Similarly, fringe field amplifying region FFAR_2 is placed so that the horizontal amplifying portion of fringe field amplifying region FFAR_2 lies in between color dots CD_2_1 and CD_2_2 and is separated from color dots CD_2_1 and CD_2_2 by a vertical fringe field amplifying region spacing VFFARS. The vertical amplifying portion of fringe field amplifying region FFAR_2 is placed to the right of color dots CD_2_1 and CD_2_2 and is separated from color dots CD_2_1 and CD_2_2 by a horizontal fringe field amplifying region spacing HFFARS. Thus, fringe field amplifying region FFAR_1 extends along the bottom and the right side of color dot CD_2_1 and along the top and right side of color dot CD_2_2. This placement also causes the vertical amplifying portion of fringe field amplifying region FFAR_2 to be in between color dots CD_2_1 and CD_3_1 and in between color dots CD_2_2 and CD_3_2.

Fringe field amplifying region FFAR_3 is placed so that the horizontal amplifying portion of fringe field amplifying region FFAR_3 lies in between color dots CD_3_1 and CD_3_2 and is separated from color dots CD_3_1 and CD_3_2 by a vertical fringe field amplifying region spacing VFFARS. The vertical amplifying portion of fringe field amplifying region FFAR_3 is placed to the right of color dots CD_3_1 and CD_3_2 and is separated from color dots CD_3_1 and CD_3_2 by a horizontal fringe field amplifying region spacing HFFARS. Thus, fringe field amplifying region FFAR_3 extends along the bottom and the right side of color dot CD_3_1 and along the top and right side of color dot CD_3_2.

Pixel design 610 is also designed so that the fringe field amplifying regions receive polarity from an adjacent pixel. Specifically, a first conductor is coupled to a fringe field amplifying region to receive polarity from the pixel above the current pixel and a second conductor is coupled to the switching element to provide voltage polarity and voltage magnitude to a fringe field amplifying region of a pixel below the current pixel. For example, conductor 612, which is coupled to the electrode of the fringe field amplifying region FFAR_1, extends upward to connect to the equivalent conductor of conductor 613 of a pixel above the current pixel to receive polarity. (see FIG. 6(*c*)). Conductor 613, which is coupled to switching element SE_1 extends to the right and then downward to connect to the equivalent conductor of conductor 612 in the pixel below the current pixel. Conductors 614 and 615 serve the same purpose for fringe field amplifying region FFAR_2 as conductors 612 and 613 for fringe field amplifying region FFAR_3. In addition, conductors 616 and 617 serve the same purpose for fringe field amplifying region FFAR_3 as conductors 612 and 613 for fringe field amplifying region FFAR_1.

The polarities of the color dots, fringe field amplifying regions, and switching elements are shown using "+" and "−" signs. Thus, in FIG. 6(a), which shows the positive dot polarity pattern of pixel design 610+, all the switching elements (i.e. switching elements SE_1, SE_2, and SE_3); all the color dots (i.e. color dots CD_1_1, CD_1_2, CD_2_1, CD_2_2, CD_3_1, and 3_2) have positive polarity. However, all the fringe field amplifying regions (i.e. fringe field amplifying regions FFAR_1, FFAR_2, and FFAR_3) have negative polarity.

FIG. 6(b) shows pixel design 610 with the negative dot polarity pattern. For the negative dot polarity pattern, all the switching elements (i.e. switching elements SE_1, SE_2, and SE_3) and all the color dots (i.e. color dots CD_1_1, CD_1_2, CD_2_1, CD_2_2, CD_3_1, and 3_2) have negative polarity. However, all the fringe field amplifying regions (i.e. fringe field amplifying regions FFAR_1, FFAR_2, and FFAR_3) have positive polarity.

As explained above fringe fields in each of the color dots are amplified if adjacent components have opposite polarities. Pixel design 610 makes use of the fringe field amplifying regions to further enhance and stabilize the formation of multiple domain liquid crystal structure. In general, the polarities of the polarized components are assigned so that a color dot of a first polarity has neighboring polarized components of the second polarity. For example for the positive dot polarity pattern of pixel design 610 (FIG. 6(a)), color dot CD_2_2 has positive polarity. However the neighboring polarized components (fringe field amplifying regions FFAR_2 and FFAR_1) have negative polarity. Thus, the fringe field of color dot CD_2_2 is amplified. Furthermore, as explained below, the polarity reversing scheme is carried out at the display level as well so that the color dot of another pixel that is placed next to color dot CD_1_2 would have negative polarity (see FIG. 6(c)).

Figure 6C:
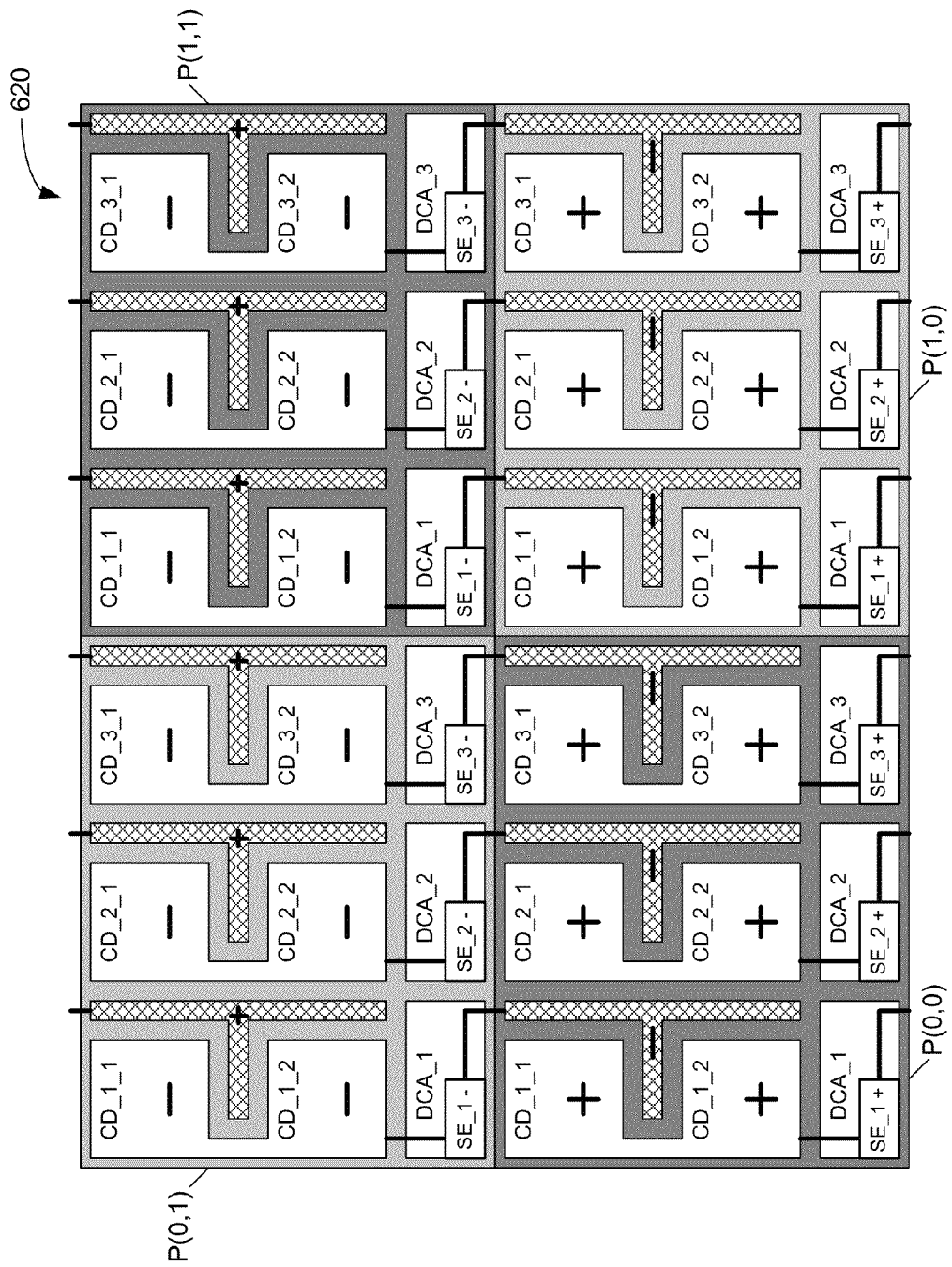
FIGS. 6(*a*)-6(*b*) illustrate a pixel design in accordance with one embodiment of the present invention.

Pixels using pixel design 610 of FIGS. 6(a) and 6(b) can be used in displays using switching element row inversion driving schemes. FIG. 6(c) shows a portion of display 620 using pixels P(0, 0), P(1, 0), P(0, 1), and P(1, 1) of pixel design 610 with a switching element row inversion driving scheme. Display 620 could have thousands of rows with thousand of pixels on each row. The rows and columns would continue from the portion shown in FIG. 6(c) in the manner shown in FIG. 6(c). For clarity, the gate lines and source lines that control the switching elements are omitted in FIG. 6(c). The Gate lines and source lines for display 610 would be virtually identical to the gate line and source lines illustrated in FIG. 4(e) except that display 610 would not use fringe field amplifying region switching elements and fringe field amplifying region electrodes. Furthermore, to better illustrate each pixel, the area of each pixel is shaded; this shading is only for illustrative purposes in FIG. 6(c) and has no functional significance. In display 620 the pixels are arranged so that all pixels in a row have the same dot polarity pattern (positive or negative) and each successive row should alternate between positive and negative dot polarity pattern. Thus, pixels P(0, 0) and P(1, 0) in the first row (i.e. row 0) have positive dot polarity pattern and pixels P(0, 1) and P(1, 1) in the second row (i.e. row 1) have the negative dot polarity pattern. However, at the next frame the pixels will switch dot polarity patterns. Thus in general a pixel P(x, y) has a first dot polarity pattern when y is even and a second dot polarity pattern when y is odd.

Pixels on each row of pixels are vertically aligned and separated horizontally so that the right most color dots of a pixel are separated from the left most color dot of an adjacent pixel by horizontal dot spacing HDS1. Pixels on a column of pixels are horizontally aligned and separated by a vertical dot spacing VDS3.

As stated above, the fringe field amplifying regions of a first pixel receive polarity from the switching elements of a second pixel. For example, the electrode of fringe field amplifying region FFAR_1 of pixel P(0, 0) is coupled to switching elements SE_1 of pixel P(0, 1) via conductor 612 of pixel P(0, 0) and conductor 613 of pixel P(0, 1). Similarly, the electrode of fringe field amplifying region FFAR_2 of pixel P(0, 0) is coupled to switching elements SE_2 of pixel P(0, 1) via conductor 614 of pixel P(0, 0) and conductor 615 of pixel P(0, 1). In addition, the electrode of fringe field amplifying region FFAR_3 of pixel P(0, 0) is coupled to switching elements SE_3 of pixel P(0, 1) via conductor 616 of pixel P(0, 0) and conductor 617 of pixel P(0, 1).

In a particular embodiment of the present invention, each color dot has a width of 40 micrometers and a height of 60 micrometers. Each fringe field amplifying region has a vertical amplifying portion width of 135 micrometers, a vertical amplifying portion height of 5 micrometers, a horizontal amplifying portion width of 35 micrometers, a horizontal amplifying height of 5 micrometers. Horizontal dot spacing HDS1 is 15 micrometers, vertical dot spacing VDS1 is 15 micrometers, vertical dot spacing VDS2 is 5 micrometers, vertical dot spacing VDS3 is 5 micrometers, horizontal fringe field amplifying spacing HFFARS is 5 micrometers, and vertical fringe field amplifying spacing VFFARS is 5 micrometers.

Figure 7A:
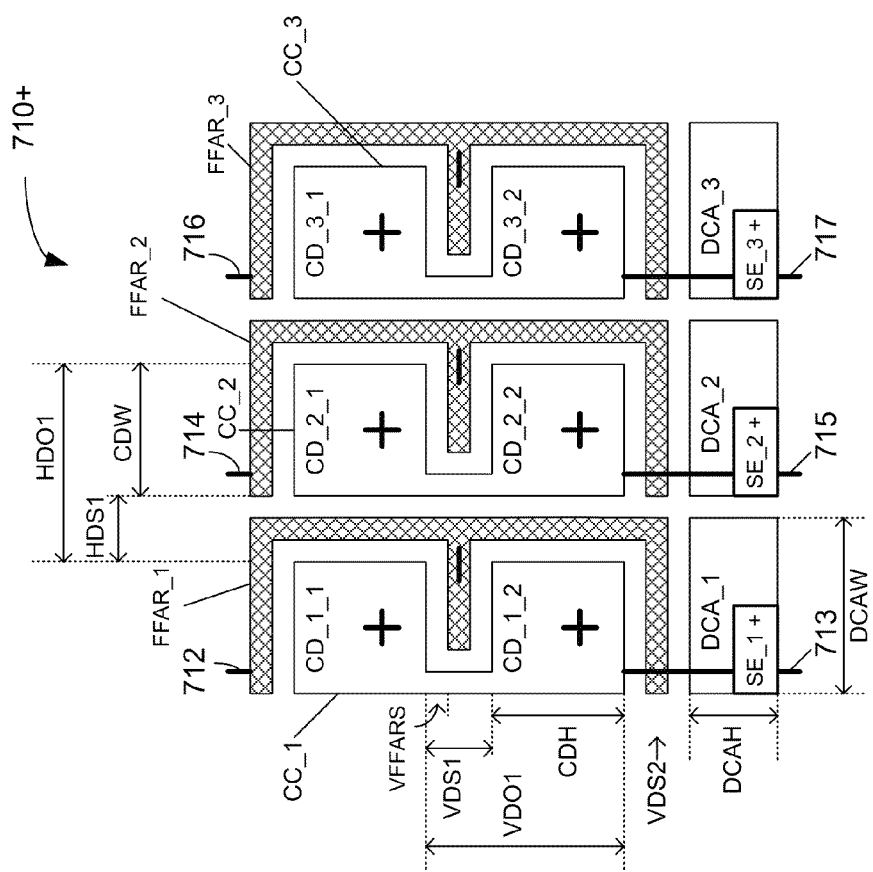
FIGS. 7(*a*)-7(*b*) illustrate a pixel design in accordance with one embodiment of the present invention.
FIG. 7(c) is an enlarged view of a fringe field amplifying region in accordance with one embodiment of the present invention.
FIG. 7(d) illustrates a portion of a liquid crystal display in accordance with one embodiment of the present invention.
FIG. 7(e) illustrates a portion of a liquid crystal display in accordance with one embodiment of the present invention.
Figure 7B:
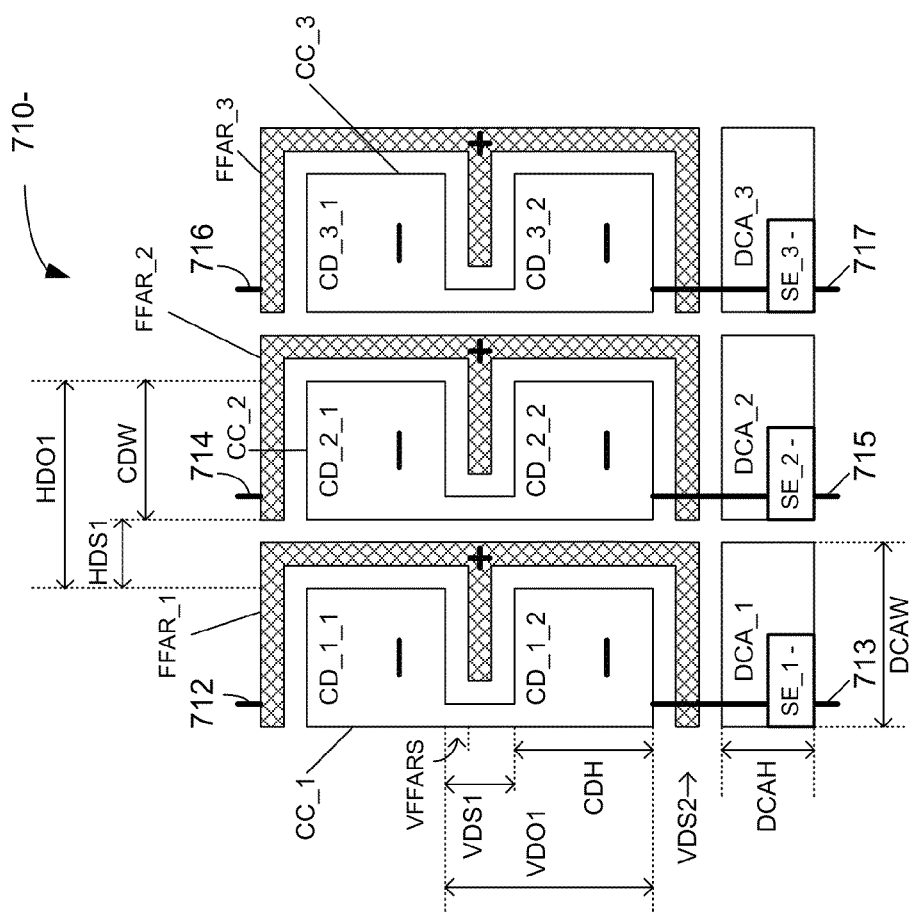

FIGS. 7(a) and 7(b) show different dot polarity patterns of a pixel design 710 (labeled 710+ and 710− as described below) that can be used in displays having a switching element row inversion driving scheme. In actual operation a pixel will switch between a first dot polarity pattern and a second dot polarity pattern between each image frame. Specifically, in FIG. 7(a), pixel design 710 has a positive dot polarity pattern (and is thus labeled 710+) and in FIG. 7(b), pixel design 710 has a negative dot polarity pattern (and is thus labeled 710−). Furthermore, the polarity of each polarized component in the various pixel designs are indicated with "+" for positive polarity or "−" for negative polarity.

Pixel design 710 has three color components CC_1, CC_2 and CC_3. Each of the three color components includes two color dots. Pixel design 710 also includes a switching element (referenced as SE_1, SE_2, and SE_3) for each color component and a fringe field amplifying region (referenced as FFAR_1, FFAR_2, and FFAR_3) for each color component. Switching elements SE_1, SE_2, and SE_3 are arranged in a row. Device component areas DCA_1, DCA_2, and DCA_3 are defined around switching element SE_1, SE_2, and SE_3. Device component areas DCA_1, DCA_2, and DCA_3 have a device component area height DCAH and a device component width DCAW.

First color component CC_1 of pixel design 710 has two color dots CD_1_1 and CD_1_2. Color dots CD_1_1 and CD_1_2 form a column and are separated by a vertical dot pacing VDS1. In other words, color dots CD_1_1 and CD_1_2 are horizontally aligned and vertically separated by vertical dot spacing VDS1. Furthermore, color dots CD_1_1 and CD_1_2 are vertically offset by vertical dot offset VDO1 which is equal to vertical dot spacing VDS1 plus the color dot height CDH. As illustrated by the connection between color dots CD_1_1 and CD_1_2, in some embodiments of the present invention the electrodes of color dot CD_1_1 and CD_1_2 are coupled together in the same process steps as the formation of the electrodes. Device component area DCA_1 is located below color dot CD_1_2 and separated from color dot CD_1_2 by a vertical dot spacing VDS2. Switching element SE_1 is located within device component area DCA_1. Switching element SE_1 is coupled to the electrodes of color dots CD_1_1 and CD_1_2 to control the voltage polarity and voltage magnitude of color dots CD_1_1 and CD_1_2.

Similarly, second color component CC_2 of pixel design 710 has two color dots CD_2_1 and CD_2_2. Color dots CD_2_1 and CD_2_2 form a second column and are separated by a vertical dot spacing VDS1. Thus, color dots CD_2_1 and CD_2_2 are horizontally aligned and vertically separated by vertical dot spacing VDS1. Device component area DCA_2 is located below color dot CD_2_2 and separated from color dot CD_1_2 by vertical dot spacing VDS2. Switching element SE_2 is located within device component area DCA_2. Switching element SE_2 is coupled to the electrodes of color dots CD_2_1 and CD_2_2 to control the voltage polarity and voltage magnitude of color dots CD_2_1 and CD_2_2. Second color component CC_2 is vertically aligned with first color component CC_1 and separated from color component CC_1 by a horizontal dot spacing HDS1, thus color components CC_2 and CC_1 are horizontally offset by a horizontal dot offset HDO1, which is equal to horizontal dot spacing HDS1 plus the color dot width CDW. Specifically with regards to the color dots, color dot CD_2_1 is vertically aligned with color dots CD_1_1 and horizontally separated by horizontal dot spacing HDS1. Similarly, color dot CD_2_2 is vertically aligned with color dots CD_2_1 and horizontally separated by horizontal dot spacing HDS1. Thus color dot CD_1_1 and color dot CD_2_1 form a first row of color dots and color dot CD_1_2 and color dot CD_2_2 form a second row of color dots.

Similarly, third color component CC_3 of pixel design 710 has two color dots CD_3_1 and CD_3_2. Color dots CD_3_1 and CD_3_2 form a third column and are separated by a vertical dot spacing VDS1. Thus, color dots CD_3_1 and CD_3_2 are horizontally aligned and vertically separated by vertical dot spacing VDS1. Device component area DCA_3 is located below color dot CD_1_3 and separated from color dot CD_1_3 by a vertical dot spacing VDS2. Switching element SE_3 is located within device component area DCA_3. Switching element SE_3 is coupled to the electrodes of color dots CD_3_1 and CD_3_2 to control the voltage polarity and voltage magnitude of color dots CD_3_1 and CD_3_2. Third color component CC_3 is vertically aligned with second color component CC_2 and separated from color component CC_2 by horizontal dot spacing HDS1, thus color components CC_3 and CC_2 are horizontally offset by a horizontal dot offset HDO1. Specifically with regards to the color dots, color dot CD_3_1 is vertically aligned with color dots CD_2_1 and horizontally separated by horizontal dot spacing HDS1. Similarly, color dot CD_3_2 is vertically aligned with color dots CD_2_2 and horizontally separated by horizontal dot spacing HDS1. Thus color dot CD_3_1 is on the first row of color dots and color dot CD_3_2 is on the second row of color dots.

Figure 7C:
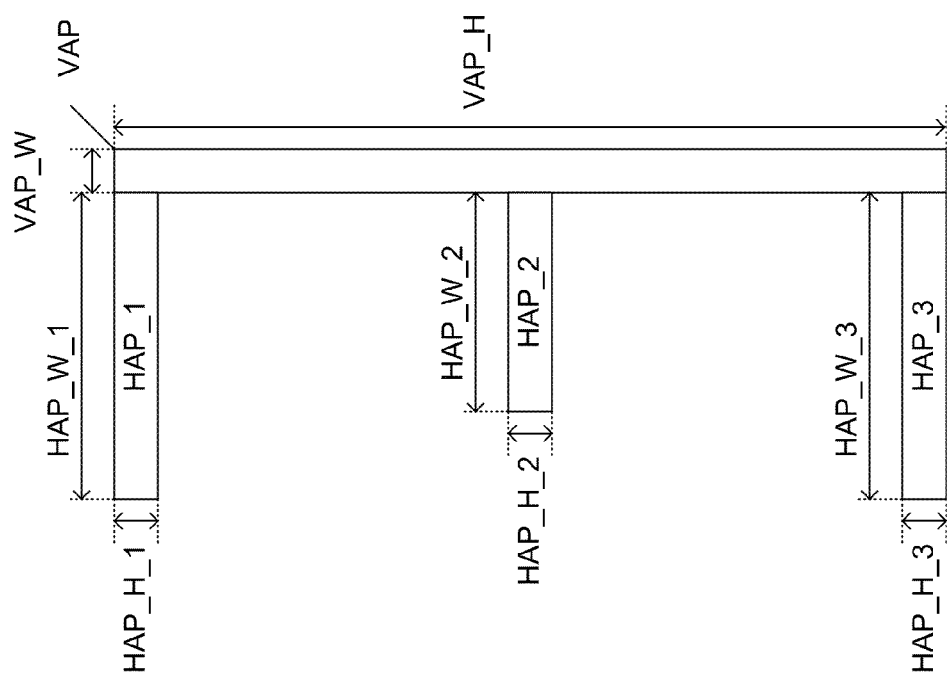

Pixel design 710 also includes fringe field amplifying regions FFAR_1, FFAR_2, and FFAR_3. FIG. 7(c) shows a more detailed view of fringe field amplifying region FFAR_1 of pixel design 710. For clarity fringe field amplifying regions FFAR_1 is conceptually divided into a vertical amplifying portion VAP, a first horizontal amplifying portion HAP_1, a second horizontal amplifying portion HAP_2, and a third horizontal amplifying portion HAP_3. Horizontal amplifying portion HAP_1 is located at the top of and extends to the left of vertical amplifying portion VAP; horizontal amplifying portion HAP_2 is vertically centered on and extends to the left of vertical amplifying portion VAP; and horizontal amplifying portion HAP_3 is at the bottom of and extends to the left of vertical amplifying portion VAP. As explained above, use of horizontal amplifying portions and vertical amplifying portions allows clearer description of the placement of fringe field amplifying region FFAR1. Horizontal amplifying portions HAP_1, HAP_2, and HAP_3 have horizontal amplifying portion width HAP_W_1, HAP_W_2, and HAP_W_3, respectively, and horizontal amplifying portion height HAP_H_1, HAP_H_2, and HAP_H_3. In the particular embodiment of FIGS. 7(a)-7(d), horizontal amplifying portion widths HAP_W_1 and HAP_W_2 are equal and horizontal amplifying portion widths HAP_W_2 is less than horizontal amplifying widths HAP_W_1 and HAP_W_3. Vertical amplifying portion VAP has a vertical amplifying portion width VAP_W and a vertical amplifying portion height HAP_H. Fringe field amplifying regions FFAR_2 and FFAR_3 have the same shape as fringe field amplifying region FFAR_1.

As shown in FIG. 7(a), fringe field amplifying regions FFAR_1, FFAR_2, and FFAR_3 are placed in between the color dots of pixel design 710. Specifically, fringe field amplifying region FFAR_1 is placed so that horizontal amplifying portion HAP_2 of fringe field amplifying region FFAR_1 lies in between color dots CD_1_1 and CD_1_2 and is separated from color dots CD_1_1 and CD_1_2 by a vertical fringe field amplifying region spacing VFFARS. Horizontal amplifying portion HAP_2 of fringe field amplifying region FFAR_1 does not extend to the end of the left side of color dots CD_1_1 and CD_1_2 due to the interconnection between color dots CD_1_1 and CD_1_2. Vertical amplifying portion VAP of fringe field amplifying region FFAR_1 is placed to the right of color dots CD_1_1 and CD_1_2 and is separated from color dots CD_1_1 and CD_1_2 by a horizontal fringe field amplifying region spacing HFFARS. Horizontal amplifying portion HAP_1 extends above color dot CD_1_1 and horizontal amplifying portion HAP_3 extends below color dot CD_1_2. Thus, fringe field amplifying region FFAR_1 extends along the top, the bottom and the right side of color dot CD_1_1 and along the top, the bottom and the right side of color dot CD_1_2. Furthermore, this placement also causes the vertical amplifying portion of fringe field amplifying region FFAR_1 to be in between color dots CD_1_1 and CD_2_1 and in between color dots CD_1_2 and CD_2_2.

Similarly, fringe field amplifying region FFAR_2 is placed so that horizontal amplifying portion HAP_2 of fringe field amplifying region FFAR_2 lies in between color dots CD_2_1 and CD_2_2 and is separated from color dots CD_2_1 and CD_2_2 by a vertical fringe field amplifying region spacing VFFARS. Horizontal amplifying portion HAP_2 of fringe field amplifying region FFAR_2 does not extend to the end of the left side of color dots CD_2_1 and CD_2_2 due to the interconnection between color dots CD_2_1 and CD_2_2. Vertical amplifying portion VAP of fringe field amplifying region FFAR_2 is placed to the right of color dots CD_2_1 and CD_2_2 and is separated from color dots CD_2_1 and CD_2_2 by a horizontal fringe field amplifying region spacing HFFARS. Horizontal amplifying portion HAP_2 extends above color dot CD_2_1 and horizontal amplifying portion HAP_3 extends below color dot CD_2_2. Thus, fringe field amplifying region FFAR_2 extends along the top, the bottom and the right side of color dot CD_2_1 and along the top, the bottom and the right side of color dot CD_2_2. Furthermore, this placement also causes the vertical amplifying portion of fringe field amplifying region FFAR_1 to be in between color dots CD_2_1 and CD_3_1 and in between color dots CD_2_2 and CD_3_2.

Fringe field amplifying region FFAR_3 is placed so that horizontal amplifying portion HAP_2 of fringe field amplifying region FFAR_3 lies in between color dots CD_3_1 and CD_3_2 and is separated from color dots CD_3_1 and CD_3_2 by a vertical fringe field amplifying region spacing VFFARS. Horizontal amplifying portion HAP_3 of fringe field amplifying region FFAR_3 does not extend to the end of the left side of color dots CD_3_1 and CD_3_2 due to the interconnection between color dots CD_3_1 and CD_3_2. Vertical amplifying portion VAP of fringe field amplifying region FFAR_3 is placed to the right of color dots CD_3_1 and CD_3_2 and is separated from color dots CD_3_1 and CD_3_2 by a horizontal fringe field amplifying region spacing HFFARS. Horizontal amplifying portion HAP_1 extends above color dot CD_3_1 and horizontal amplifying portion HAP_3 extends below color dot CD_3_2. Thus, fringe field amplifying region FFAR_3 extends along the top, the bottom and the right side of color dot CD_3_1 and along the top, the bottom and the right side of color dot CD_3_2.

Pixel design 710 is also designed so that the fringe field amplifying regions receive polarity from an adjacent pixel. Specifically, a first conductor is coupled to a fringe field amplifying region to receive polarity from the pixel above the current pixel and a second conductor is coupled to the switching element to provide polarity to a fringe field amplifying region of a pixel below the current pixel. For example, conductor 712, which is coupled to the electrode of the fringe field amplifying region FFAR_1, extends upward to connect to the equivalent conductor of conductor 713 of a pixel above the current pixel to receive polarity. (see FIG. 7(d)). Conductor 713, which is coupled to switching element SE_1 extends downward to connect to the equivalent conductor of conductor 712 in the pixel below the current pixel. Conductors 714 and 715 serve the same purpose for fringe field amplifying region FFAR_2 as conductors 712 and 713 for fringe field amplifying region FFAR_1. In addition, conductors 716 and 717 serve the same purpose for fringe field amplifying region FFAR_3 as conductors 712 and 713 for fringe field amplifying region FFAR_1.

The polarities of the color dots, fringe field amplifying regions, and switching elements are shown using "+" and "−" signs. Thus, in FIG. 7(a), which shows the positive dot polarity pattern of pixel design 710+, all the switching elements (i.e. switching elements SE_1, SE_2, and SE_3); all the color dots (i.e. color dots CD_1_1, CD_1_2, CD_2_1, CD_2_2, CD_3_1, and 3_2) have positive polarity. However, all the fringe field amplifying regions (i.e. fringe field amplifying regions FFAR_1, FFAR_2, and FFAR_3) have negative polarity.

FIG. 7(b) shows pixel design 710 with the negative dot polarity pattern. For the negative dot polarity pattern, all the switching elements (i.e. switching elements SE_1, SE_2, and SE_3) and all the color dots (i.e. color dots CD_1_1, CD_1_2, CD_2_1, CD_2_2, CD_3_1, and 3_2) have negative polarity. However, all the fringe field amplifying regions (i.e. fringe field amplifying regions FFAR_1, FFAR_2, and FFAR_3) have positive polarity.

As explained above fringe fields in each of the color dots are amplified if adjacent components have opposite polarities. Pixel design 710 makes use of the fringe field amplifying regions to further enhance the formation of multiple domain liquid crystal structure. In general, the polarities of the polarized components are assigned so that a color dot of a first polarity has neighboring polarized components of the second polarity. For example for the positive dot polarity pattern of pixel design 710 (FIG. 7(a)), color dot CD_2_2 has positive polarity. However the neighboring polarized components (fringe field amplifying regions FFAR_2 and FFAR_1) have negative polarity. Thus, the fringe field of color dot CD_2_2 is amplified. Furthermore, as explained below, the polarity reversing scheme is carried out at the display level as well so that the color dot of another pixel that is placed next to color dot CD_1_2 would have negative polarity (see FIG. 7(d)).

Figure 7D:
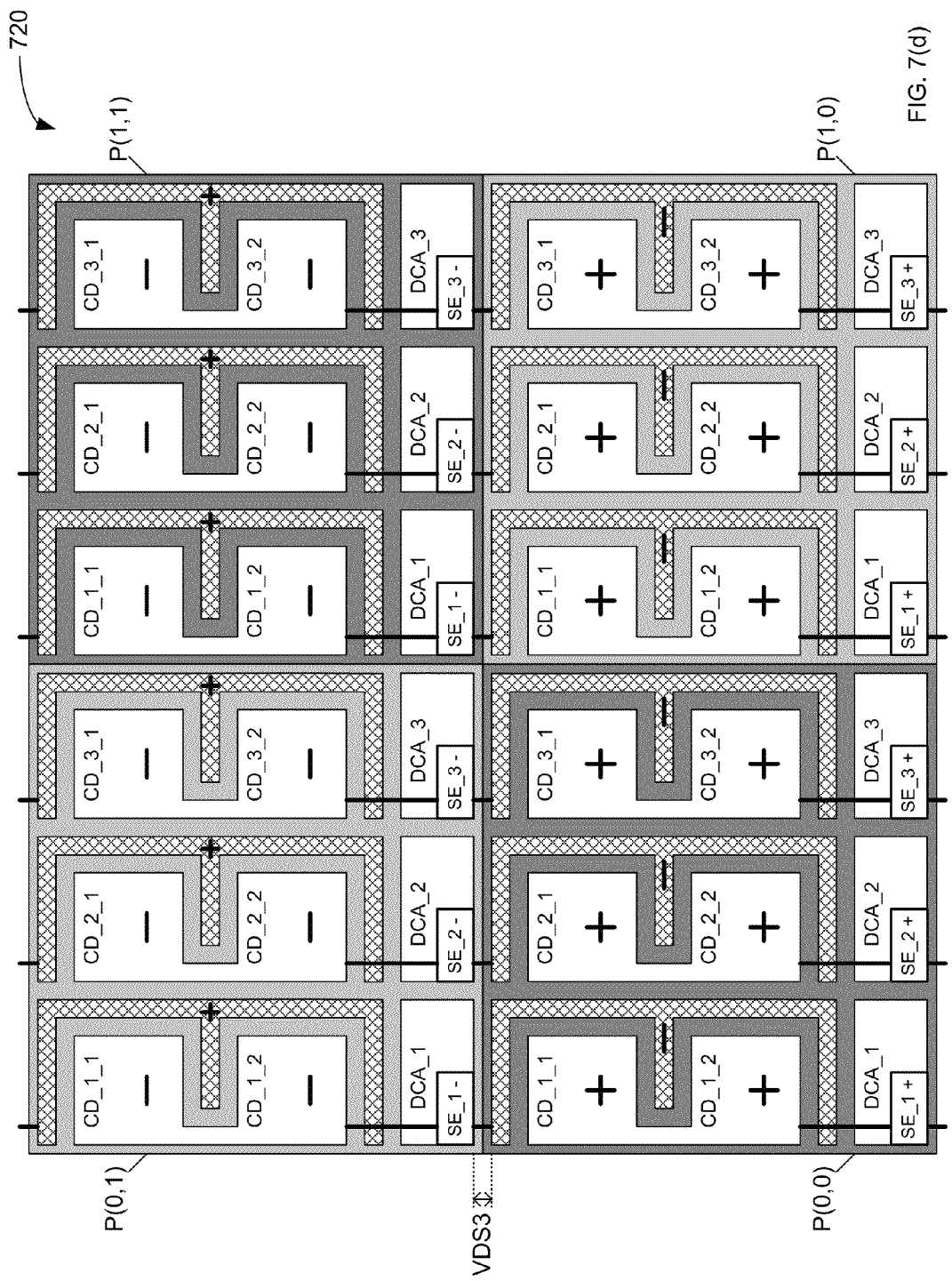
Figure 7E:
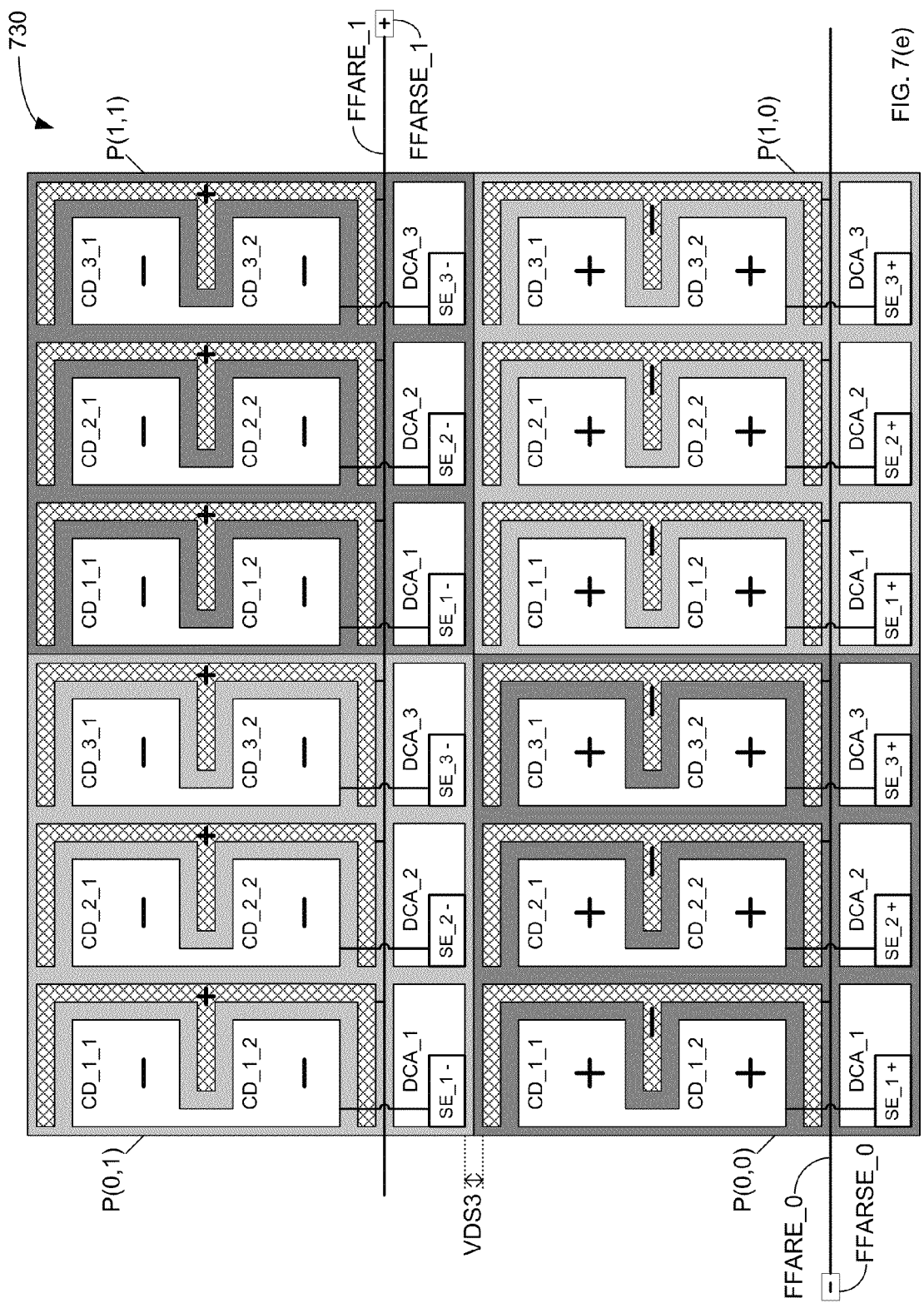

Pixels using pixel design 710 of FIGS. 7(a) and 7(b) can be used in displays using switching element row inversion driving schemes. FIG. 7(d) shows a portion of display 720 using pixels P(0, 0), P(1, 0), P(0, 1), and P(1, 1) of pixel design 710 with a switching element row inversion driving scheme. Display 720 could have thousands of rows with thousand of pixels on each row. The rows and columns would continue from the portion shown in FIG. 7(d) in the manner shown in FIG. 7(d). For clarity, the gate lines and source lines that control the switching elements are omitted in FIG. 7(d). The Gate lines and source lines for display 710 would be virtually identical to the gate line and source lines illustrated in FIG. 4(e) except that display 710 would not use fringe field amplifying region switching elements and fringe field amplifying region electrodes. To better illustrate each pixel, the area of each pixel is shaded; this shading is only for illustrative purposes in FIG. 7(d) and has no functional significance. In display 720 the pixels are arranged so that all pixels in a row have the same dot polarity pattern (positive or negative) and each successive row should alternate between positive and negative dot polarity pattern. Thus, pixels P(0, 0) and P(1, 0) in the first row (i.e. row 0) have positive dot polarity pattern and pixels P(0, 1) and P(1, 1) in the second row (i.e. row 1) have the negative dot polarity pattern. However, at the next frame the pixels will switch dot polarity patterns. Thus in general a pixel P(x, y) has a first dot polarity pattern when y is even and a second dot polarity pattern when y is odd.

Pixels on each row of pixels are vertically aligned and separated horizontally so that the right most color dots of a pixel are separated from the leftmost color dot of an adjacent pixel by horizontal dot spacing HDS1. Pixels on a column of pixels are horizontally aligned and separated by a vertical dot spacing VDS3.

As stated above, the fringe field amplifying regions of a first pixel receive polarity from the switching elements of a second pixel. For example, the electrode of fringe field amplifying region FFAR_1 of pixel P(0, 0) is coupled to switching elements SE_1 of pixel P(0, 1) via conductor 712 of pixel P(0, 0) and conductor 713 of pixel P(0, 1). Similarly, the electrode of fringe field amplifying region FFAR_2 of pixel P(0, 0) is coupled to switching elements SE_2 of pixel P(0, 1) via conductor 714 of pixel P(0, 0) and conductor 715 of pixel P(0, 1). In addition, the electrode of fringe field amplifying region FFAR_3 of pixel P(0, 0) is coupled to switching elements SE_3 of pixel P(0, 1) via conductor 716 of pixel P(0, 0) and conductor 717 of pixel P(0, 1).

In a particular embodiment of the present invention, each color dot has a width of 40 micrometers and a height of 60 micrometers. Each fringe field amplifying region has a vertical amplifying portion width of 5 micrometers, a vertical amplifying portion height of 155 micrometers, a horizontal amplifying portion width of 45 micrometers, a horizontal amplifying height of 5 micrometers. Horizontal dot spacing HDS1 is 15 micrometers, vertical dot spacing VDS1 is 15 micrometers, vertical dot spacing VDS2 is 15 micrometers, vertical dot spacing VDS3 is 5 micrometers, horizontal fringe field amplifying spacing HFFARS is 5 micrometers, and vertical fringe field amplifying spacing VFFARS is 5 micrometers.

Pixel design 710 can easily be adapted for use in displays having fringe field amplifying region switching elements and fringe field amplifying regions electrodes. As illustrated in FIG. 7(*e*), a display 730 uses a modified pixel design 710 in which conductors 712, 713, 714, 715, 716 and 717 omitted. Specifically, FIG. 7(*e*) shows a portion of display 730 using pixels P(0, 0), P(1, 0), P(0, 1), and P(1, 1) of pixel design 710 with a switching element row inversion driving scheme. Display 730 could have thousands of rows with thousand of pixels on each row. The rows and columns would continue from the portion shown in FIG. 7(*e*) in the manner shown in FIG. 7(*e*). For clarity, the gate lines and source lines that control the switching elements are omitted in FIG. 7(*e*). Furthermore, to better illustrate each pixel, the area of each pixel is shaded; this shading is only for illustrative purposes in FIG. 7(*e*) and has no functional significance. In display 730 the pixels are arranged so that all pixels in a row have the same dot polarity pattern (positive or negative) and each successive row should alternate between positive and negative dot polarity pattern. Thus, pixels P(0, 0) and P(1, 0) in the first row (i.e. row 0) have positive dot polarity pattern and pixels P(0, 1) and P(1, 1) in the second row (i.e. row 1) have the negative dot polarity pattern. However, at the next frame the pixels will switch dot polarity patterns. Thus in general a pixel P(x, y) has a first dot polarity pattern when y is even and a second dot polarity pattern when y is odd.

Pixels on each row of pixels are vertically aligned and separated horizontally so that the right most color dots of a pixel are separated from the left most color dot of an adjacent pixel by horizontal dot spacing HDS1. Pixels on a column of pixels are horizontally aligned and separated by a vertical dot spacing VDS3.

For display 730, the fringe field amplifying regions of a pixel using pixel design 710 receives proper polarity from outside the pixel. Thus in display 730, each row of pixels has a corresponding fringe field amplifying region switching element coupled to a fringe field amplifying electrode that extends across display 730. The fringe field amplifying regions of the pixels in the corresponding row of pixels are coupled to the corresponding fringe field amplifying electrode to receive polarity from the fringe field amplifying region switching element. Specifically, for row 0, fringe field amplifying region switching element FFARSE_0 is on the left side of display 730. Fringe field amplifying region electrode FFARE_0 is coupled to fringe field amplifying region switching element FFARSE_0 and extends across display 730. Fringe field amplifying regions in the pixels of row 0 are coupled to fringe field amplifying region electrode FFARE_0. Specifically, the fringe field amplifying regions of pixel P(0, 0) and pixel P(1, 0) are coupled to fringe field amplifying region electrode FFARE_. For row 1, fringe field amplifying region switching element FFARSE_1 is on the right side of display 730. Fringe field amplifying region electrode FFARE_1 is coupled to fringe field amplifying region switching element FFARSE_1 and extends across display 730. Fringe field amplifying regions in the pixels of row 1 are coupled to fringe field amplifying region electrode FFARE_1. Specifically, the fringe field amplifying regions of pixel P(0, 1) and pixel P(1, 1) are coupled to fringe field amplifying region electrode FFARE_1. In FIG. 7(*e*), fringe field amplifying region switching elements FFARSE_0 and FFARSE_1 have negative polarity and positive polarity respectively. However in the next frame the polarities are reversed. Some embodiments of the present invention may put all the fringe field amplifying region switching elements on the same side of the display.

Due to the switching of polarities on each row in display 730, if a color dot has the first polarity, any neighboring polarized components have the second polarity. For example, color dot CD_1_1 of pixel P(1, 1) has negative polarity while, color dot CD_3_1 of pixel P(0, 1), fringe field amplifying region FFAR_3 of pixel P(0, 1) and fringe field amplifying region FFAR_1 of pixel P(1, 1) have positive polarity.

Some embodiments of the present invention may enhance display 730 by including a left edge pixel design. Specifically, the left edge pixel design variant of pixel design 710 would include a first component fringe field amplifying region that includes a left vertical amplifying portion VAP_L on running along the left side of color dots CD_1_1 and CD_1_2.

FIGS. 8(*a*) and 8(*b*) show different dot polarity patterns of a pixel design 810 (labeled 810+ and 810− as described below) that can be used in displays having a switching element row inversion driving scheme. In actual operation a pixel will switch between a first dot polarity pattern and a second dot polarity pattern between each image frame. Specifically, in FIG. 8(*a*), pixel design 810 has a positive dot polarity pattern (and is thus labeled 810+) and in FIG. 8(*b*), pixel design 810 has a negative dot polarity pattern (and is thus labeled 810−). Furthermore, the polarity of each polarized component in the various pixel designs are indicated with "+" for positive polarity or "−" for negative polarity.

Pixel design 810 has three color components CC_1, CC_2 and CC_3. Each of the three color components includes three color dots. Pixel design 810 also includes a switching element (referenced as SE_1, SE_2, and SE_3) for each color component and a fringe field amplifying region (referenced as FFAR_1, FFAR_2, and FFAR_3) for each color component. Switching elements SE_1, SE_2, and SE_3 are arranged in a row. Device component areas around each switching element are covered by the fringe field amplifying regions and are thus not specifically labeled in FIGS. 8(*a*) and 8(*b*).

First color component CC_1 of pixel design 810 has three color dots CD_1_1, CD_1_2, and CD_1_3. Color dots CD_1_1, CD_1_2, and CD_1_3 form a column. Color dot CD_1_1 is separated from color dot CD_1_2 by a vertical dot pacing VDS1. Color dot CD_1_2 is separated from color dot CD_1_3 by vertical dot spacing VDS2. As illustrated by the connection between color dots CD_1_1 and CD_1_2, in some embodiments of the present invention the electrodes of color dot CD_1_1 and CD_1_2 are coupled together in the same process steps as the formation of the electrodes. Switching element SE_1 is located between color dots CD_1_2 and color dot CD_1_3. Switching element SE_1 is coupled to the electrodes of color dots CD_1_1, CD_1_2, and CD_1_3 to control the voltage polarity and voltage magnitude of color dots CD_1_1, CD_1_2, and CD_1_3.

Similarly, second color component CC_2 of pixel design 810 has three color dots CD_2_1, CD_2_2, and CD_2_3. Color dots CD_2_1, CD_2_2, and CD_2_3 form a column. Color dot CD_2_1 is separated from color dot CD_2_2 by a vertical dot pacing VDS1. Color dot CD_2_2 is separated from color dot CD_2_3 by vertical dot spacing VDS2. As illustrated by the connection between color dots CD_2_1 and CD_2_2, in some embodiments of the present invention the electrodes of color dot CD_2_1 and CD_2_2 are coupled together in the same process steps as the formation of the electrodes. Switching element SE_2 is located between color dots CD_2_2 and color dot CD_2_3. Switching element SE_2 is coupled to the electrodes of color dots CD_2_1, CD_2_2, and CD_2_3 to control the voltage polarity and voltage magnitude of color dots CD_2_1, CD_2_2, and CD_2_3. Second color component CC_2 is vertically aligned with first color component CC_1 and separated from color component CC_1 by a horizontal dot spacing HDS1, thus color components CC_2 and CC_1 are horizontally offset by a horizontal dot offset HDO1, which is equal to horizontal dot spacing HDS1 plus the color dot width CDW. Specifically with regards to the color dots, color dot CD_2_1 is vertically aligned with color dots CD_1_1 and horizontally separated by horizontal dot spacing HDS1. Similarly, color dot CD_2_2 is vertically aligned with color dots CD_1_2 and horizontally separated by horizontal dot spacing HDS1 and color dot CD_2_3 is vertically aligned with color dots CD_1_3 and horizontally separated by horizontal dot spacing HDS1. Thus color dot CD_1_1 and color dot CD_2_1 form a first row of color dots, color dot CD_1_2 and color dot CD_2_2 form a second row of color dots, and color dot CD_1_3 and color dot CD_2_3 form a third row of color dots.

Similarly, third color component CC_3 of pixel design 810 has three color dots CD_3_1, CD_3_2, and CD_3_3. Color dots CD_3_1, CD_3_2, and CD_3_3 form a column. Color dot CD_3_1 is separated from color dot CD_3_2 by a vertical dot pacing VDS1. Color dot CD_3_2 is separated from color dot CD_3_3 by vertical dot spacing VDS2. As illustrated by the connection between color dots CD_3_1 and CD_3_2, in some embodiments of the present invention the electrodes of color dot CD_3_1 and CD_3_2 are coupled together in the same process steps as the formation of the electrodes. Switching element SE_3 is located between color dots CD_3_2 and color dot CD_3_3. Switching element SE_3 is coupled to the electrodes of color dots CD_3_1, CD_3_2, and CD_3_3 to control the voltage polarity and voltage magnitude of color dots CD_3_1, CD_3_2, and CD_3_3. Third color component CC_3 is vertically aligned with second color component CC_2 and separated from color component CC_2 by a horizontal dot spacing HDS1, thus color components CC_3 and CC_2 are horizontally offset by a horizontal dot offset HDO1, which is equal to horizontal dot spacing HDS1 plus the color dot width CDW. Specifically with regards to the color dots, color dot CD_3_1 is vertically aligned with color dots CD_2_1 and horizontally separated by horizontal dot spacing HDS1. Similarly, color dot CD_3_2 is vertically aligned with color dots CD_2_2 and horizontally separated by horizontal dot spacing HDS1 and color dot CD_3_3 is vertically aligned with color dots CD_2_3 and horizontally separated by horizontal dot spacing HDS1. Thus color dot CD_3_1 is on the first row of color dots, color dot CD_3_2 is on the second row of color dots, and color dot CD_3_3 is on the third row of color dots.

Pixel design 810 also includes fringe field amplifying regions FFAR_1, FFAR_2, and FFAR_3. FIG. 8(c) shows a more detailed view of fringe field amplifying region FFAR_1 of pixel design 810. For clarity fringe field amplifying regions FFAR_1 is conceptually divided into a vertical amplifying portion VAP, a first horizontal amplifying portion HAP_1, and a second horizontal amplifying portion HAP_2. Horizontal amplifying portion HAP_1 is approximately one-third of the way down from the top of vertical amplifying portion VAP and extends to the left of vertical amplifying portion VAP; horizontal amplifying portion HAP_2 approximately one-third of the way up from the bottom of vertical amplifying portion VAP and extends to the left of vertical amplifying portion VAP. As explained above, use of horizontal amplifying portions and vertical amplifying portions allows clearer description of the placement of fringe field amplifying region FFAR1. Horizontal amplifying portions HAP_1 and HAP_2 have horizontal amplifying portion width HAP_W_1 and HAP_W_2, respectively, and horizontal amplifying portion height HAP_H_1 and HAP_H_2. In the particular embodiment of FIGS. 8(a)-8(d), horizontal amplifying portion widths HAP_W_2 is less than horizontal amplifying widths HAP_W_1. Vertical amplifying portion VAP has a vertical amplifying portion width VAP_W and a vertical amplifying portion height VAP_H. Fringe field amplifying regions FFAR_2 and FFAR_3 have the same shape as fringe field amplifying region FFAR_1.

Figure 8A:
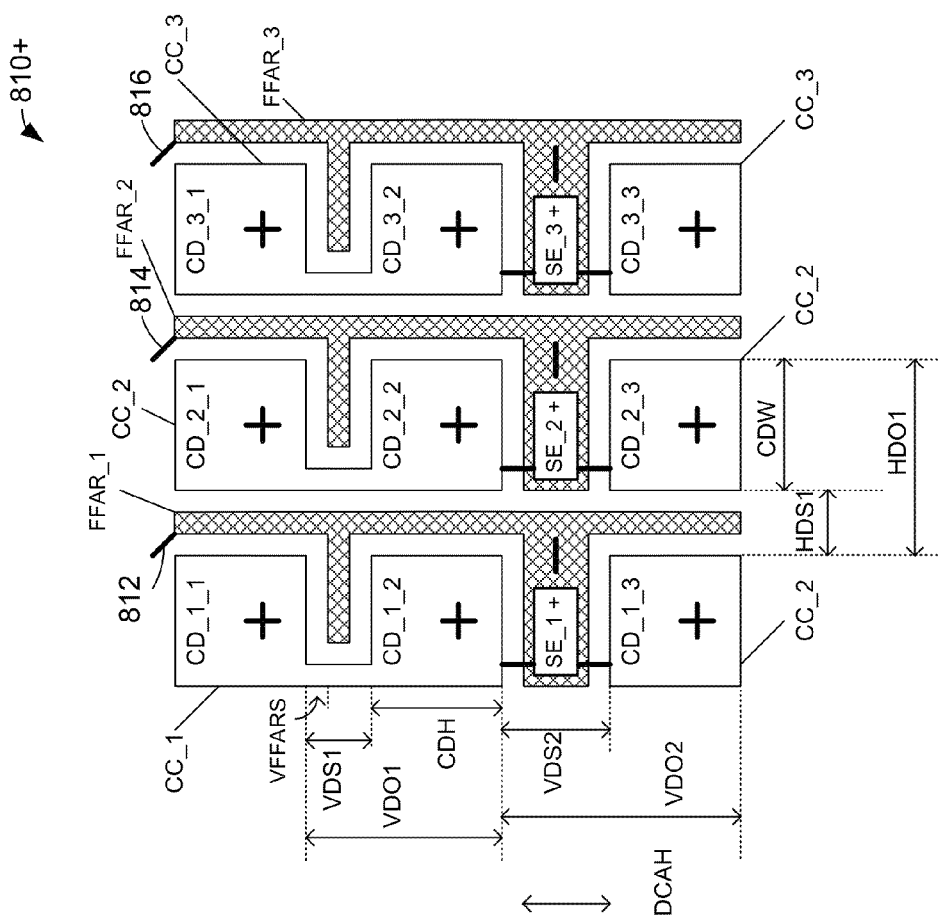
FIGS. 8(a)-8(b) illustrate a pixel design in accordance with one embodiment of the present invention.

As shown in FIG. 8(a), fringe field amplifying regions FFAR_1, FFAR_2, and FFAR_3 are placed in between the color dots of pixel design 810. Specifically, fringe field amplifying region FFAR_1 is placed so that horizontal amplifying portion HAP_1 of fringe field amplifying region FFAR_1 lies in between color dots CD_1_1 and CD_1_2 and is separated from color dots CD_1_1 and CD_1_2 by a vertical fringe field amplifying region spacing VFFARS. Horizontal amplifying portion HAP_1 of fringe field amplifying region FFAR_1 does not extend to the end of the left side of color dots CD_1_1 and CD_1_2 due to the interconnection between color dots CD_1_1 and CD_1_2. Vertical amplifying portion VAP of fringe field amplifying region FFAR_1 is placed to the right of color dots CD_1_1, CD_1_2, and CD_1_3 and is separated from color dots CD_1_1, CD_1_2, and CD_1_3 by a horizontal fringe field amplifying region spacing HFFARS. Horizontal amplifying portion HAP_2 extends between color dot CD_1_2 and color dot CD_1_3. Thus, fringe field amplifying region FFAR_1 extends along the bottom and the right side of color dot CD_1_1; along the top, the bottom and the right side of color dot CD_1_2; and along the top and right side of color dot CD_1_3. Furthermore, this placement also causes the vertical amplifying portion of fringe field amplifying region FFAR_1 to be in between color dots CD_1_1 and CD_2_1, between color dots CD_1_2 and CD_2_2, and between color dots CD_1_3 and CD_2_3.

Similarly, fringe field amplifying region FFAR_2 is placed so that horizontal amplifying portion HAP_1 of fringe field amplifying region FFAR_2 lies in between color dots CD_2_1 and CD_2_2 and is separated from color dots CD_2_1 and CD_2_2 by a vertical fringe field amplifying region spacing VFFARS. Horizontal amplifying portion HAP_1 of fringe field amplifying region FFAR_2 does not extend to the end of the left side of color dots CD_2_1 and CD_2_2 due to the interconnection between color dots CD_2_1 and CD_2_2. Vertical amplifying portion VAP of fringe field amplifying region FFAR_2 is placed to the right of color dots CD_2_1, CD_2_2, and CD_2_3 and is separated from color dots CD_2_1, CD_2_2, and CD_2_3 by a horizontal fringe field amplifying region spacing HFFARS. Horizontal amplifying portion HAP_2 extends between color dot CD_2_2 and color dot CD_2_3. Thus, fringe field amplifying region FFAR_2 extends along the bottom and the right side of color dot CD_2_1; along the top, the bottom and the right side of color dot CD_2_2; and along the top and right side of color dot CD_2_3. Furthermore, this placement also causes the vertical amplifying portion of fringe field amplifying region FFAR_2 to be in between color dots CD_2_1 and CD_3_1, between color dots CD_2_2 and CD_3_2, and between color dots CD_2_3 and CD_3_3.

Fringe field amplifying region FFAR_3 is placed so that horizontal amplifying portion HAP_1 of fringe field amplifying region FFAR_3 lies in between color dots CD_3_1 and CD_3_2 and is separated from color dots CD_3_1 and CD_3_2 by a vertical fringe field amplifying region spacing VFFARS. Horizontal amplifying portion HAP_1 of fringe field amplifying region FFAR_3 does not extend to the end of the left side of color dots CD_3_1 and CD_3_2 due to the interconnection between color dots CD_3_1 and CD_3_2. Vertical amplifying portion VAP of fringe field amplifying region FFAR_3 is placed to the right of color dots CD_3_1, CD_3_2, and CD_3_3 and is separated from color dots CD_3_1, CD_3_2, and CD_3_3 by a horizontal fringe field amplifying region spacing HFFARS. Horizontal amplifying portion HAP_3 extends between color dot CD_3_2 and color dot CD_3_3. Thus, fringe field amplifying region FFAR_3 extends along the bottom and the right side of color dot CD_3_1; along the top, the bottom and the right side of color dot CD_3_2; and along the top and right side of color dot CD_3_3. Furthermore, this placement also causes the vertical amplifying portion of fringe field amplifying region FFAR_3 to be in between color dots CD_3_1 and CD_1_1 of the adjacent pixel, between color dots CD_3_2 and CD_1_2 of the adjacent pixel, and between color dots CD_3_3 and CD_1_3 of the adjacent pixel.

Pixel design 810 is also designed so that the fringe field amplifying regions receive polarity from an adjacent pixel. Specifically, a conductor is coupled to a fringe field amplifying region to receive polarity from the pixel above the current pixel. Specifically, a conductor 812 of a current pixel would couple the electrode of fringe field amplifying region FFAR_1 to switching element SE_1 (see FIG. 8(d)) of a pixel above the current pixel. The connection to the switching element would be via the electrodes of the color dots of the pixel above the current pixel. Similarly, a conductor 814 of a current pixel would couple the electrode of fringe field amplifying region FFAR_2 to switching element SE_2 (see FIG. 8(d)) of a pixel above the current pixel. The connection to the switching element would be via the electrodes of the color dots of the pixel above the current pixel. A conductor 816 of a current pixel would couple the electrode of fringe field amplifying region FFAR_3 to switching element SE_3 (see FIG. 8(d)) of a pixel above the current pixel. The connection to the switching element would be via the electrodes of the color dots of the pixel above the current pixel.

The polarities of the color dots, fringe field amplifying regions, and switching elements are shown using "+" and "−" signs. Thus, in FIG. 8(a), which shows the positive dot polarity pattern of pixel design 810+, all the switching elements (i.e. switching elements SE_1, SE_2, and SE_3); all the color dots (i.e. color dots CD_1_1, CD_1_2, CD_1_3, CD_2_1, CD_2_2, CD_2_3, CD_3_1, CD_3_2, and CD_3_3) have positive polarity. However, all the fringe field amplifying regions (i.e. fringe field amplifying regions FFAR_1, FFAR_2, and FFAR_3) have negative polarity.

Figure 8B:
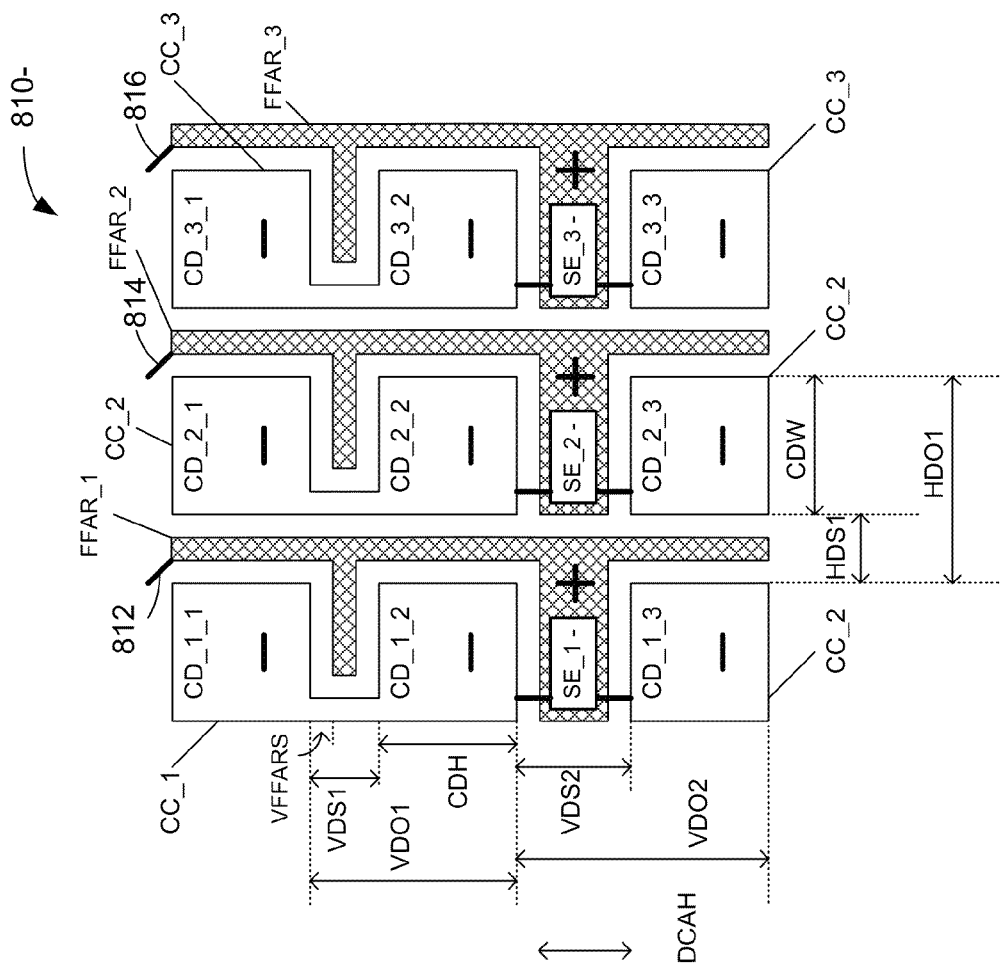
Figure 8C:
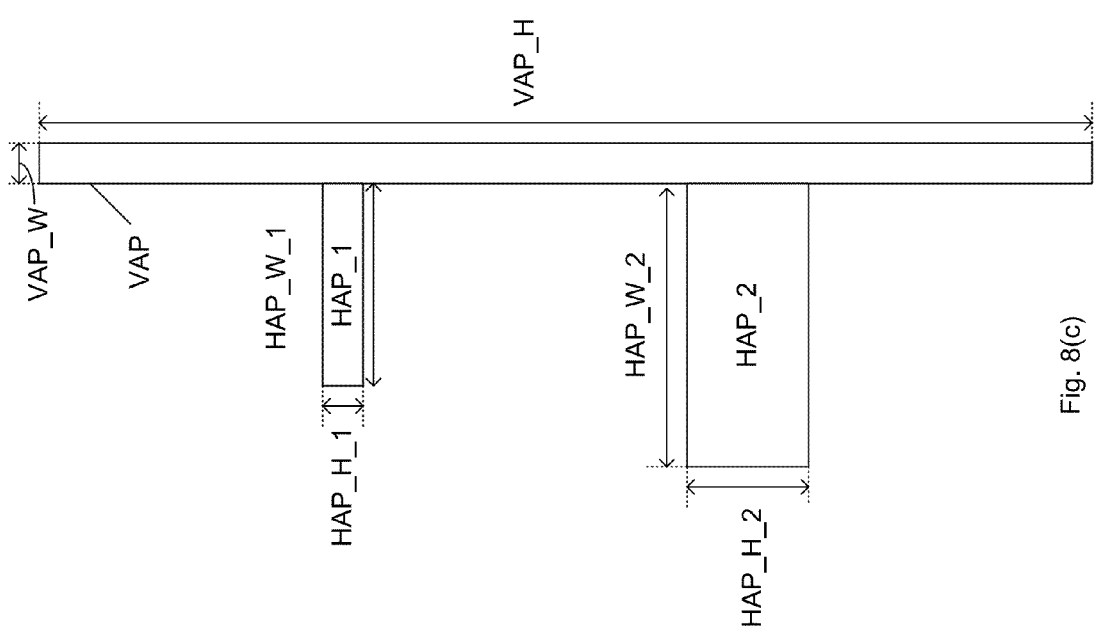
FIG. 8(c) is an enlarged view of a fringe field amplifying region in accordance with one embodiment of the present invention.

FIG. 8(b) shows pixel design 810 with the negative dot polarity pattern. For the negative dot polarity pattern, all the switching elements (i.e. switching elements SE_1, SE_2, and SE_3) and all the color dots (i.e. color dots CD_1_1, CD_1_2, CD_1_3, CD_2_1, CD_2_2, CD_2_3, CD_3_1, CD_3_2, and CD_3_3) have negative polarity. However, all the fringe field amplifying regions (i.e. fringe field amplifying regions FFAR_1, FFAR_2, and FFAR_3) have positive polarity.

As explained above fringe fields in each of the color dots are amplified if adjacent components have opposite polarities. Pixel design 810 makes use of the fringe field amplifying regions to further enhance the formation of multiple domain liquid crystal structure. In general, the polarities of the polarized components are assigned so that a color dot of a first polarity has neighboring polarized components of the second polarity. For example for the positive dot polarity pattern of pixel design 810 (FIG. 8(a)), color dot CD_2_2 has positive polarity. However the neighboring polarized components (fringe field amplifying regions FFAR_1 and FFAR_2) have negative polarity. Thus, the fringe field of color dot CD_2_2 is amplified. Furthermore, as explained below, the polarity reversing scheme is carried out at the display level as well so that the color dot of another pixel that is placed next to color dot CD_1_1 would have negative polarity (see FIG. 8(d)).

Figure 8D:
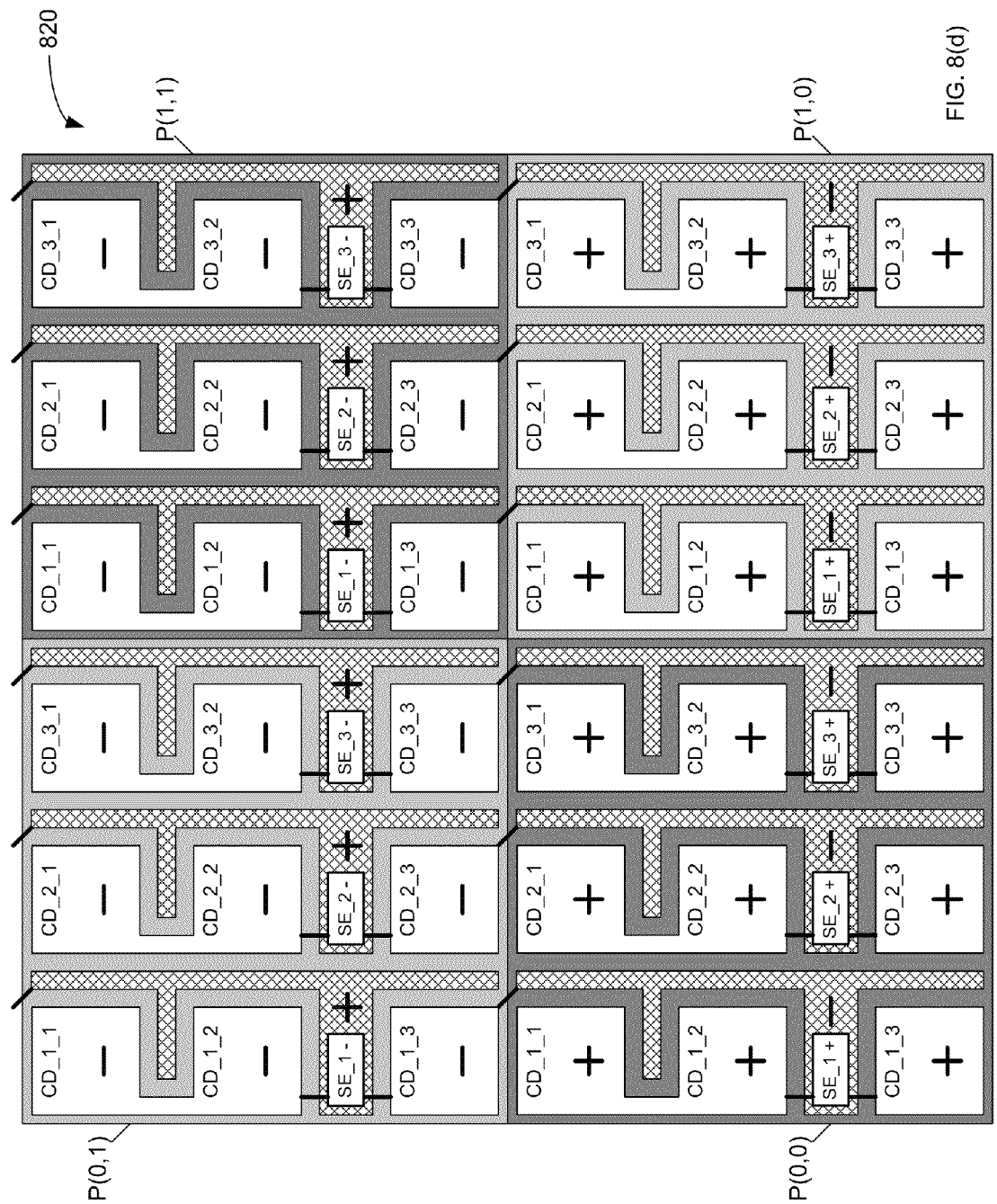
FIG. 8(d) illustrates a portion of a liquid crystal display in accordance with one embodiment of the present invention.

Pixels using pixel design 810 of FIGS. 8(a) and 8(b) can be used in displays using switching element row inversion driving schemes. FIG. 8(d) shows a portion of display 820 using pixels P(0, 0), P(1, 0), P(0, 1), and P(1, 1) of pixel design 810 with a switching element row inversion driving scheme. Display 820 could have thousands of rows with thousand of pixels on each row. The rows and columns would continue from the portion shown in FIG. 8(d) in the manner shown in FIG. 8(d). For clarity, the gate lines and source lines that control the switching elements are omitted in FIG. 8(d). The Gate lines and source lines for display 810 would be virtually identical to the gate line and source lines illustrated in FIG. 4(e) except that display 810 would not use fringe field amplifying region switching elements and fringe field amplifying region electrodes. To better illustrate each pixel, the area of each pixel is shaded; this shading is only for illustrative purposes in FIG. 8(d) and has no functional significance. In display 820 the pixels are arranged so that all pixels in a row have the same dot polarity pattern (positive or negative) and each successive row should alternate between positive and negative dot polarity pattern. Thus, pixels P(0, 0) and P(1, 0) in the first row (i.e. row 0) have positive dot polarity pattern and pixels P(0, 1) and P(1, 1) in the second row (i.e. row 1) have the negative dot polarity pattern. However, at the next frame the pixels will switch dot polarity patterns. Thus in general a pixel P(x, y) has a first dot polarity pattern when y is even and a second dot polarity pattern when y is odd.

Pixels on each row of pixels are vertically aligned and separated horizontally so that the right most color dots of a pixel are separated from the leftmost color dot of an adjacent pixel by horizontal dot spacing HDS1. Pixels on a column of pixels are horizontally aligned and separated by a vertical dot spacing VDS3.

As stated above, the fringe field amplifying regions of a first pixel receive polarity from the switching elements of a second pixel. For example, the electrode of fringe field amplifying region FFAR_1 of pixel P(0, 0) is coupled to switching elements SE_1 of pixel P(0, 1) via conductor 812 of pixel P(0, 0) and the electrode of color dot CD_1_3 of pixel P(0, 1). Similarly, the electrode of fringe field amplifying region FFAR_2 of pixel P(0, 0) is coupled to switching elements SE_2 of pixel P(0, 1) via conductor 814 of pixel P(0, 0) color dot CD_2_3 of pixel P(0, 1). In addition, the electrode of fringe field amplifying region FFAR_3 of pixel P(0, 0) is coupled to switching elements SE_3 of pixel P(0, 1) via conductor 816 of pixel P(0, 0) and color dot CD_1_3 pixel P(0, 1).

Variants of pixel design 810 such as a bottom edge pixel design, a top edge pixel design, a left edge pixel design, a top left corner picture design, and a bottom left corner pixel design can be created using modified fringe field amplifying regions. For example, top horizontal amplifying portions can be added for pixels at the top edge of the display, bottom horizontal amplifying regions can be added for pixels at the bottom edge of the display, and left vertical amplifying portions can be added for pixels at the left edge of the display. These variants would be used in a similar manner as described above with respect to display 450 and display 460.

In a particular embodiment of the present invention using pixel design 810, each color dot has a width of 40 micrometers and a height of 60 micrometers. Each fringe field amplifying region has a vertical amplifying portion width of 5 micrometers, a vertical amplifying portion height of 220 micrometers, a horizontal amplifying portion width of HAP_W_1 is 35 micrometers, HAP_W_2 is 45 micrometers, a horizontal amplifying height of 5 micrometers. Horizontal dot spacing HDS1 is 15 micrometers, vertical dot spacing VDS1 is 15 micrometers, vertical dot spacing VDS2 is 25 micrometers, vertical dot spacing VDS3 is 5 micrometers, horizontal fringe field amplifying spacing HFFARS is 5 micrometers, and vertical fringe field amplifying spacing VFFARS is 5 micrometers.

Figure 9A:
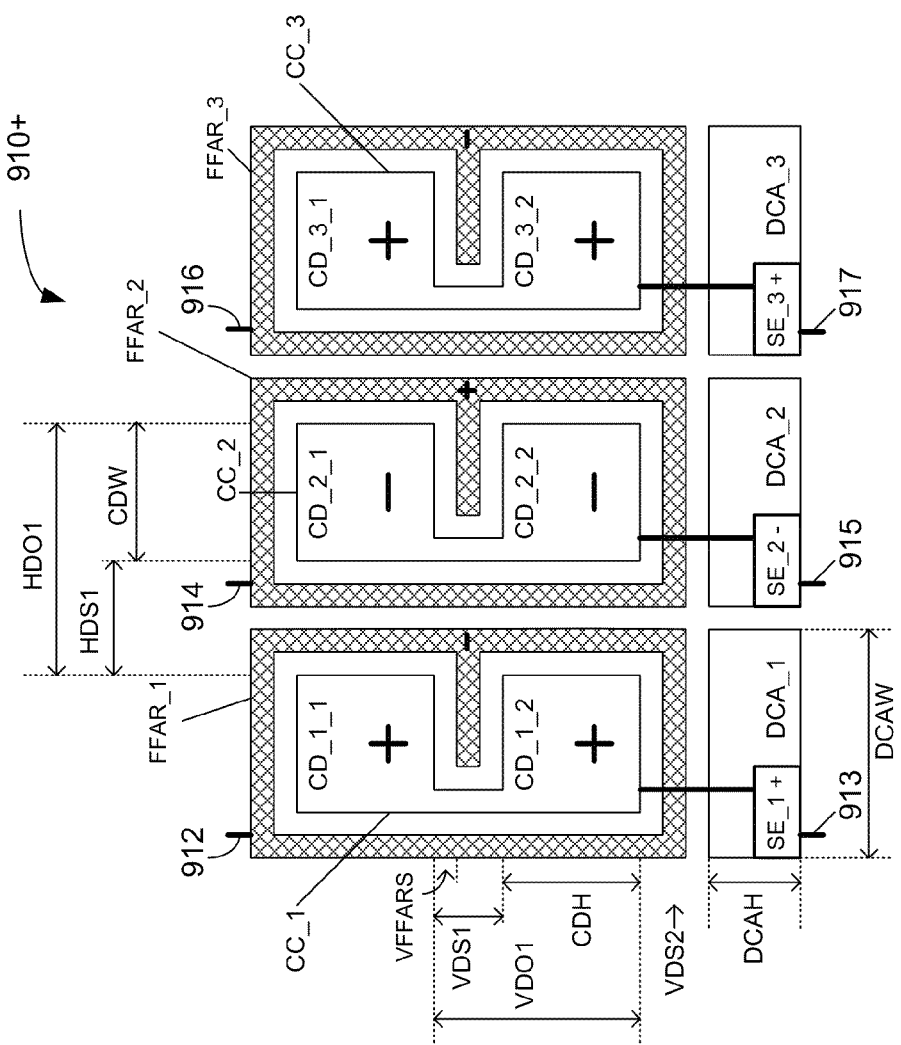
FIGS. 9(a)-9(b) illustrate a pixel design in accordance with one embodiment of the present invention.
Figure 9B:
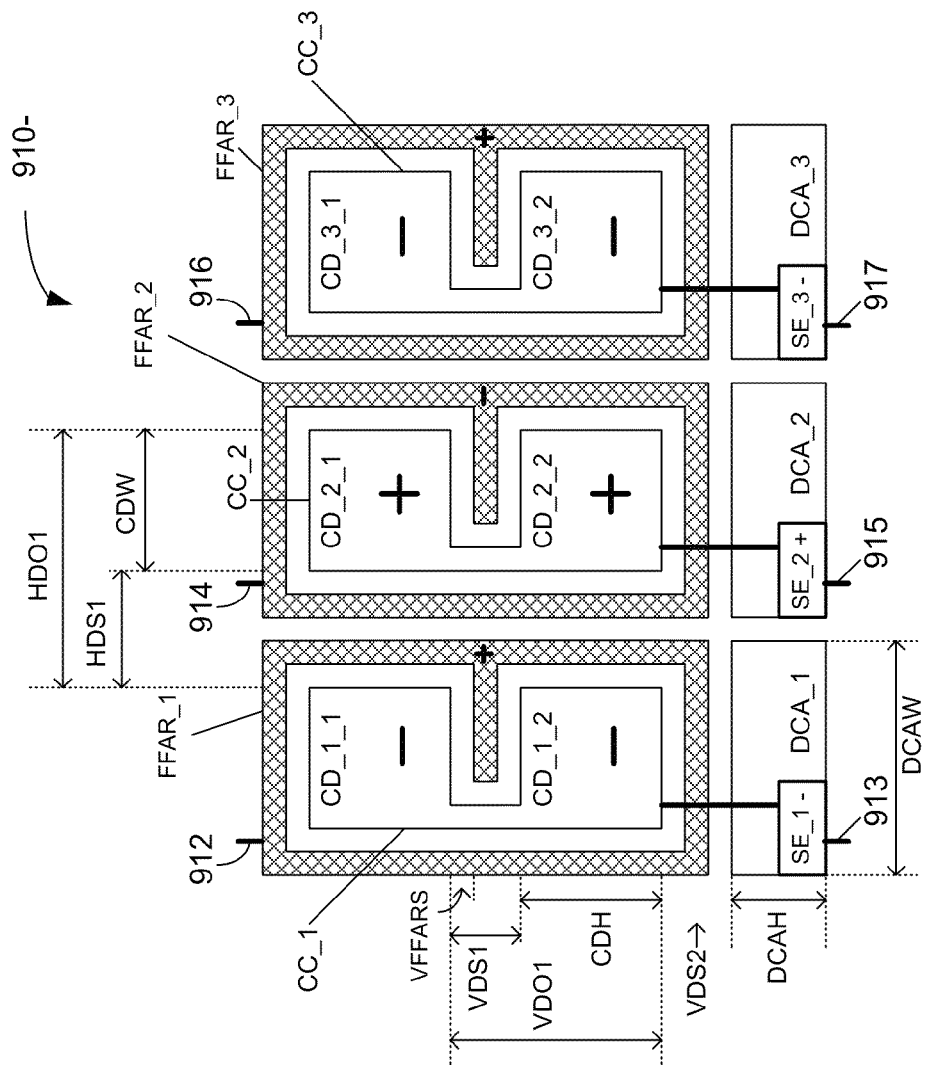

FIGS. 9(a) and 9(b) show different dot polarity patterns of a pixel design 910 (labeled 910+ and 910− as described below) that can be used in displays having a switching element point inversion driving scheme. In actual operation a pixel will switch between a first dot polarity pattern and a second dot polarity pattern between each image frame. Specifically, in FIG. 9(a), pixel design 910 has a positive dot polarity pattern (and is thus labeled 910+) and in FIG. 9(b), pixel design 910 has a negative dot polarity pattern (and is thus labeled 910−). Furthermore, the polarity of each polarized component in the various pixel designs are indicated with "+" for positive polarity or "−" for negative polarity.

Pixel design 910 has three color components CC_1, CC_2 and CC_3. Each of the three color components includes two color dots. Pixel design 910 also includes a switching element (referenced as SE_1, SE_2, and SE_3) for each color component and a fringe field amplifying region (referenced as FFAR_1, FFAR_2, and FFAR_3) for each color component. Switching elements SE_1, SE_2, and SE_3 are arranged in a row. Device component areas DCA_1, DCA_2, and DCA_3 are defined around switching element SE_1, SE_2, and SE_3. Device component areas DCA_1, DCA_2, and DCA_3 have a device component area height DCAH and a device component width DCAW.

First color component CC_1 of pixel design 910 has two color dots CD_1_1 and CD_1_2. Color dots CD_1_1 and CD_1_2 form a column and are separated by a vertical dot pacing VDS1. In other words, color dots CD_1_1 and CD_1_2 are horizontally aligned and vertically separated by vertical dot spacing VDS1. Furthermore, color dots CD_1_1 and CD_1_2 are vertically offset by vertical dot offset VDO1 which is equal to vertical dot spacing VDS1 plus the color dot height CDH. As illustrated by the connection between color dots CD_1_1 and CD_1_2, in some embodiments of the present invention the electrodes of color dot CD_1_1 and CD_1_2 are coupled together in the same process steps as the formation of the electrodes. Device component area DCA_1 is located below color dot CD_1_2 and separated from color dot CD_1_2 by a vertical dot spacing VDS2. Switching element SE_1 is located within device component area DCA_1. Switching element SE_1 is coupled to the electrodes of color dots CD_1_1 and CD_1_2 to control the voltage polarity and voltage magnitude of color dots CD_1_1 and CD_1_2.

Similarly, second color component CC_2 of pixel design 910 has two color dots CD_2_1 and CD_2_2. Color dots CD_2_1 and CD_2_2 form a second column and are separated by a vertical dot spacing VDS1. Thus, color dots CD_2_1 and CD_2_2 are horizontally aligned and vertically separated by vertical dot spacing VDS1. Device component area DCA_2 is located below color dot CD_2_2 and separated from color dot CD_2_2 by vertical dot spacing VDS2. Switching element SE_2 is located within device component area DCA_2. Switching element SE_2 is coupled to the electrodes of color dots CD_2_1 and CD_2_2 to control the voltage polarity and voltage magnitude of color dots CD_2_1 and CD_2_2. Second color component CC_2 is vertically aligned with first color component CC_1 and separated from color component CC_1 by a horizontal dot spacing HDS1, thus color components CC_2 and CC_1 are horizontally offset by a horizontal dot offset HDO1, which is equal to horizontal dot spacing HDS1 plus the color dot width CDW. Specifically with regards to the color dots, color dot CD_2_1 is vertically aligned with color dots CD_1_1 and horizontally separated by horizontal dot spacing HDS1. Similarly, color dot CD_2_2 is vertically aligned with color dots CD_1_2 and horizontally separated by horizontal dot spacing HDS1. Thus color dot CD_1_1 and color dot CD_2_1 form a first row of color dots and color dot CD_1_2 and color dot CD_2_2 form a second row of color dots.

Similarly, third color component CC_3 of pixel design 910 has two color dots CD_3_1 and CD_3_2. Color dots CD_3_1 and CD_3_2 form a third column and are separated by a vertical dot spacing VDS1. Thus, color dots CD_3_1 and CD_3_2 are horizontally aligned and vertically separated by vertical dot spacing VDS1. Device component area DCA_3 is located below color dot CD_3_2 and separated from color dot CD_3_2 by a vertical dot spacing VDS2. Switching element SE_3 is located within device component area DCA_3. Switching element SE_3 is coupled to the electrodes of color dots CD_3_1 and CD_3_2 to control the voltage polarity and voltage magnitude of color dots CD_3_1 and CD_3_2. Third color component CC_3 is vertically aligned with second color component CC_2 and separated from color component CC_2 by horizontal dot spacing HDS1, thus color components CC_3 and CC_2 are horizontally offset by a horizontal dot offset HDO1. Specifically with regards to the color dots, color dot CD_3_1 is vertically aligned with color dots CD_2_1 and horizontally separated by horizontal dot spacing HDS1. Similarly, color dot CD_3_2 is vertically aligned with color dots CD_2_2 and horizontally separated by horizontal dot spacing HDS1. Thus color dot CD_3_1 is on the first row of color dots and color dot CD_3_2 is on the second row of color dots.

Figure 9C:
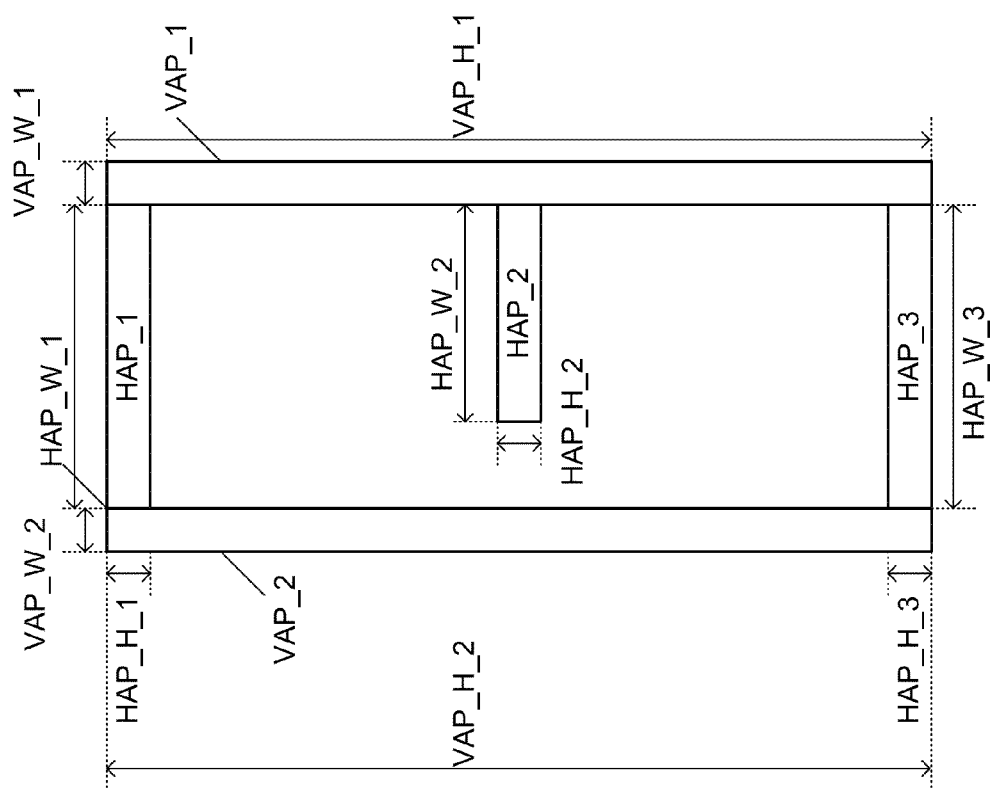
FIG. 9(c) is an enlarged view of a fringe field amplifying region in accordance with one embodiment of the present invention.

Pixel design 910 also includes fringe field amplifying regions FFAR_1, FFAR_2, and FFAR_3. FIG. 9(c) shows a more detailed view of fringe field amplifying region FFAR_1 of pixel design 910. For clarity fringe field amplifying regions FFAR_1 is conceptually divided into a first vertical amplifying portion VAP_1, a second vertical amplifying portion VAP_2, a first horizontal amplifying portion HAP_1, a second horizontal amplifying portion HAP_2, and a third horizontal amplifying portion HAP_3. Vertical amplifying portions VAP_1 and VAP_2 are vertically aligned and horizontally separated by the length of horizontal amplifying portion HAP_1. Horizontal amplifying portion HAP_1 is located at the top of and extends between vertical amplifying portions VAP_1 and VAP_2. Horizontal amplifying portion HAP_2 is vertically centered on and extends to the left of vertical amplifying portion VAP_1. Horizontal amplifying portion HAP_3 is at the bottom of and extends between vertical amplifying portions VAP_1 and VAP_2. As explained above, use of horizontal amplifying portions and vertical amplifying portions allows clearer description of the placement of fringe field amplifying region FFAR1. Horizontal amplifying portions HAP_1, HAP_2, and HAP_3 have horizontal amplifying portion width HAP_W_1, HAP_W_2, and HAP_W_3, respectively, and horizontal amplifying portion height HAP_H_1, HAP_H_2, and HAP_H 3. In the particular embodiment of FIGS. 9(a)-9(d), horizontal amplifying portion widths HAP_W_1 and HAP_W_2 are equal and horizontal amplifying portion widths HAP_W_2 is less than horizontal amplifying widths HAP_W_1 and HAP_W_3. Vertical amplifying portions VAP_1 and VAP_2 have vertical amplifying portion width VAP_W_1 and VAP_W_2, respectively, and vertical amplifying portion heights VAP_H_1 and VAP_H_2, respectively. Fringe field amplifying regions FFAR_2 and FFAR_3 have the same shape as fringe field amplifying region FFAR_1.

As shown in FIG. 9(a), fringe field amplifying regions FFAR_1, FFAR_2, and FFAR_3 are placed around color components CC_1, CC_2, and CC_3, respectively. Specifically, fringe field amplifying region FFAR_1 is placed so that horizontal amplifying portion HAP_2 of fringe field amplifying region FFAR_1 lies in between color dots CD_1_1 and CD_1_2 and is separated from color dots CD_1_1 and CD_1_2 by a vertical fringe field amplifying region spacing VFFARS. Horizontal amplifying portion HAP_2 of fringe field amplifying region FFAR_1 does not extend to the end of the left side of color dots CD_1_1 and CD_1_2 due to the interconnection between color dots CD_1_1 and CD_1_2. Vertical amplifying portion VAP_1 of fringe field amplifying region FFAR_1 is placed to the right of color dots CD_1_1 and CD_1_2 and is separated from color dots CD_1_1 and CD_1_2 by a horizontal fringe field amplifying region spacing HFFARS. Vertical amplifying portion VAP_2 of fringe field amplifying region FFAR_1 is placed to the left of color dots CD_1_1 and CD_1_2 and is separated from color dots CD_1_1 and CD_1_2 by a horizontal fringe field amplifying region spacing HFFARS. Horizontal amplifying portion HAP_1 extends above color dot CD_1_1 and horizontal amplifying portion HAP_3 extends below color dot CD_1_2. Thus, fringe field amplifying region FFAR_1 extends along the top, the bottom, the right side and left side of color dot CD_1_1 and color dot CD_1_2.

Similarly, fringe field amplifying region FFAR_2 is placed so that horizontal amplifying portion HAP_2 of fringe field amplifying region FFAR_2 lies in between color dots CD_2_1 and CD_2_2 and is separated from color dots CD_2_1 and CD_2_2 by a vertical fringe field amplifying region spacing VFFARS. Horizontal amplifying portion HAP_2 of fringe field amplifying region FFAR_2 does not extend to the end of the left side of color dots CD_2_1 and CD_2_2 due to the interconnection between color dots CD_2_1 and CD_2_2. Vertical amplifying portion VAP_1 of fringe field amplifying region FFAR_2 is placed to the right of color dots CD_2_1 and CD_2_2 and is separated from color dots CD_2_1 and CD_2_2 by a horizontal fringe field amplifying region spacing HFFARS. Vertical amplifying portion VAP_2 of fringe field amplifying region FFAR_2 is placed to the left of color dots CD_2_1 and CD_2_2 and is separated from color dots CD_2_1 and CD_2_2 by a horizontal fringe field amplifying region spacing HFFARS. Horizontal amplifying portion HAP_2 extends above color dot CD_2_1 and horizontal amplifying portion HAP_3 extends below color dot CD_2_2. Thus, fringe field amplifying region FFAR_2 extends along the top, the bottom, the left side of and the right side of color dot CD_2_1 and color dot CD_2_2.

Fringe field amplifying region FFAR_3 is placed so that horizontal amplifying portion HAP_2 of fringe field amplifying region FFAR_3 lies in between color dots CD_3_1 and CD_3_2 and is separated from color dots CD_3_1 and CD_3_2 by a vertical fringe field amplifying region spacing VFFARS. Horizontal amplifying portion HAP_3 of fringe field amplifying region FFAR_3 does not extend to the end of the left side of color dots CD_3_1 and CD_3_2 due to the interconnection between color dots CD_3_1 and CD_3_2. Vertical amplifying portion VAP_1 of fringe field amplifying region FFAR_3 is placed to the right of color dots CD_3_1 and CD_3_2 and is separated from color dots CD_3_1 and CD_3_2 by a horizontal fringe field amplifying region spacing HFFARS. Vertical amplifying portion VAP_2 of fringe field amplifying region FFAR_3 is placed to the left of color dots CD_3_1 and CD_3_2 and is separated from color dots CD_3_1 and CD_3_2 by a horizontal fringe field amplifying region spacing HFFARS. Horizontal amplifying portion HAP_1 extends above color dot CD_3_1 and horizontal amplifying portion HAP_3 extends below color dot CD_3_2. Thus, fringe field amplifying region FFAR_3 extends along the top, the bottom, the left side of and the right side of color dot CD_3_1 and color dot CD_3_2.

Pixel design 910 is designed so that the fringe field amplifying regions can receive polarity from an adjacent pixel. Specifically, a first conductor is coupled to a fringe field amplifying region to receive polarity from the pixel above the current pixel and a second conductor is coupled to the switching element to provide polarity to a fringe field amplifying region of a pixel below the current pixel. For example, conductor 912, which is coupled to the electrode of fringe field amplifying region FFAR_1, extends upward to connect to the equivalent conductor of conductor 913 of a pixel above the current pixel to receive polarity. (see FIG. 9(d)). Conductor 913, which is coupled to switching element SE_1 extends downward to connect to the equivalent conductor of conductor 912 in the pixel below the current pixel. Conductors 914 and 915 serve the same purpose for fringe field amplifying region FFAR_2 as conductors 912 and 913 for fringe field amplifying region FFAR_1. In addition, conductors 916 and 917 serve the same purpose for fringe field amplifying region FFAR_3 as conductors 912 and 913 for fringe field amplifying region FFAR_1.

The polarities of the color dots, fringe field amplifying regions, and switching elements are shown using "+" and "−" signs. Thus, in FIG. 9(a), which shows the positive dot polarity pattern of pixel design 910+, switching elements SE_1, and SE_3; color dots CD_1_1, CD_1_2, CD_3_1 and CD_3_2; and fringe field amplifying region FFAR_2 have positive polarity. However, switching element SE_2; color dots CD_2_1 and CD_2_2; and fringe field amplifying regions FFAR_1 and FFAR_3 have negative polarity.

FIG. 9(b) shows pixel design 910 with the negative dot polarity pattern. For the negative dot polarity pattern, switching elements SE_1, and SE_3; color dots CD_1_1, CD_1_2, CD_3_1 and CD_3_2; and fringe field amplifying region FFAR_2 have negative polarity. However, switching element SE_2; color dots CD_2_1 and CD_2_2; and fringe field amplifying regions FFAR_1 and FFAR_3 have negative positive.

As explained above fringe fields in each of the color dots are amplified if adjacent components have opposite polarities. Pixel design 910 makes use of the fringe field amplifying regions to further enhance the formation of multiple domain liquid crystal structure. In general, the polarities of the polarized components are assigned so that a color dot of a first polarity has neighboring polarized components of the second polarity. More specifically for pixel design 910, each color dot is surrounded on four sides by portions of a fringe field amplifying region of an opposite polarity. For example for the positive dot polarity pattern of pixel design 910 (FIG. 9(a)), color dot CD_1_2 has positive polarity and is surrounded by various portions of fringe field amplifying regions FFAR_1, having negative polarity. Thus, the fringe field of color dot CD_1_2 is amplified.

Figure 9D:
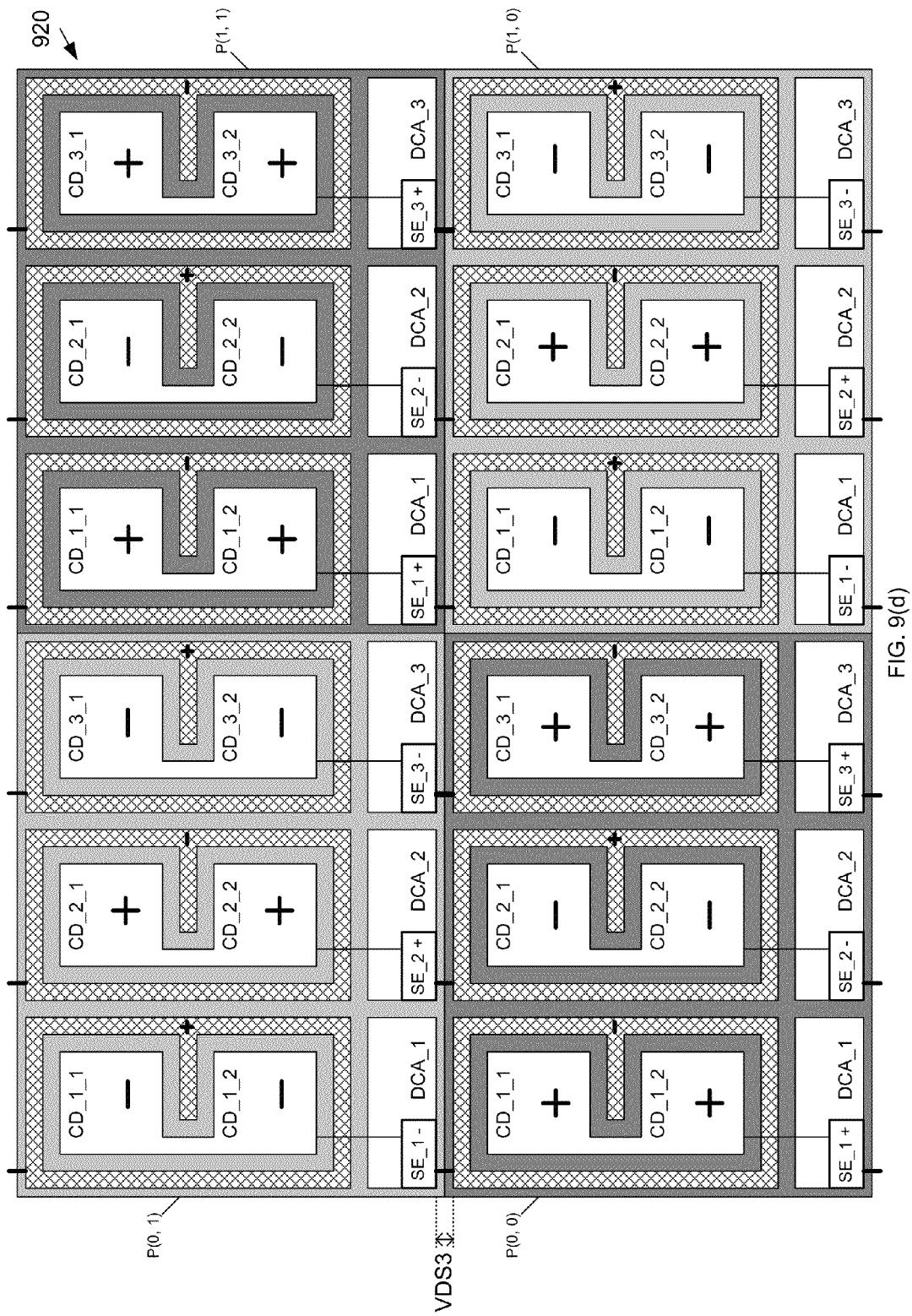
FIG. 9(d) illustrates a portion of a liquid crystal display in accordance with one embodiment of the present invention.

Pixels using pixel design 910 of FIGS. 9(a) and 9(b) can be used in displays using switching element point inversion driving schemes. FIG. 9(d) shows a portion of display 920 using pixels P(0, 0), P(1, 0), P(0, 1), and P(1, 1) of pixel design 910 with a switching element point inversion driving scheme. Display 920 could have thousands of rows with thousand of pixels on each row. The rows and columns would continue from the portion shown in FIG. 9(d) in the manner shown in FIG. 9(d). For clarity, the gate lines and source lines that control the switching elements are omitted in FIG. 9(d). To better illustrate each pixel, the area of each pixel is shaded; this shading is only for illustrative purposes in FIG. 9(d) and has no functional significance. In display 920 the pixels are arranged so that pixels in a row alternate dot polarity patterns (positive or negative) and pixels in a column also alternate between positive and negative dot polarity pattern. Thus, pixels P(0, 0) and P(1, 1) have positive dot polarity pattern and pixels P(0, 1) and P(1, 0) have the negative dot polarity pattern. However, at the next frame the pixels will switch dot polarity patterns. Thus in general a pixel P(x, y) has a first dot polarity pattern when x+y is even and a second dot polarity pattern when x+y is odd. Pixels on each row of pixels are vertically aligned and separated horizontally so that the right most color dots of a pixel are separated from the leftmost color dot of an adjacent pixel by horizontal dot spacing HDS1. Pixels on a column of pixels are horizontally aligned and separated by a vertical dot spacing VDS3.

As stated above, the fringe field amplifying regions of a first pixel receive polarity from the switching elements of a second pixel. For example, the electrode of fringe field amplifying region FFAR_1 of pixel P(0, 0) is coupled to switching elements SE_1 of pixel P(0, 1) via conductor 912 of pixel P(0, 0) and conductor 913 of pixel P(0, 1). Similarly, the electrode of fringe field amplifying region FFAR_2 of pixel P(0, 0) is coupled to switching elements SE_2 of pixel P(0, 1) via conductor 914 of pixel P(0, 0) and conductor 915 of pixel P(0, 1). In addition, the electrode of fringe field amplifying region FFAR_3 of pixel P(0, 0) is coupled to switching elements SE_3 of pixel P(0, 1) via conductor 917 of pixel P(0, 0) and conductor 917 of pixel P(0, 1).

In a particular embodiment of the present invention, each color dot has a width of 40 micrometers and a height of 60 micrometers. Each fringe field amplifying region has a vertical amplifying portion width of 5 micrometers, a vertical amplifying portion height of 155 micrometers, a horizontal amplifying portion width of 45 micrometers, a horizontal amplifying height of 5 micrometers. Horizontal dot spacing HDS1 is 15 micrometers, vertical dot spacing VDS1 is 15 micrometers, vertical dot spacing VDS2 is 15 micrometers, vertical dot spacing VDS3 is 5 micrometers, horizontal fringe field amplifying spacing HFFARS is 5 micrometers, and vertical fringe field amplifying spacing VFFARS is 5 micrometers.

Figure 9E:
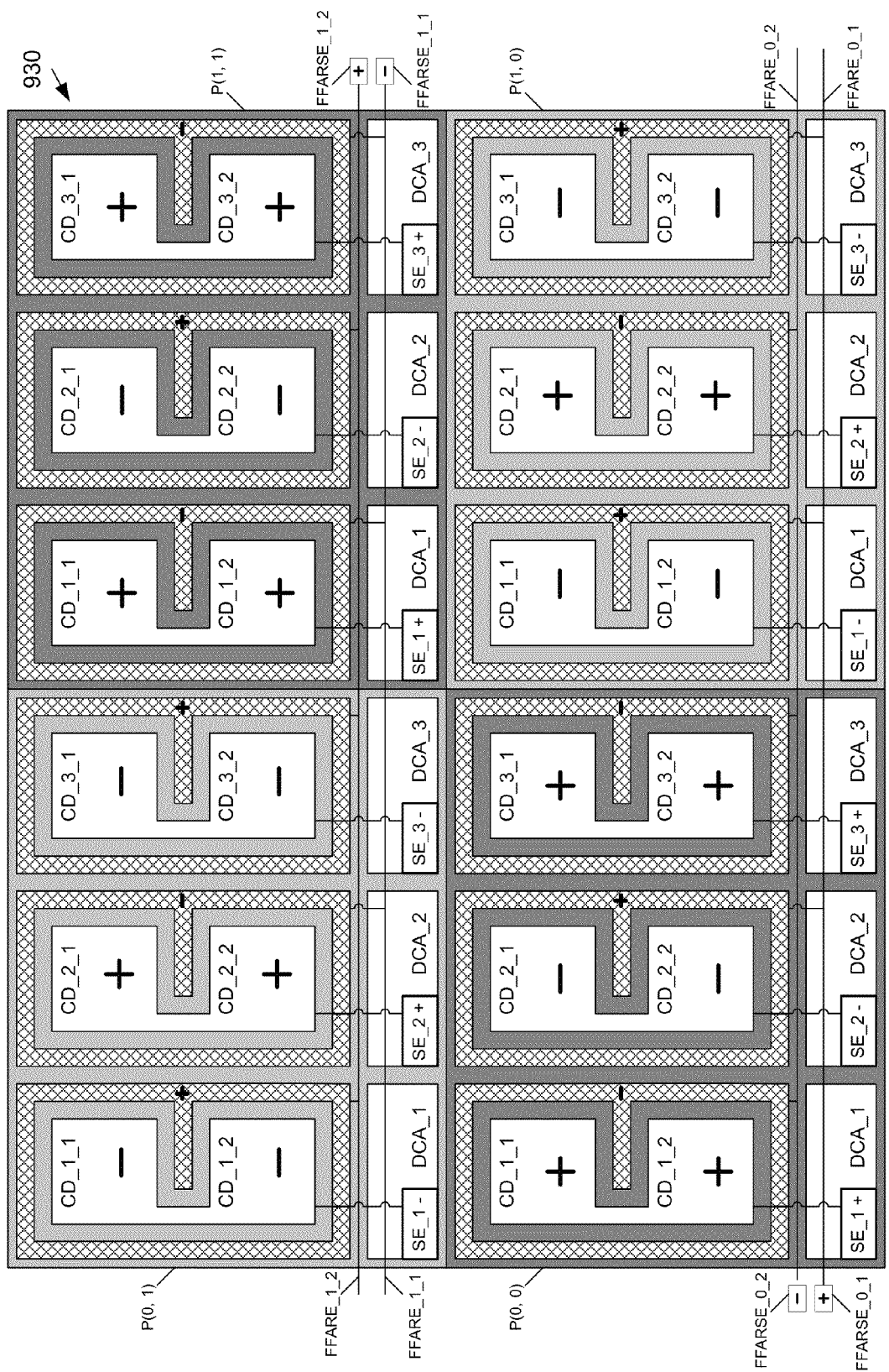
FIG. 9(e) illustrates a portion of a liquid crystal display in accordance with one embodiment of the present invention.

Pixel design 910 can easily be adapted for use in displays having fringe field amplifying region switching elements and fringe field amplifying regions electrodes. As illustrated in FIG. 9(e), a display 930 uses modified pixel design 910 in which conductors 912, 913, 914, 915, 916 and 917 omitted. Specifically, FIG. 9(e) shows a portion of display 930 using pixels P(0, 0), P(1, 0), P(0, 1), and P(1, 1) of pixel design 910 with a switching element row inversion driving scheme. Display 930 could have thousands of rows with thousand of pixels on each row. The rows and columns would continue from the portion shown in FIG. 9(e) in the manner shown in FIG. 9(e). For clarity, the gate lines and source lines that control the switching elements are omitted in FIG. 9(e). Furthermore, to better illustrate each pixel, the area of each pixel is shaded; this shading is only for illustrative purposes in FIG. 9(e) and has no functional significance. In display 930 the pixels are arranged so that pixels in a row alternate dot polarity patterns (positive or negative) and pixels in a column also alternate between positive and negative dot polarity pattern. Thus, pixels P(0, 0) and P(1, 1) have positive dot polarity pattern and pixels P(0, 1) and P(1, 0) have the negative dot polarity pattern. However, at the next frame the pixels will switch dot polarity patterns. Thus in general a pixel P(x, y) has a first dot polarity pattern when x+y is even and a second dot polarity pattern when x+y is odd.

Pixels on each row of pixels are vertically aligned and separated horizontally so that the right most color dots of a pixel are separated from the left most color dot of an adjacent pixel by horizontal dot spacing HDS1. Pixels on a column of pixels are horizontally aligned and separated by a vertical dot spacing VDS3.

For display 930, the fringe field amplifying regions of a pixel using pixel design 910 receives proper polarity from outside the pixel. Furthermore the fringe field amplifying regions within a pixel have both positive and negative polarity. Thus in display 930, each row of pixels has two corresponding fringe field amplifying region switching elements, each of which is coupled to one of a pair of a fringe field amplifying electrode that extends across display 930. The fringe field amplifying regions of the pixels in the corresponding row of pixels are coupled to the appropriate fringe field amplifying electrode to receive polarity from the fringe field amplifying region switching elements. Specifically for row 0, fringe field amplifying region switching elements FFARSE_0_1 and FFARSE_0_2 are on the left side of display 930. Fringe field amplifying region electrode FFARE_0_1 is coupled to fringe field amplifying region switching element FFARSE_0_1 and extends across display 930. Fringe field amplifying region electrode FFARE_0_2 is coupled to fringe field amplifying region switching element FFARSE_0_2 and extends across display 930. As shown in FIG. 9(e), fringe field amplifying regions FFAR_2 of pixel P(0, 0) and fringe field amplifying regions FFAR_1 and FFAR_3 of pixel P(1, 0) are coupled to fringe field amplifying region electrode FFARE_0_1. Conversely, fringe field amplifying regions FFAR_1 and FFAR_3 of pixel P(0, 0) and fringe field amplifying region FFAR_2 of pixel P(1, 0) are coupled to fringe field amplifying region electrode FFARE_0_2. As shown in FIG. 9(e), fringe field amplifying region switching elements FFARSE_0_1 has positive polarity and FFARSE_0_2 has negative. However in the next frame the polarities are reversed.

Specifically for row 1, fringe field amplifying region switching elements FFARSE_1_1 and FFARSE_1_2 are on the right side of display 930. However, in another embodiment of the present invention the fringe field amplifying region switching elements are all located on the same side of the display. Fringe field amplifying region electrode FFARE_1_1 is coupled to fringe field amplifying region switching element FFARSE_1_1 and extends across display 930. Fringe field amplifying region electrode FFARE_1_2 is coupled to fringe field amplifying region switching element FFARSE_1_2 and extends across display 930. As shown in FIG. 9(e), fringe field amplifying regions FFAR_2 of pixel P(0, 1) and fringe field amplifying regions FFAR_1 and FFAR_3 of pixel P(1, 1) are coupled to fringe field amplifying region electrode FFARE_1_1. Conversely, fringe field amplifying regions FFAR_1 and FFAR_3 of pixel P(0, 1) and fringe field amplifying region FFAR_2 of pixel P(1, 1) are coupled to fringe field amplifying region electrode FFARE_1_2. As shown in FIG. 9(e), fringe field amplifying region switching elements FFARSE_1_2 has positive polarity and FFARSE_1_1 has negative. However in the next frame the polarities are reversed.

Figure 10A:
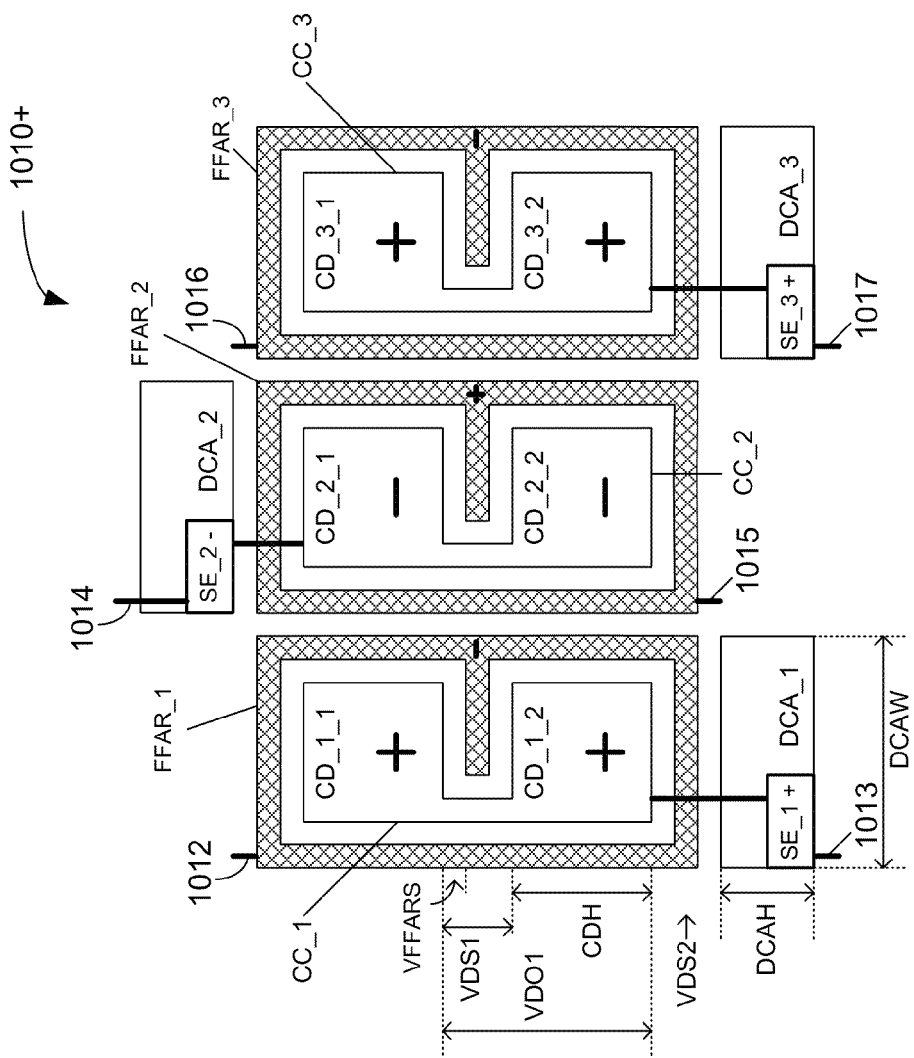
FIGS. 10(a)-10(b) illustrate a pixel design in accordance with one embodiment of the present invention.
Figure 10B:
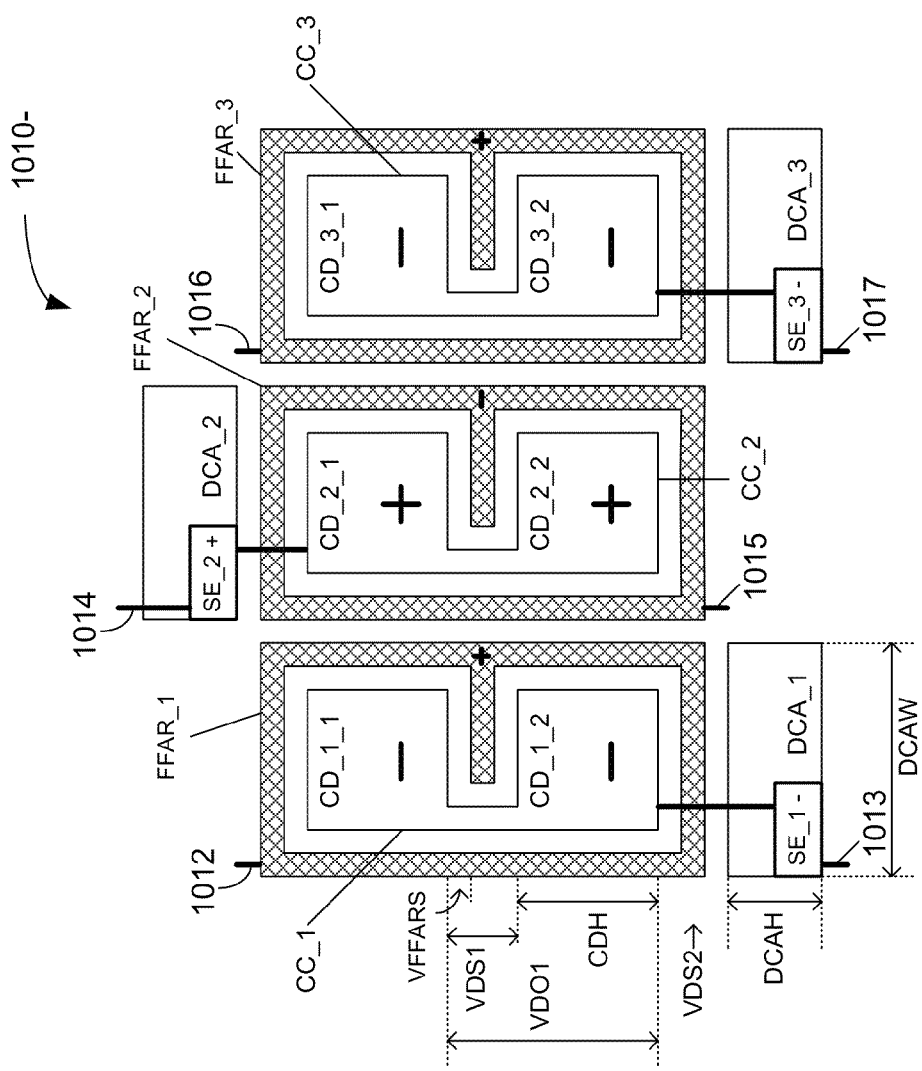
Figure 10C:
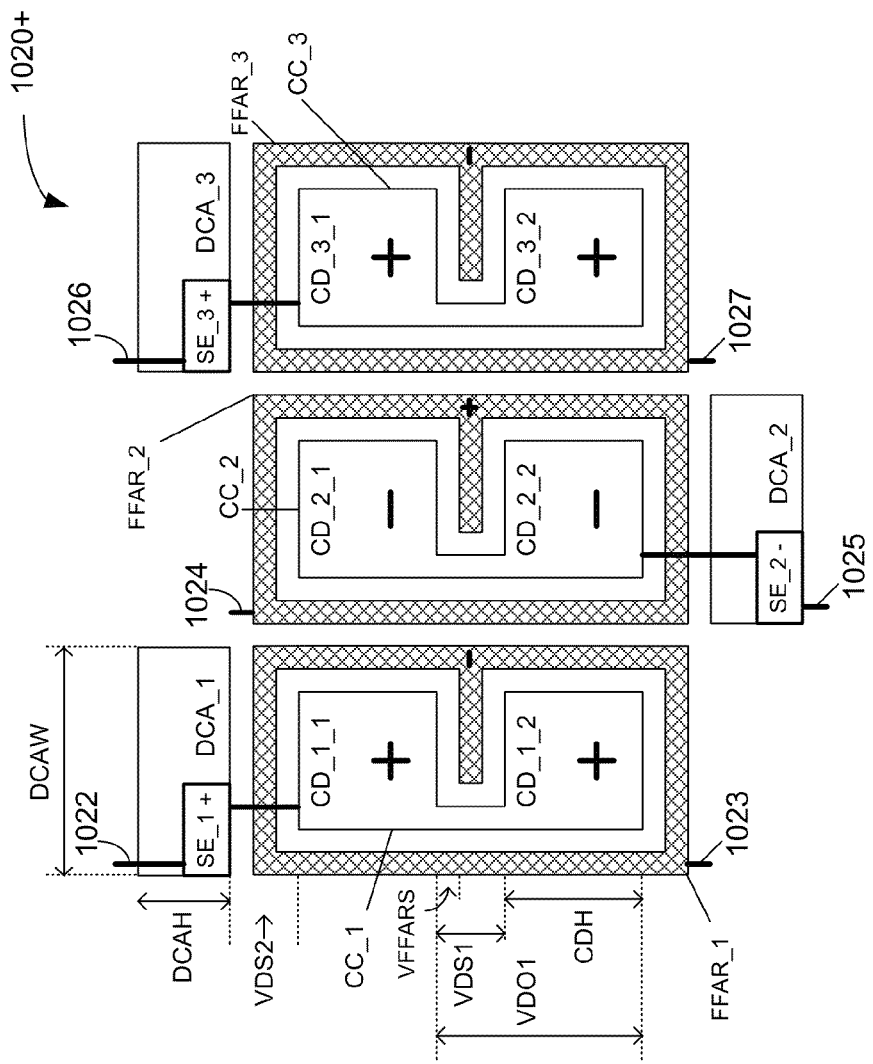
FIGS. 10(c)-10(d) illustrate a pixel design in accordance with one embodiment of the present invention.
Figure 10D:
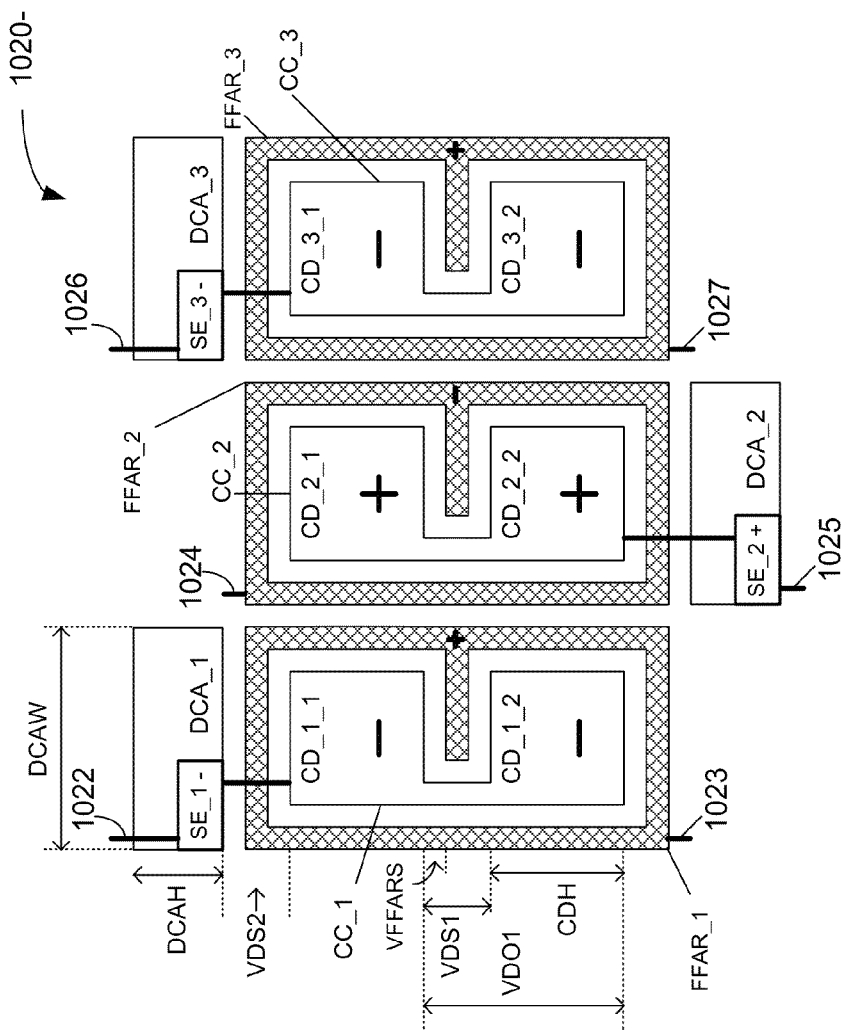
Figure 10E:
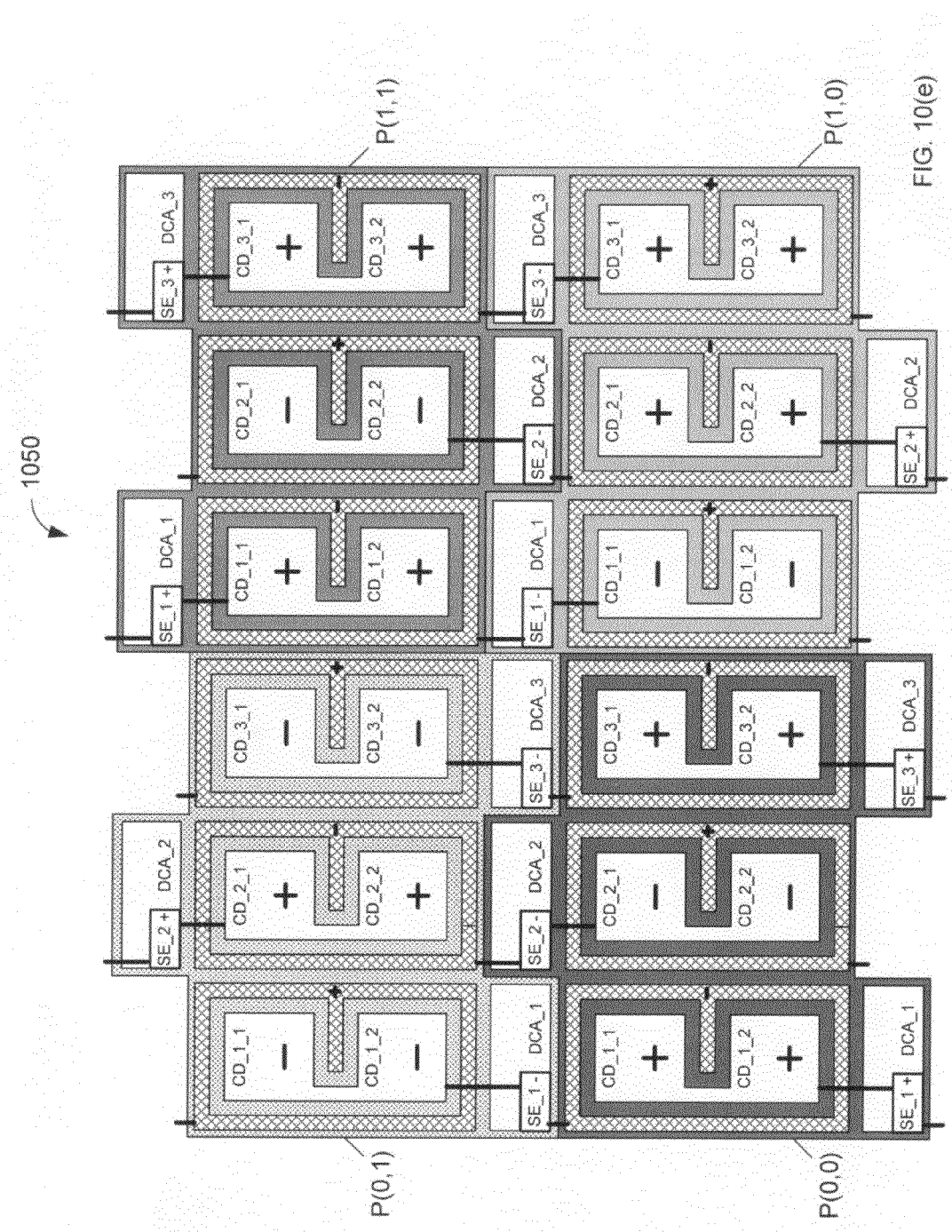
FIG. 10(e) illustrates a portion of a liquid crystal display in accordance with one embodiment of the present invention.

FIGS. 10(a) and 10(b) show the positive and negative dot polarity patterns of a pixel design 1010. The layout of pixel design 1010 is very similar to pixel design 910 (FIGS. 9(a) and 9(b)). Thus for brevity only the differences are described.

Specifically, in pixel design 1010 the color components and the fringe field amplifying regions are in the same position as in pixel design 910. In addition switching elements SE_1 and SE_3, and device component areas DCA_1 and DCA_3 are also in the same location as in pixel design 910. However, in pixel design 1010, switching element SE_2 and device component area DCA_2 is located above color component CC_2 and fringe field amplifying region FFAR_2. Thus, unlike the previous pixel design, the switching elements of pixel design 1010 are in multiple rows. Specifically, the color components of pixel design 1010 are aligned in a line, the switching element SE1 and SE3 are on the first side of the line and switching element SE2 is on a second side of the line. As explained above, each row of switching elements is coupled to a single gate line. Furthermore, only one gate line is active at a time. Thus, for pixel design 1010, switching element SE_2 is active at a different time than switching elements SE_1 and SE_3. A driving scheme that is well suited for pixel design 1010 is described in U.S. patent application Ser. No. 11/751,469 entitled "Low Cost Switching Element Point Inversion Driving Scheme for Liquid Crystal Displays", by Hiap L. Ong, which is incorporated herein by reference.

In the positive dot polarity pattern of pixel design 1010+, which is illustrated in FIG. 10(*a*), color component CC_1 (i.e. color dots CD_1_1 and CD_1_2), color component CC_3 (i.e. color dots CD_3_1 and CD_3_2), fringe field amplifying region FFAR_2, and switching elements SE_1 and SE_3 have positive polarity. Color component CC_2 (i.e. color dots CD_2_1 and CD_2_2), fringe field amplifying regions FFAR_1 and FFAR_3, and switching element SE_2 have negative polarity. In the negative dot polarity pattern of pixel design 1010−, which is illustrated in FIG. 10(*b*), color component CC_1 (i.e. color dots CD_1_1 and CD_1_2), color component CC_3 (i.e. color dots CD_3_1 and CD_3_2), fringe field amplifying region FFAR_2, and switching elements SE_1 and SE_3 have negative polarity. Color component CC_2 (i.e. color dots CD_2_1 and CD_2_2), fringe field amplifying regions FFAR_1 and FFAR_3, and switching element SE_2 have positive polarity.

FIGS. 10(*c*) and 10(*d*) show the positive and negative dot polarity patterns of a pixel design 1020. The layout of pixel design 1020 is very similar to pixel design 910 (FIGS. 9(*a*) and 9(*b*)). Thus for brevity only the differences are described. Specifically, in pixel design 1020 the color components and fringe field amplifying portions are in the same position as in pixel design 910. In addition switching elements SE_2 and device component area DCA_2 are also in the same location as in pixel design 910. However, in pixel design 1020, switching elements SE_1 and SE_3 and device component areas DCA_1 and DCA_3 is located above color components CC_1 (and fringe field amplifying region FFAR_1) and CC_3 (and fringe field amplifying region FFAR_3), respectively. Thus, like pixel design 1010, the switching elements of pixel design 1020 are in multiple rows. In the positive dot polarity pattern of pixel design 1020+, which is illustrated in FIG. 10(*c*), color component CC_1 (i.e. color dots CD_1_1 and CD_1_2), color component CC_3 (i.e. color dots CD_3_1 and CD_3_2), fringe field amplifying region FFAR_2, and switching elements SE_1 and SE_3 have positive polarity. Color component CC_2 (i.e. color dots CD_2_1 and CD_2_2), fringe field amplifying regions FFAR_1 and FFAR_3, and switching element SE_2 have negative polarity. In the negative dot polarity pattern of pixel design 1020−, which is illustrated in FIG. 10(*d*), color component CC_1 (i.e. color dots CD_1_1 and CD_1_2), color component CC_3 (i.e. color dots CD_3_1 and CD_3_2), fringe field amplifying region FFAR_2, and switching elements SE_1 and SE_3 have negative polarity. Color component CC_2 (i.e. color dots CD_2_1 and CD_2_2), fringe field amplifying regions FFAR_1 and FFAR_3, and switching element SE_2 have positive polarity.

FIG. 10(*e*) shows a portion of a display 1050 that combines pixels using pixel designs 1010 and pixel design 1020. For clarity, the gate lines and source lines that power the switching elements are omitted in FIG. 10(*e*). To better illustrate each pixel, the area of each pixel is shaded; this shading is only for illustrative purposes in FIG. 10(*e*) and has no functional significance. Each row of display 1050 has alternating pixels of pixel design 1010 and pixel design 1020. For example in row 0, pixel P(0,0) uses pixel design 1010 and pixel P(1,0) uses pixel design 1020. Pixel P(2,0) (not shown) would use pixel design 1010. Similarly, in row 1, pixel P(0,1) uses pixel design 1010 and pixel P(1,1) uses pixel design 1020, and pixel P(2, 1) (not shown) uses pixel design 1010. The pixels in a row of display 1050 are vertically aligned and horizontally separated by horizontal dot spacing HDS1 (not shown in FIG. 10(*e*)).

Within a column of pixels, the color components of the pixels are horizontally aligned. However, the device component areas of the pixels are horizontally interleaved. Specifically, the top device component areas (and switching elements) of pixels in a first row are vertically aligned with the bottom device component areas (and switching elements) of pixels in a second row (located above the first row). For example, device component area DCA_2 of pixel P(0, 0) is vertically aligned with device component areas DCA_1 and DCA_3 of pixel P(0, 1). Furthermore, device component area DCA_2 of pixel P(0, 0) is located in between device component areas DCA_1 and DCA_3 of pixel P(0, 1).

The pixels in each column alternate between having the positive dot polarity pattern and having the negative dot polarity pattern. Thus for example, on column 0, pixel P(0, 0) has the positive dot polarity pattern and pixel P(0, 1) has the negative dot polarity pattern. Similarly on column 1, pixel P(1, 0) has the negative dot polarity pattern and pixel P(1, 1) has the positive dot polarity pattern. Furthermore, the pixels on each row also alternate between having the positive dot polarity pattern and having the negative dot polarity pattern. Thus for example, on row 0, pixel P(0, 0) has the positive dot polarity pattern and pixel P(1, 0) has the negative dot polarity pattern. Similarly on row 1, pixel P(0, 1) has the negative dot polarity pattern and pixel P(1, 1) has the positive dot polarity pattern. In general a pixel P(X,Y) in display 1050 uses pixel design 1010 where X is even and uses pixel design 1020 where X is odd. Furthermore, pixel P(X,Y) has a first dot polarity pattern when X+Y is even and a second dot polarity pattern when X+Y is odd. Due to the nature of the pixel designs, each row of switching element in display 1050 has the same polarity. Thus, display 1050 uses a switching element row inversion driving scheme. In a particular embodiment of the present invention, each color dot has a width of 43 micrometers and a height of 49 micrometers. Each associated dot has a width of 43 micrometers and a height of 39 micrometers. The horizontal and vertical dot spacing is 4 micrometers.

As illustrated in FIG. 10(*e*), using the pixel designs described above, the color dots of display 1050 have opposite polarity as compared to neighboring polarized components. Thus, the fringe fields in each color dot are amplified to produce multiple liquid crystal domains.

FIGS. 11(*a*) and 11(*b*) show different dot polarity patterns of a pixel design 1110 (labeled 1110+ and 1110−) that can be used in displays having a switching element point inversion driving scheme. In actual operation a pixel will switch between a first dot polarity pattern and a second dot polarity pattern between each image frame. Specifically, in FIG. 11(a), pixel design 1110 has a positive dot polarity pattern (and is thus labeled 1110+) and in FIG. 11(b), pixel design 1110 has a negative dot polarity pattern (and is thus labeled 1110−). Furthermore, the polarity of each polarized component in the various pixel designs are indicated with "+" for positive polarity or "−" for negative polarity.

Pixel design 1110 has three color components CC_1, CC_2 and CC_3. Each of the three color components includes eight color dots. The large number of color dots in each color component makes pixel design 1110 well suited for large screen displays. Pixel design 1110 also includes a switching element (referenced as SE_1, SE_2, and SE_3) for each color component and a fringe field amplifying region (referenced as FFAR_1, FFAR_2, and FFAR_3) for each color component. Switching elements SE_1, SE_2, and SE_3 are arranged in a row. Device component areas DCA_1, DCA_2, and DCA_3 are defined around switching element SE_1, SE_2, and SE_3. Device component areas DCA_1, DCA_2, and DCA_3 have a device component area height DCAH and a device component width DCAW.

The eight color dots of first color component CC_1 of pixel design 1110 dots arranged in an array having two columns of four color dots. The two columns are vertically aligned so that the eight color dots also form four rows of color dots. The columns of color dots are separated by a first horizontal dot spacing HDS1. Each vertically adjacent color dot in a column is separated by a first vertical dot spacing VDS1. Specifically, in the first column of color dots, color dot CD_1_1 is above color dot CD_1_2, which is above color dot CD_1_3, which is above color dot CD_1_4. In the second column of color dots, which is to the right of the first column of color dots and separated from the first column by first horizontal dot spacing HDS1, color dot CD_1_5 is above color dot CD_1_6, which is above color dot CD_1_7, which is above color dot CD_1_8. (As explained above in the notation "color dot CD_X_Y", X specifies a color component CC_X within a pixel, while Y specifies the color dots within color component CC_X.) The color dots are electrically coupled along the outer edge of the array of color dots, except for the space between color dots CD_1_1 and CD_1_5. Specifically, the bottom right corner of color dot CD_1_5 is coupled to the top right corner of color dot CD_1_6; the bottom right corner of color dot CD_1_6 is coupled to the top right corner of color dot CD_1_7, the bottom right corner of color dot CD_1_7 is coupled to the top right corner of color dot CD_1_8; the bottom left corner of color dot CD_1_8 is coupled to the bottom right corner of color dot CD_1_4; the top left corner of color dot CD_1_4 is coupled to the bottom left corner of color dot CD_1_3; the top left corner of color dot CD_1_3 is coupled to the bottom left corner of color dot CD_1_2; and the top left corner of color dot CD_1_2 is coupled to the bottom left corner of color dot CD_1_1. To lower manufacturing cost, the color dots and the connections between the color dots can be formed in a single metal process. However, some embodiments of the present invention may use different process steps to form the color dots and to couple the color dots. Furthermore, some embodiments may couple the color dots of the color component in different locations.

Device component area DCA_1, which is located below color dot CD_1_4 and color dot CD_1_8, is separated from color dot CD_1_4 and color dot CD_1_8 by a vertical dot spacing VDS2. Switching element SE_1 is located within device component area DCA_1. Switching element SE_1 is coupled to the electrodes of the color dots of color component CC_1 (i.e. color dots CD_1_1, CD_1_2, CD_1_3, CD_1_4, CD_1_5, CD_1_6, CD_1_7, and CD_1_8) to control the voltage polarity and voltage magnitude of the color dots of color component CC_1. In some embodiments of the present invention, color dots may overlap the device component areas.

Similarly, second color component CC_2 of pixel design 1110 also has eight color dots arranged in an array having two columns of four color dots. The two columns are vertically aligned so that the eight color dots also form four rows of color dots. Specifically, in the first column of color dots, color dot CD_2_1 is above color dot CD_2_2, which is above color dot CD_2_3, which is above color dot CD_2_4. In the second column of color dots, which is to the right of the first column of color dots, color dot CD_2_5 is above color dot CD_2_6, which is above color dot CD_2_7, which is above color dot CD_2_8. The color dots are electrically coupled along the outer edge of the array of color dots, except for the space between color dots CD_2_1 and CD_2_5. Specifically, the bottom right corner of color dot CD_2_5 is coupled to the top right corner of color dot CD_2_6; the bottom right corner of color dot CD_2_6 is coupled to the top right corner of color dot CD_2_7, the bottom right corner of color dot CD_2_7 is coupled to the top right corner of color dot CD_2_8; the bottom left corner of color dot CD_2_8 is coupled to the bottom right corner of color dot CD_2_4; the top left corner of color dot CD_2_4 is coupled to the bottom left corner of color dot CD_2_3; the top left corner of color dot CD_2_3 is coupled to the bottom left corner of color dot CD_2_2; and the top left corner of color dot CD_2_2 is coupled to the bottom left corner of color dot CD_2_1.

Device component area DCA_2, which is located below color dot CD_2_4 and color dot CD_2_8, is separated from color dot CD_2_4 and color dot CD_2_8 by vertical dot spacing VDS2. Switching element SE_2 is located within device component area DCA_2. Switching element SE_2 is coupled to the electrodes of the color dots of color component CC_2 (i.e. color dots CD_2_1, CD_2_2, CD_2_3, CD_2_4, CD_2_5, CD_2_6, CD_2_7, and CD_2_8) to control the voltage polarity and voltage magnitude of the color dots of color component CC_2. Second color component CC_2 is vertically aligned with first color component CC_1 and separated from color component CC_1 by a second horizontal dot spacing HDS2, thus color components CC_2 and CC_1 are horizontally offset by a horizontal color component offset HCCO1, which is equal to a the sum of horizontal dot spacing HDS1 plus horizontal dot spacing HDS2 plus two times the color dot width CDW. In one embodiment of the present invention, horizontal dot spacing HDS2 is larger than horizontal dot spacing HDS1. In this embodiment the larger distance allows a signal line, such as a source line for the switching elements, to run color component CC_1 and color component CC_2. The space between the columns of a color component can be made smaller because fringe fiend amplifying regions can be formed using ITO lines, which can be made thinner than signal lines.

Specifically with regards to the color dots, color dot CD_2_1 is vertically aligned with color dots CD_1_5 and horizontally separated by horizontal dot spacing HDS2. Similarly, color dots CD_2_2, CD_2_3, and CD_2_4, are vertically aligned with color dots CD_1_6, CD_1_7, and CD_1_8, respectively, and horizontally separated by horizontal dot spacing HDS2.

Similarly, third color component CC_3 of pixel design 1110 also has eight color dots arranged in an array having two columns of four color dots. The two columns are vertically aligned so that the eight color dots also form four rows of color dots. Specifically, in the first column of color dots, color dot CD_3_1 is above color dot CD_3_2, which is above color dot CD_3_3, which is above color dot CD_3_4. In the second column of color dots, which is to the right of the first column of color dots, color dot CD_3_5 is above color dot CD_3_6, which is above color dot CD_3_7, which is above color dot CD_3_8. The color dots are electrically coupled along the outer edge of the array of color dots, except for the space between color dots CD_3_1 and CD_3_5. Specifically, the bottom right corner of color dot CD_3_5 is coupled to the top right corner of color dot CD_3_6; the bottom right corner of color dot CD_3_6 is coupled to the top right corner of color dot CD_3_7, the bottom right corner of color dot CD_3_7 is coupled to the top right corner of color dot CD_3_8; the bottom left corner of color dot CD_3_8 is coupled to the bottom right corner of color dot CD_3_4; the top left corner of color dot CD_3_4 is coupled to the bottom left corner of color dot CD_3_3; the top left corner of color dot CD_3_3 is coupled to the bottom left corner of color dot CD_3_2; and the top left corner of color dot CD_3_2 is coupled to the bottom left corner of color dot CD_3_1.

Device component area DCA_3, which is located below color dot CD_3_4 and color dot CD_3_8, is separated from color dot CD_3_4 and color dot CD_3_8 by vertical dot spacing VDS2. Switching element SE_3 is located within device component area DCA_3. Switching element SE_3 is coupled to the electrodes of the color dots of color component CC_3 (i.e. color dots CD_3_1, CD_3_2, CD_3_3, CD_3_4, CD_3_5, CD_3_6, CD_3_7, and CD_3_8) to control the voltage polarity and voltage magnitude of the color dots of color component CC_3. Third color component CC_3 is vertically aligned with second color component CC_2 and separated from color component CC_2 by horizontal dot spacing HDS2, thus color components CC_3 and CC_2 are horizontally offset by horizontal color component offset HCCO1. Specifically with regards to the color dots, color dot CD_3_1 is vertically aligned with color dots CD_2_5 and horizontally separated by horizontal dot spacing HDS2. Similarly, color dots CD_3_2, CD_3_3, and CD_3_4, are vertically aligned with color dots CD_2_6, CD_2_7, and CD_2_8, respectively, and horizontally separated by horizontal dot spacing HDS2.

Pixel design 1110 also includes fringe field amplifying regions FFAR_1, FFAR_2, and FFAR_3. FIG. 11(c) shows a more detailed view of fringe field amplifying region FFAR_1 of pixel design 110. For clarity fringe field amplifying regions FFAR_1 is conceptually divided into a first vertical amplifying portion VAP_1, a first horizontal amplifying portion HAP_1, a second horizontal amplifying portion HAP_2, a third horizontal amplifying portion HAP_3, a fourth horizontal amplifying portion HAP_4, a fifth horizontal amplifying portion HAP_5, and a sixth horizontal amplifying portion HAP_6. Horizontal amplifying portion HAP_1 is adjacent to vertical amplifying portion VAP_1 and extends to the left. Vertically, horizontal amplifying portion HAP_1 is located approximately at one quarter of the height of vertical amplifying portion VAP_1 (i.e. VAP_H_1) from the top of vertical amplifying portion VAP_1. Horizontal amplifying portion HAP_2 is vertically centered on and extends to the left of vertical amplifying portion VAP_1. Horizontal amplifying portion HAP_3 is vertically located approximately one quarter of the height of vertical amplifying portion VAP_1 from the bottom of vertical amplifying portion VAP_1 extends to the left of vertical amplifying portion VAP_1. Horizontal amplifying portion HAP_4 is vertically aligned with horizontal amplifying portion HAP_1 and is adjacent to but extends to the right of vertical amplifying portion VAP_1. Horizontal amplifying portion HAP_5 is vertically aligned with horizontal amplifying portion HAP_2 and is adjacent to but extends to the right of vertical amplifying portion VAP_1. Horizontal amplifying portion HAP_6 is vertically aligned with horizontal amplifying portion HAP_3 and is adjacent to but extends to the right of vertical amplifying portion VAP_1. As explained above, use of horizontal amplifying portions and vertical amplifying portions allows clearer description of the placement of fringe field amplifying region FFAR1. Horizontal amplifying portions HAP_1, HAP_2, HAP_3, HAP_4, HAP_5, and HAP_6 have horizontal amplifying portion width HAP_W_1, HAP_W_2, HAP_W_3, HAP_W_4, HAP_W_5, and HAP_W_6 respectively, and horizontal amplifying portion height HAP_H_1, HAP_H_2, HAP_H_3, HAP_H_4, HAP_H_5, and HAP_H_6, respectively. In the particular embodiment of FIGS. 11(a)-11(d), the horizontal amplifying portion heights are the same and the horizontal amplifying portion widths are the same. Vertical amplifying portions VAP_1 has vertical amplifying portion width VAP_W_1 and vertical amplifying portion height VAP_H_1. Fringe field amplifying regions FFAR_2 and FFAR_3 have the same shape as fringe field amplifying region FFAR_1.

Figure 11A:
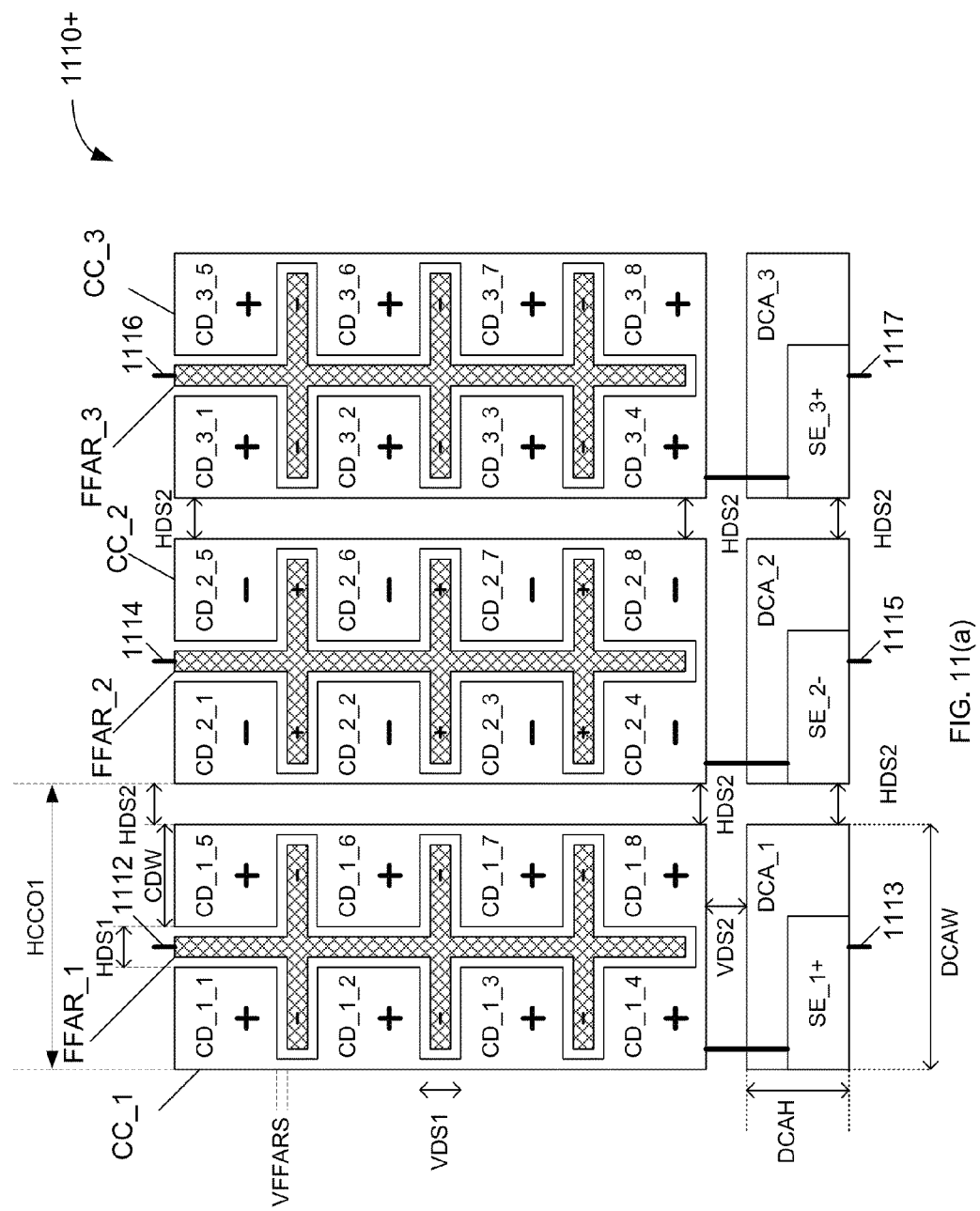
FIGS. 11(a)-11(b) illustrate a pixel design in accordance with one embodiment of the present invention.

As shown in FIG. 11(a), fringe field amplifying regions FFAR_1, FFAR_2, and FFAR_3 are placed within color components CC_1, CC_2, and CC_3, respectively. Specifically, fringe field amplifying region FFAR_1 is placed so that horizontal amplifying portion HAP_1 of fringe field amplifying region FFAR_1 lies in between color dots CD_1_1 and CD_1_2 and is separated from color dots CD_1_1 and CD_1_2 by a vertical fringe field amplifying region spacing VFFARS. Horizontal amplifying portion HAP_1 of fringe field amplifying region FFAR_1 does not extend to the end of the left side of color dots CD_1_1 and CD_1_2 due to the interconnection between color dots CD_1_1 and CD_1_2. Similarly, horizontal amplifying portion HAP_2 of fringe field amplifying region FFAR_1 lies in between color dots CD_1_2 and CD_1_3; horizontal amplifying portion HAP_3 of fringe field amplifying region FFAR_1 lies in between color dots CD_1_3 and CD_1_4; horizontal amplifying portion HAP_4 of fringe field amplifying region FFAR_1 lies in between color dots CD_1_5 and CD_1_6; horizontal amplifying portion HAP_5 of fringe field amplifying region FFAR_1 lies in between color dots CD_1_6 and CD_1_7; and horizontal amplifying portion HAP_6 of fringe field amplifying region FFAR_1 lies in between color dots CD_1_7 and CD_1_8. Vertical amplifying portion VAP_1 of fringe field amplifying region FFAR_1 is placed in between color dots CD_1_1 and CD_1_5, in between color dots CD_1_2 and CD_1_6, in between color dots CD_1_3 and CD_1_7, and in between color dots CD_1_4 and CD_1_8. Vertical amplifying portion VAP_1 is separated from the color dots by a horizontal fringe field amplifying region spacing HFFARS (not specifically labeled in FIG. 11(a)). Thus, fringe field amplifying region FFAR_1 extends along the right side and the bottom of color dot CD_1_1; the top, the right side, and the bottom of color dots CD_1_2 and CD_1_3; the top and the right side of CD_1_4; the left side and the bottom of color dot CD_1_5; the top, the left side, and the bottom of color dots CD_1_6 and CD_1_7; and the top and left side of color dot CD_1_8.

Fringe field amplifying regions FFAR_2 and FFAR_3 is placed within color components CC_2 and CC_3, respectively, in the same manner as described above with respect to fringe field amplifying region FFAR_1 and color component CC_1.

Pixel design 1110 is designed so that the fringe field amplifying regions can receive polarity from an adjacent pixel. Specifically, a first conductor is coupled to a fringe field amplifying region to receive polarity from the pixel above the current pixel and a second conductor is coupled to the switching element to provide polarity to a fringe field amplifying region of a pixel below the current pixel. For example, conductor 1112, which is coupled to the electrode of fringe field amplifying region FFAR_1, extends upward to connect to the equivalent conductor of conductor 1113 of a pixel above the current pixel to receive polarity. (see FIG. 11(d)). Conductor 1113, which is coupled to switching element SE_1 extends downward to connect to the equivalent conductor of conductor 1112 in the pixel below the current pixel. Conductors 1114 and 1115 serve the same purpose for fringe field amplifying region FFAR_2 as conductors 1112 and 1113 for fringe field amplifying region FFAR_1. In addition, conductors 1116 and 1117 serve the same purpose for fringe field amplifying region FFAR_3 as conductors 1112 and 1113 for fringe field amplifying region FFAR_1.

The polarities of the color dots, fringe field amplifying regions, and switching elements are shown using "+" and "−" signs. Thus, in FIG. 11(a), which shows the positive dot polarity pattern of pixel design 1110+, switching elements SE_1, and SE_3; color dots CD_1_1, CD_1_2, CD_1_3, CD_1_4, CD_1_5, CD_1_6, CD_1_7, CD_1_8, CD_3_1, CD_3_2, CD_3_3, CD_3_4, CD_3_5, CD_3_6, CD_3_7, and CD_3_8; and fringe field amplifying region FFAR_2 have positive polarity. However, switching element SE_2; color dots CD_2_1, CD_2_2, CD_2_3, CD_2_4, CD_2_5, CD_2_6, CD_2_7, and CD_2_8; and fringe field amplifying regions FFAR_1 and FFAR_3 have negative polarity.

Figure 11B:
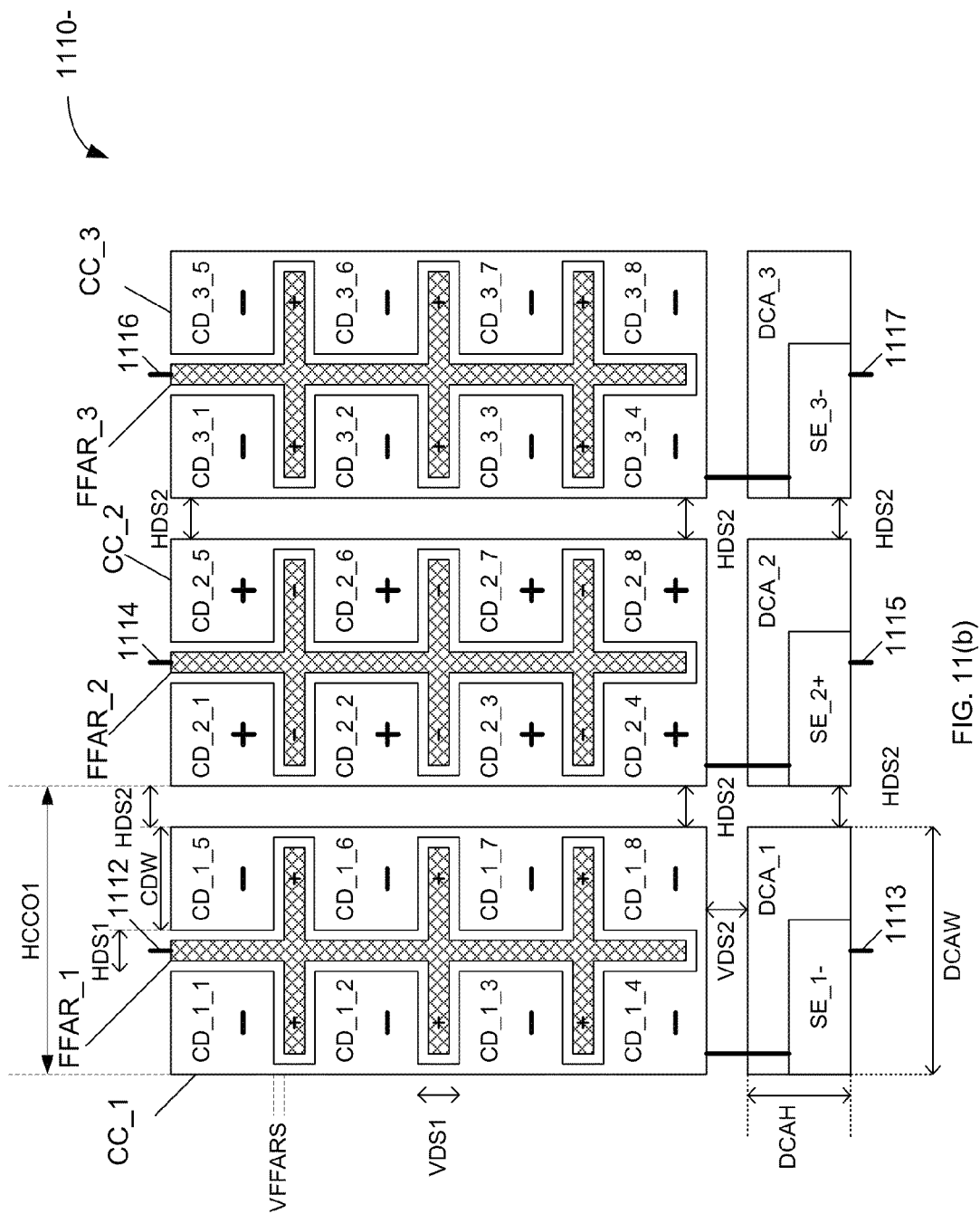
Figure 11C:
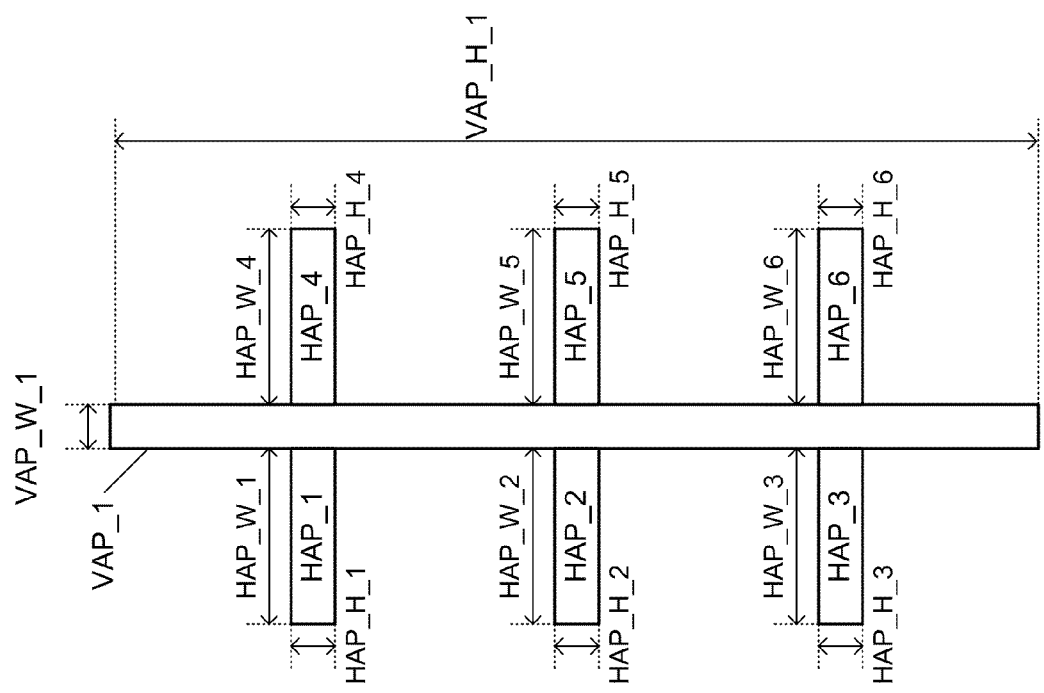
FIG. 11(c) is an enlarged view of a fringe field amplifying region in accordance with one embodiment of the present invention.

FIG. 11(b) shows pixel design 1110 with the negative dot polarity pattern. For the negative dot polarity pattern, switching elements SE_1, and SE_3; color dots CD_1_1, CD_1_2, CD_1_3, CD_1_4, CD_1_5, CD_1_6, CD_1_7, CD_1_8, CD_3_1, CD_3_2, CD_3_3, CD_3_4, CD_3_5, CD_3_6, CD_3_7, and CD_3_8; and fringe field amplifying region FFAR_2 have negative polarity. However, switching element SE_2; color dots CD_2_1, CD_2_2, CD_2_3, CD_2_4, CD_2_5, CD_2_6, CD_2_7, and CD_2_8; and fringe field amplifying regions FFAR_1 and FFAR_3 have positive polarity.

As explained above fringe fields in each of the color dots are amplified if adjacent components have opposite polarities. Pixel design 1110 makes use of the fringe field amplifying regions to further enhance the formation of multiple domain liquid crystal structure. In general, the polarities of the polarized components are assigned so that a color dot of a first polarity has neighboring polarized components of the second polarity. More specifically for pixel design 1110, each color dot is surrounded on two or three sides by portions of a fringe field amplifying region of an opposite polarity. Furthermore, the color dots also are adjacent to a color dot of opposite polarity. For example for the positive dot polarity pattern of pixel design 1110 (FIG. 11(a)), color dot CD_1_6 has positive polarity and is adjacent to portions of fringe field amplifying regions FFAR_1 (which has a negative polarity) at the top, the left side, and bottom of color dot CD_1_6. Furthermore, color dot CD_2_2, which has a negative polarity, is on the right side of color dot CD_1_6. Thus, the fringe field of color dot CD_1_6 is amplified.

Figure 11D:
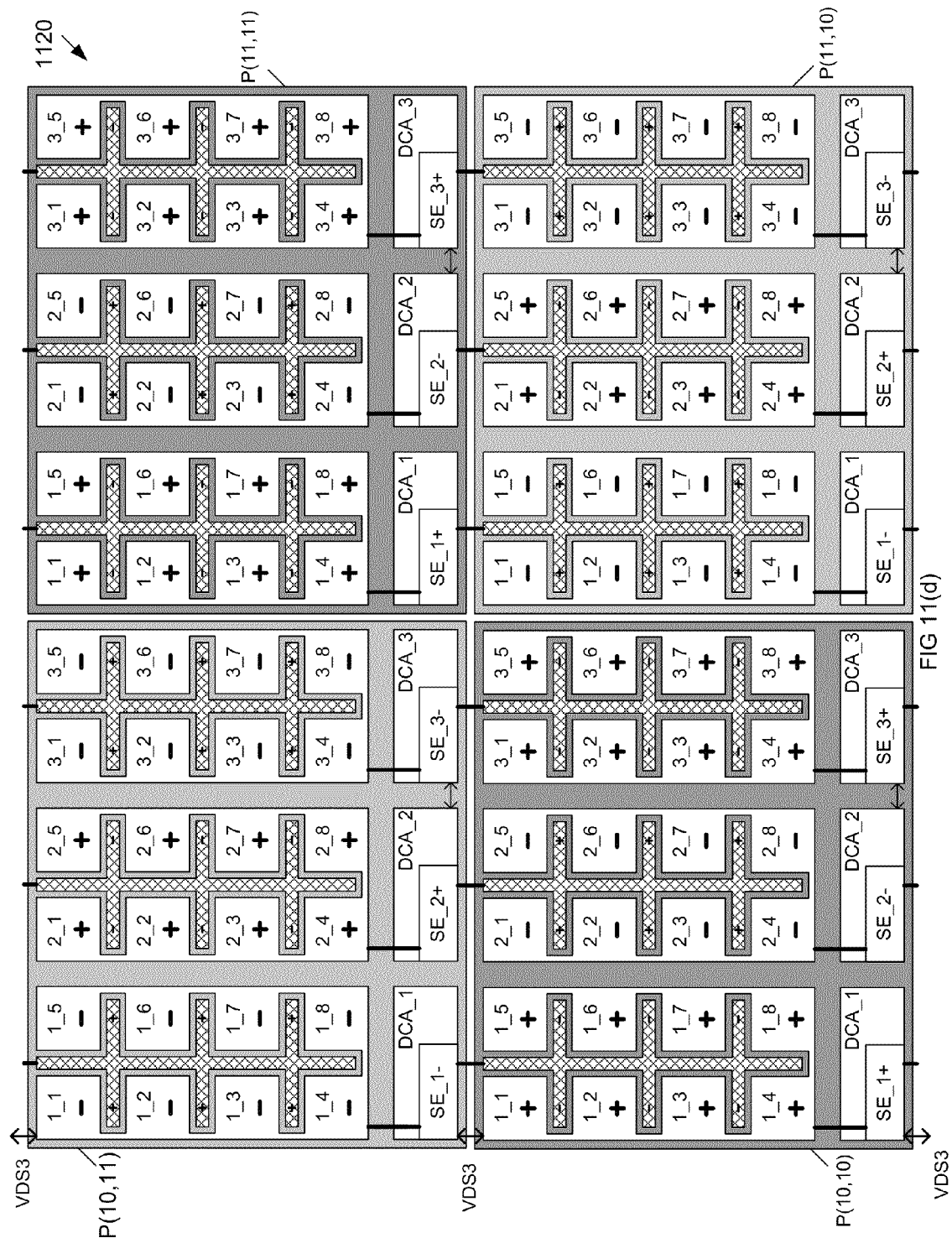
FIG. 11(d) illustrates a portion of a liquid crystal display in accordance with one embodiment of the present invention.

Pixels using pixel design 1110 of FIGS. 11(a) and 11(b) can be used in displays using switching element point inversion driving schemes. FIG. 11(d) shows a portion of display 1120 using pixels P(10, 10), P(11, 10), P(10, 11), and P(11, 11) of pixel design 1110 with a switching element point inversion driving scheme. Display 1120 could have thousands of rows with thousand of pixels on each row. The rows and columns would continue from the portion shown in FIG. 11(d) in the manner shown in FIG. 11(d). For clarity, the gate lines and source lines that control the switching elements are omitted in FIG. 11(d). To better illustrate each pixel, the area of each pixel is shaded; this shading is only for illustrative purposes in FIG. 11(d) and has no functional significance. Furthermore, due to space limitations, color dots are labeled with "X_Y" rather than "CD_X_Y" in FIG. 11(d).

In display 1120 the pixels are arranged so that pixels in a row alternate dot polarity patterns (positive or negative) and pixels in a column also alternate between positive and negative dot polarity pattern. Thus, pixels P(10, 10) and P(11, 11) have positive dot polarity pattern and pixels P(10, 11) and P(11, 10) have the negative dot polarity pattern. However, at the next frame the pixels will switch dot polarity patterns. Thus in general a pixel P(x, y) has a first dot polarity pattern when x+y is even and a second dot polarity pattern when x+y is odd. Pixels on each row of pixels are vertically aligned and separated horizontally so that the right most color dots of a pixel are separated from the leftmost color dot of an adjacent pixel by horizontal dot spacing HDS2. Pixels on a column of pixels are horizontally aligned and separated by a vertical dot spacing VDS3.

As stated above, the fringe field amplifying regions of a first pixel receive polarity from the switching elements of a second pixel. For example, the electrode of fringe field amplifying region FFAR_1 of pixel P(10, 10) is coupled to switching elements SE_1 of pixel P(10, 11) via conductor 1112 of pixel P(10, 10) and conductor 1113 of pixel P(10, 11). Similarly, the electrode of fringe field amplifying region FFAR_2 of pixel P(10, 10) is coupled to switching elements SE_2 of pixel P(10, 11) via conductor 1114 of pixel P(10, 10) and conductor 1115 of pixel P(10, 11). In addition, the electrode of fringe field amplifying region FFAR_3 of pixel P(10, 10) is coupled to switching elements SE_3 of pixel P(10, 11) via conductor 1117 of pixel P(10, 10) and conductor 1117 of pixel P(10, 11).

In a particular embodiment of the present invention, each color dot has a width of 120 micrometers and a height of 360 micrometers. Each color dot has a width of 44 micrometers and a height of 66 micrometers. Each fringe field amplifying region has a vertical amplifying portion width of 5 micrometers, a vertical amplifying portion height of 5 micrometers, a horizontal amplifying portion width of 5 micrometers, a horizontal amplifying height of 5 micrometers. Horizontal dot spacing HDS1 is 17 micrometers, horizontal dot spacing HDS2 is 16 micrometers, vertical dot spacing VDS1 is 17 micrometers, vertical dot spacing VDS2 is 5 micrometers, vertical dot spacing VDS3 is 18 micrometers, horizontal fringe field amplifying spacing HFFARS is 5 micrometers, and vertical fringe field amplifying spacing VFFARS is 6 micrometers.

Various other principles described above can also be used with pixel design 1110. For example, pixel design 1110 can easily be adapted for use in displays having fringe field amplifying region switching elements and fringe field amplifying regions electrodes. (See for example FIG. 7(e) or FIG. 9(e)). Furthermore, variants of pixel design 1110 can be created as edge pixels.

Figure 11E:
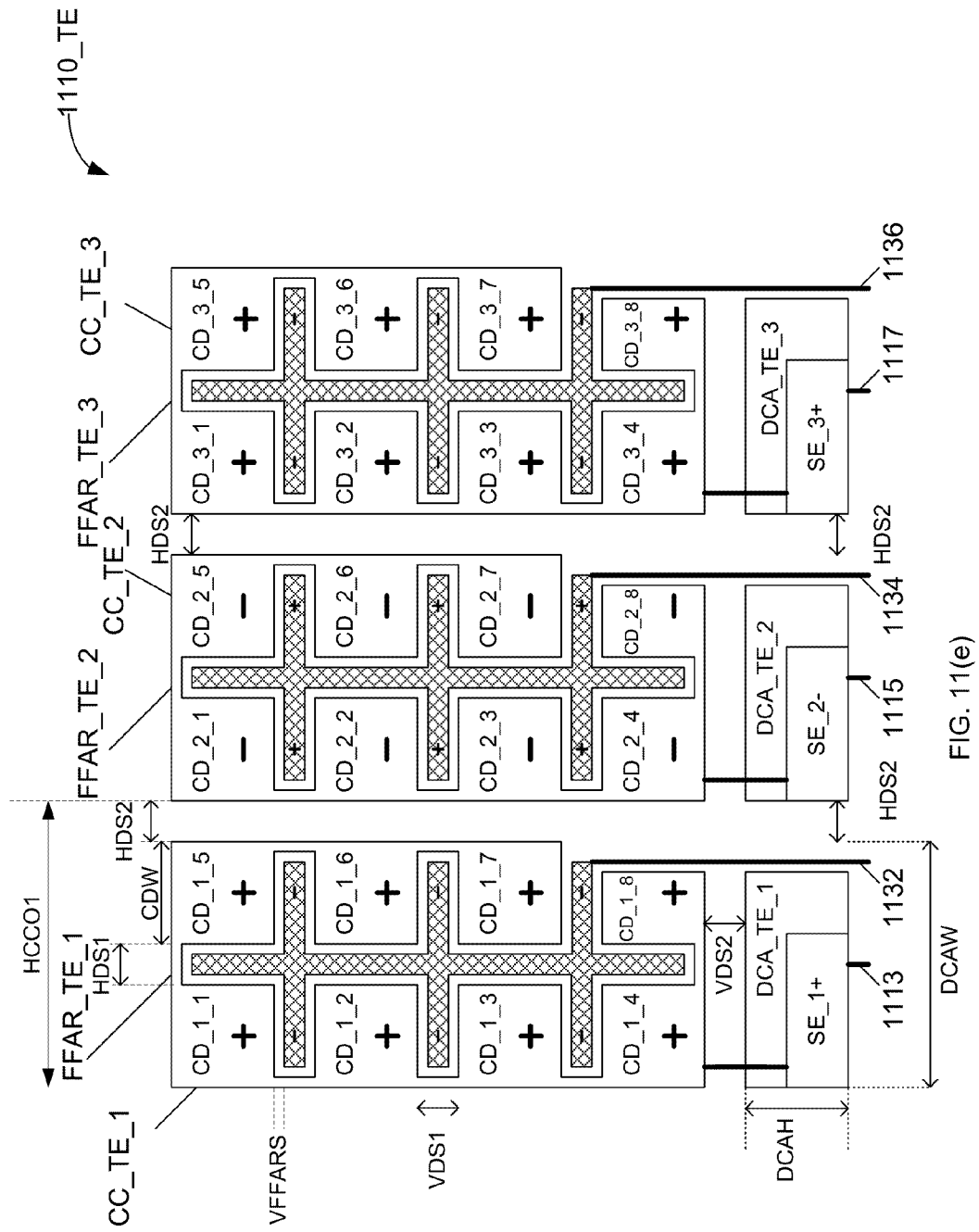
FIG. 11(e) illustrates a pixel design in accordance with one embodiment of the present invention.
Figure 11F:
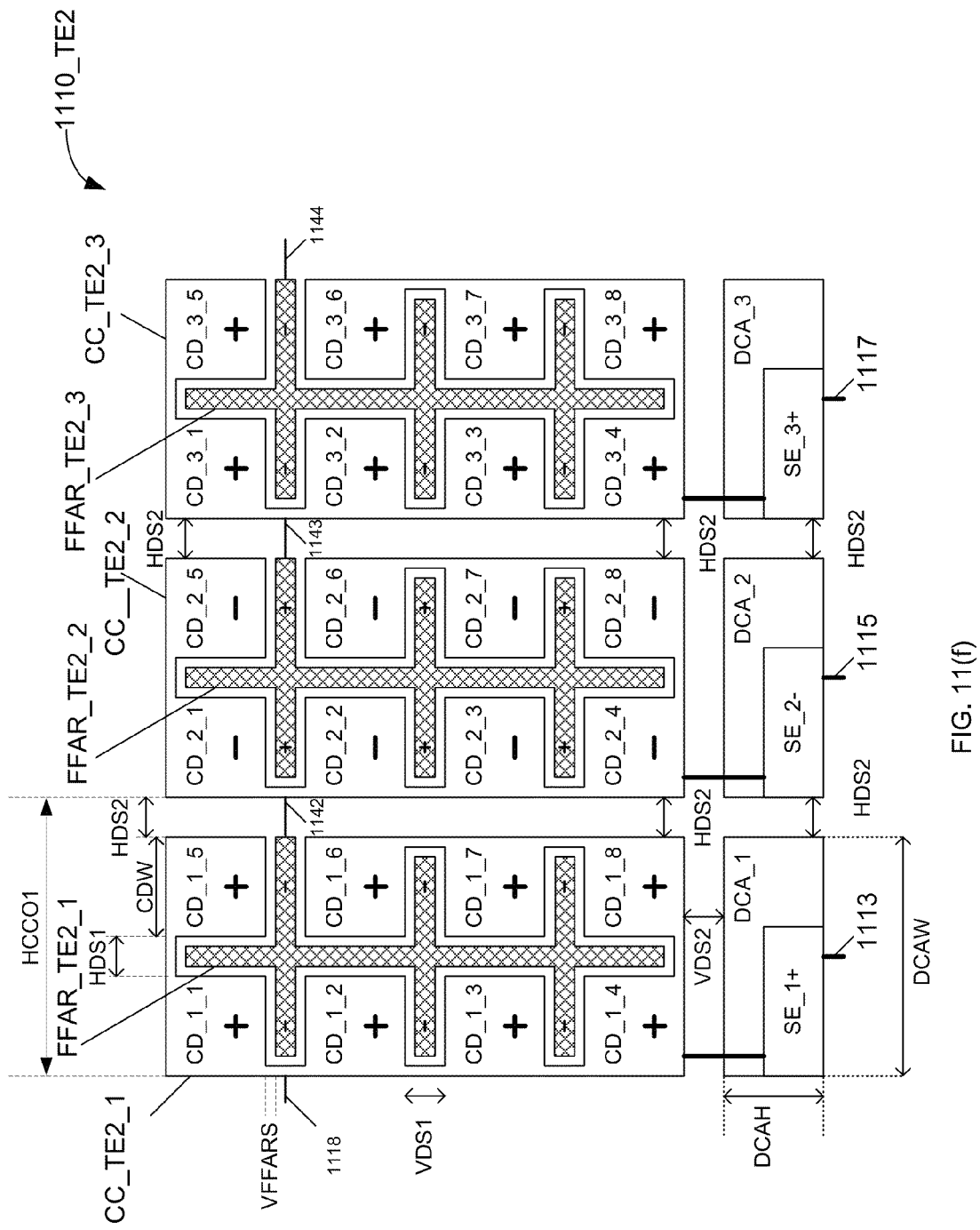
FIG. 11(f) illustrates a pixel design in accordance with one embodiment of the present invention.
Figure 11G:
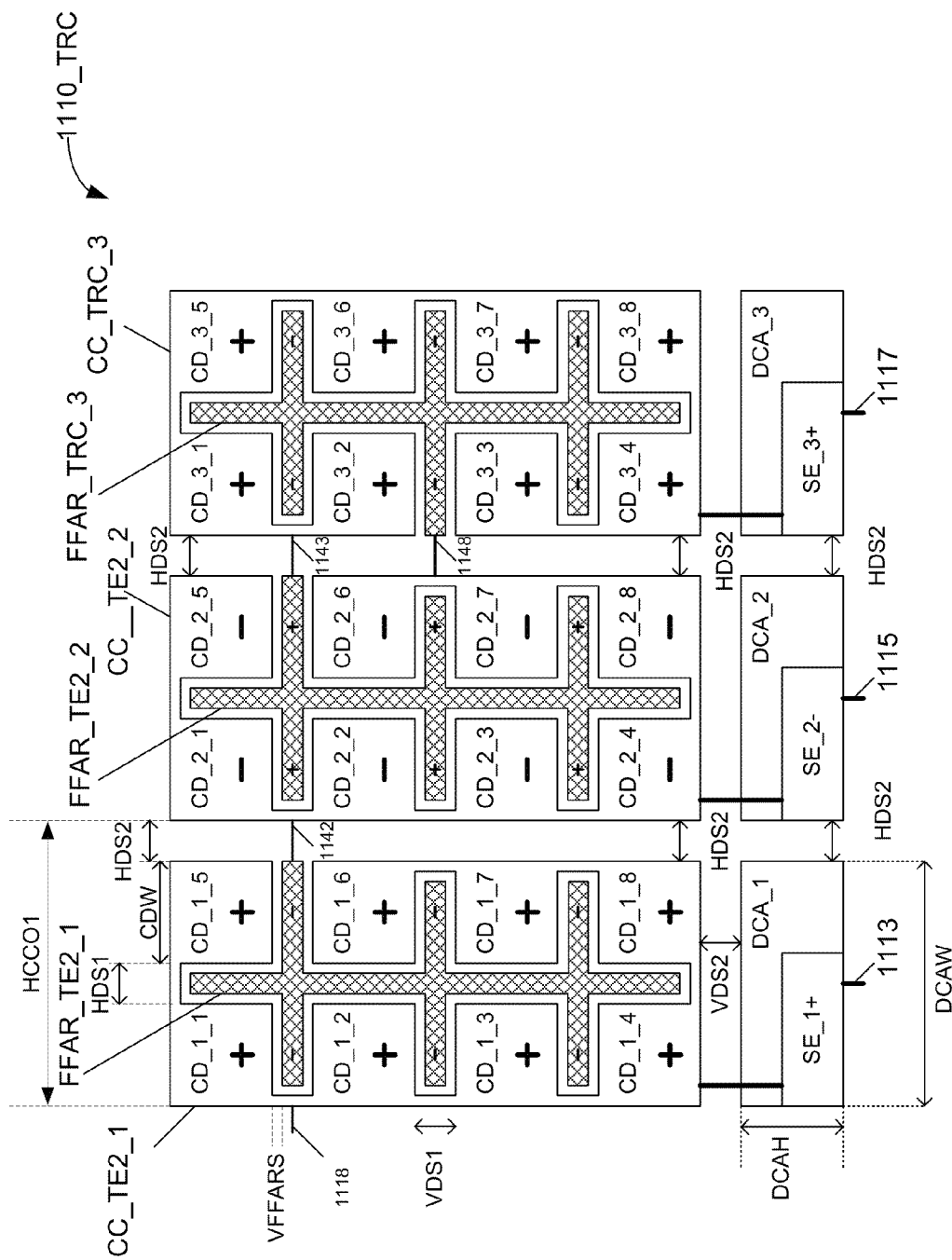
FIG. 11(g) illustrates a pixel design in accordance with one embodiment of the present invention.
Figure 11H:
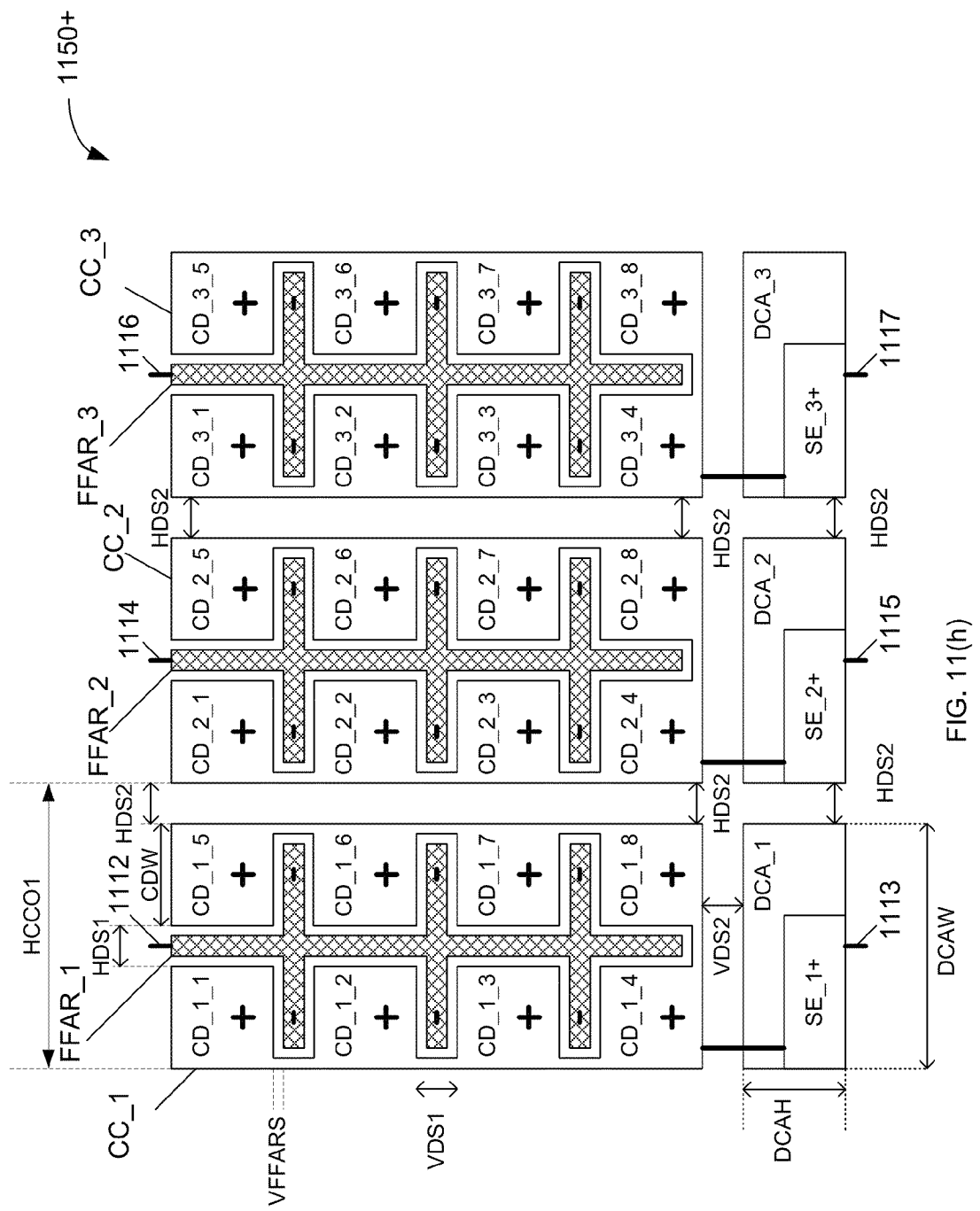
FIGS. 11(h)-11(i) illustrate a pixel design in accordance with one embodiment of the present invention.
Figure 11I:
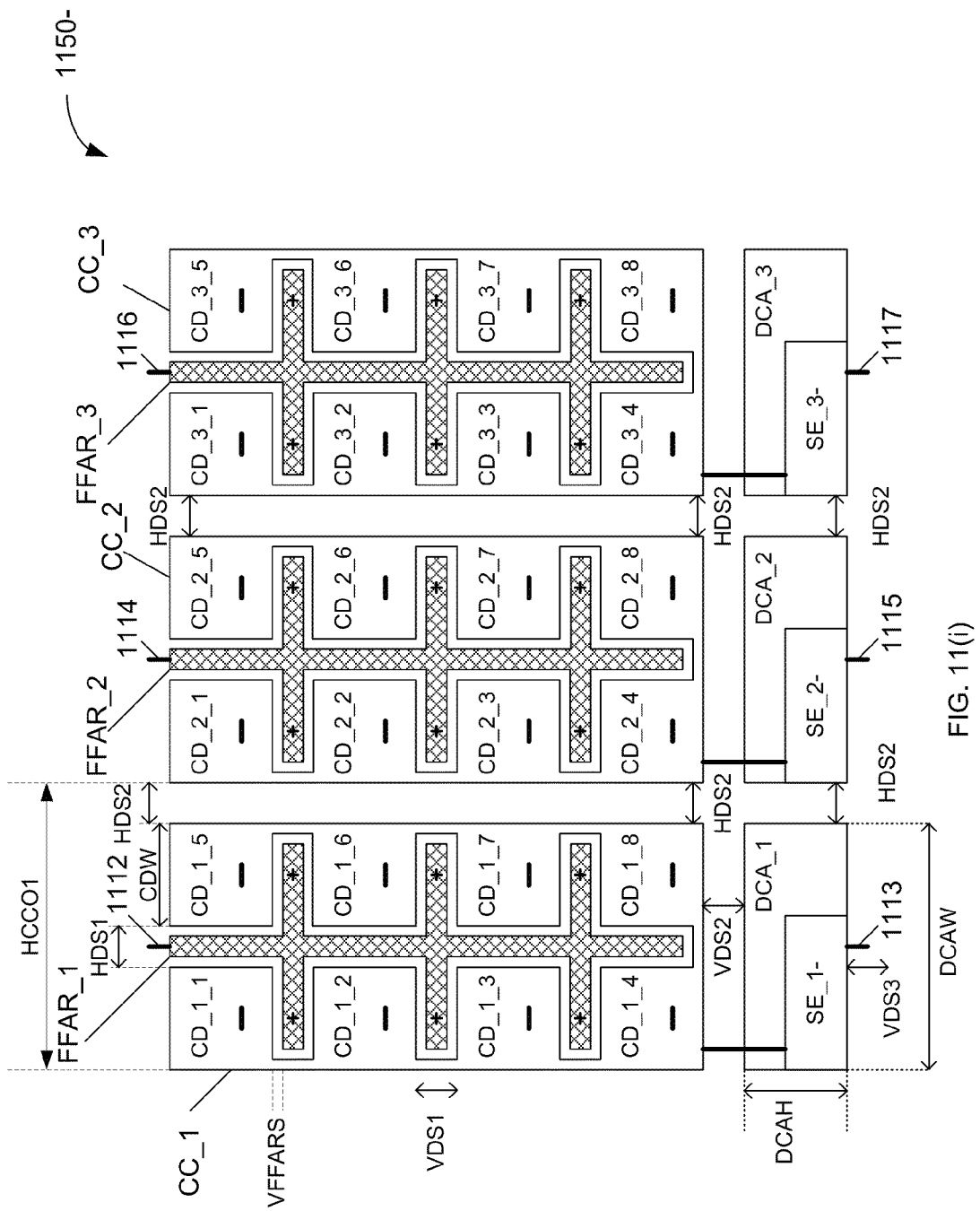
Figure 11J:
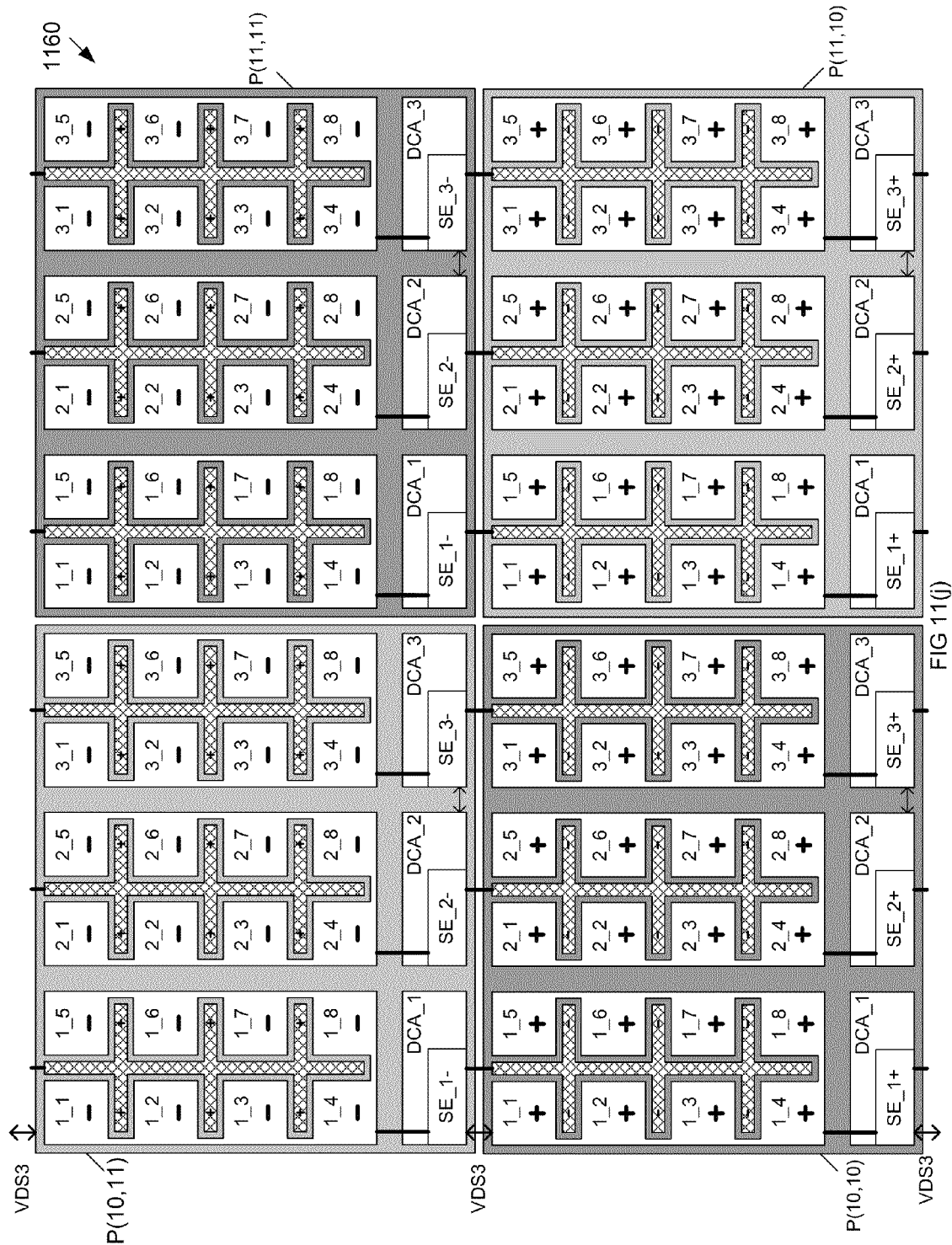
FIG. 11(j) illustrates a portion of a liquid crystal display in accordance with one embodiment of the present invention.

FIG. 11(e) illustrate a top edge pixel design 1110_TE based on pixel design 1110. For brevity the description is not repeated and only the differences between top edge pixel designs 1110_TE and pixel design 1100 are described.

Specifically, top edge pixel design 1110_TE uses a modified color component layout, slightly modified device component areas, as well as a slightly modified fringe field amplifying region as compared to pixel design 1110. All the color components and fringe field amplifying regions of pixel design 1110_TE have the same modifications. For clarity the color components of pixel design 1110_TE are referred to as top edge color components and labeled as CC_TE_1, CC_TE_2, and CC_TE_3. Similarly, the fringe field amplifying regions pixel design 1110_TE are referred to as a top edge fringe field amplifying region and labeled FFAR_TE_1, FFAR_TE_2, and FFAR_TE_3. Specifically, the way the colored dots are coupled along the outer edge of the array of color dots is modified. In particular in top edge color component CC_TE_1, color dot CD_1_1 is coupled to color dot CD_1_5, but color dot CD_1_7 is not coupled to color dot CD_1_8 along the edge of the array of color dots. In addition, color dot CD_1_8 of top edge color component CC_TE_1 is narrowed to make room for connectors 1132. Top edge color components CC_TE_2 and CC_TE 3 of pixel design 1110_TE are similarly modified.

Furthermore, the vertical amplifying portion of top edge fringe field amplifying portion FFAR_TE1_1 in between color dots CD_1_1 and CD_1_5 is shortened due to the coupling between color dots CD_1_1 and CD_1_5. Top edge fringe field amplifying portions FFAR_TE_2 and FFAR_TE_3 are similarly modified. In addition, device component areas DCA_TE_1, DCA_TE_2, and DCA_TE_3 of top edge pixel design 1110_TE are narrowed to make room for connectors 1132, 1134, and 1136, respectively. Connectors 1132, 1134, and 1136, are used to couple top edge fringe field amplifying regions FFAR_TE_1, FFAR_TE_2, and FFAR_TE_3 to color components CC_1, CC_2, and CC_3 of the pixel below the top edge pixel.

FIGS. 11(*f*) and 11(*g*) illustrate another top edge pixel design 1110_TE2 and a top right corner pixel design 1110_TRC based on pixel design 1110. For brevity the description is not repeated and only the differences between the edge pixel designs and pixel design 1100 are described.

Specifically, top edge pixel design 1110_TE2 uses a modified color component layout as well as a slightly modified fringe field amplifying region as compared to pixel design 1110. All the color components and fringe field amplifying regions of pixel design 1110_TE2 have the same modifications. For clarity the color components of pixel design 1110_TE2 are referred to as top edge color components and labeled as CC_TE2_1, CC_TE2_2, and CC_TE2_3. Similarly, the fringe field amplifying regions pixel design 1110_TE2 are referred to as a top edge fringe field amplifying region and labeled FFAR_TE2_1, FFAR_TE2_2, and FFAR_TE2_3. Specifically, the way the colored dots are coupled along the outer edge of the array of color dots is modified. In particular in top edge color component CC_TE2_1, color dot CD_1_5 is coupled to color dot CD_1_1, but color dot CD_1_5 is not coupled to color dot CD_1_6 along the edge of the array of color dots. Top edge color components CC_TE2_2 and CC_TE2_3 of pixel design 1110_TE2 are similarly modified. Furthermore, the horizontal amplifying portion of top edge fringe field amplifying portion FFAR_TE2_1 in between color dots CD_1_5 and CD_1_6 is extended to the right edge of color dots CD_1_5 and CD_1_6. Top edge fringe field amplifying portions FFAR_TE2_2 and FFAR_TE2_3 are similarly modified. A connector 1142 couples top edge fringe field amplifying region FFAR_TE2_1 to top edge color component CC_FE2_2. A connector 1143 couples top edge fringe field amplifying region FFAR_TE2_2 to top edge color component CC_TE2_3. In addition a connector 1144 couples top edge fringe field amplifying region FFAR_TE2_3 to the left most color component of an adjacent pixel.

Top right corner pixel design 1110_TRC (FIG. 11(*g*)) is very similar to top edge pixel design 1110_TE2. For brevity the description is not repeated and only the differences between top right corner pixel design 1110_TRC and top edge pixel design 1110_TE2 are described.

Specifically, top right corner pixel design 1110_TRC uses a modified color component layout for the third color component as well as a slightly modified fringe field amplifying region for the third fringe field amplifying region as compared to pixel design 1110. For clarity the modified color component of pixel design 1110_TRC is referred to as top right corner color components and labeled as CC_TRC_3. Similarly, the third fringe field amplifying region pixel design 1110_TRC is referred to as a top right corner fringe field amplifying region and labeled FFAR_TRC_3. Specifically, the way the colored dots are coupled along the outer edge of the array of color dots is modified. In particular in top right corner color component CC_TRC_3, color dot CD_3_5 is coupled to color dot CD_3_6, but color dot CD_3_2 is not coupled to color dot CD_3_3 along the edge of the array of color dots. Furthermore, the horizontal amplifying portion of top right corner fringe field amplifying portion FFAR_TRC_3 in between color dots CD_3_2 and CD_3_3 is extended to the left edge of color dots CD_3_2 and CD_3_3. A connector 1148 couples top right corner fringe field amplifying region FFAR_TRC_3 to top edge color component CC_FE2_2 (in the same pixel).

In addition, pixel design 1110 can be modified for displays using switching element row inversion driving schemes. FIGS. 11(*h*) and 11(*i*) show different dot polarity patterns of a pixel design 1150 (labeled 1150+ and 1150−) that can be used in displays having a switching element row inversion driving scheme. Pixel Design 1150 has the same layout as pixel design 1150, thus for brevity the description is not repeated. However, pixel design 1150 differs from pixel design 1110 in the polarity of the elements in pixel design 1150.

The polarities of the color dots, fringe field amplifying regions, and switching elements are shown using "+" and "−" signs. Thus, in FIG. 11(*h*), which shows the positive dot polarity pattern of pixel design 1150+, all the switching elements of color dots have positive polarity and all the fringe field amplifying regions have negative polarity. Specifically, switching elements SE_1, SE_2, SE_3; and color dots CD_1_1, CD_1_2, CD_1_3, CD_1_4, CD_1_5, CD_1_6, CD_1_7, CD_1_8, color dots CD_2_1, CD_2_2, CD_2_3, CD_2_4, CD_2_5, CD_2_6, CD_2_7, CD_2_8, CD_3_1, CD_3_2, CD_3_3, CD_3_4, CD_3_5, CD_3_6, CD_3_7, and CD_3_8 have positive polarity. However, fringe field amplifying regions FFAR_1, FFAR_2, and FFAR_3 have negative polarity.

FIG. 11(*i*) shows pixel design 1150 with the negative dot polarity pattern. For the negative dot polarity pattern, all the switching elements of color dots have negative polarity and all the fringe field amplifying regions have positive polarity. Specifically, switching elements SE_1, SE_2, SE_3; and color dots CD_1_1, CD_1_2, CD_1_3, CD_1_4, CD_1_5, CD_1_6, CD_1_7, CD_1_8, color dots CD_2_1, CD_2_2, CD_2_3, CD_2_4, CD_2_5, CD_2_6, CD_2_7, CD_2_8, CD_3_1, CD_3_2, CD_3_3, CD_3_4, CD_3_5, CD_3_6, CD_3_7, and CD_3_8 have negative polarity. However, fringe field amplifying regions FFAR_1, FFAR_2, and FFAR_3 have positive polarity.

As explained above fringe fields in each of the color dots are amplified if adjacent components have opposite polarities. Pixel design 1150 makes use of the fringe field amplifying regions to further enhance the formation of multiple domain liquid crystal structure. In general, the polarities of the polarized components are assigned so that a color dot of a first polarity has neighboring polarized components of the second polarity. More specifically for pixel design 1110, each color dot is surrounded on two or three sides by portions of a fringe field amplifying region of an opposite polarity. Although, the color dots also are adjacent to another color dot of the same polarity, the distance between the color dots is greater than the distance between the color dot and the fringe field amplifying region. Thus, the fringe field amplifying region can still amplify the fringe field of the color dots. For example for the positive dot polarity pattern of pixel design 1110 (FIG. 11(*a*)), color dot CD_1_6 has positive polarity and is adjacent to portions of fringe field amplifying regions FFAR_1 (which has a negative polarity) at the top, the left side, and bottom of color dot CD_1_6. Although, color dot CD_2_2, which has also has the positive polarity, is on the right side of color dot CD_1_6, fringe field amplifying region FFAR_1 still amplifies the fringe field of color dot CD_1_6 because fringe fiend amplifying region FFAR_1 is closer to color dot CD_1_6 and is on multiple sides of color dot CD_1_6.

Pixels using pixel design 1150 of FIGS. 11(*h*) and 11(*i*) can be used in displays using switching element row inversion driving schemes. FIG. 11(*j*) shows a portion of display 1160 using pixels P(10, 10), P(11, 10), P(10, 11), and P(11, 11) of pixel design 1130 with a switching element row inversion driving scheme. Display 1160 could have thousands of rows with thousand of pixels on each row. The rows and columns would continue from the portion shown in FIG. 11(*j*) in the manner shown in FIG. 11(*j*). For clarity, the gate lines and source lines that control the switching elements are omitted in FIG. 11(*j*). To better illustrate each pixel, the area of each pixel is shaded; this shading is only for illustrative purposes in FIG. 11(*j*) and has no functional significance. Furthermore, due to space limitations, color dots are labeled with "X_Y" rather than "CD_X_Y" in FIG. 11(*j*).

In display 1160 the pixels are arranged so that pixels in a row have the same dot polarity patterns (positive or negative) and pixels in a column alternate between positive and negative dot polarity pattern. Thus, pixels P(10, 10) and P(11, 10) have positive dot polarity pattern and pixels P(10, 11) and P(11, 11) have the negative dot polarity pattern. However, at the next frame the pixels will switch dot polarity patterns. Thus in general a pixel P(x, y) has a first dot polarity pattern when y is even and a second dot polarity pattern when y is odd. Pixels on each row of pixels are vertically aligned and separated horizontally so that the right most color dots of a pixel are separated from the leftmost color dot of an adjacent pixel by horizontal dot spacing HDS1. Pixels on a column of pixels are horizontally aligned and separated by a vertical dot spacing VDS3.

As stated above, the fringe field amplifying regions of a first pixel receive polarity from the switching elements of a second pixel. For example, the electrode of fringe field amplifying region FFAR_1 of pixel P(10, 10) is coupled to switching elements SE_1 of pixel P(10, 11) via conductor 1112 of pixel P(10, 10) and conductor 1113 of pixel P(10, 11). Similarly, the electrode of fringe field amplifying region FFAR_2 of pixel P(10, 10) is coupled to switching elements SE_2 of pixel P(10, 11) via conductor 1114 of pixel P(10, 10) and conductor 1115 of pixel P(10, 11). In addition, the electrode of fringe field amplifying region FFAR_3 of pixel P(10, 10) is coupled to switching elements SE_3 of pixel P(10, 11) via conductor 1117 of pixel P(10, 10) and conductor 1117 of pixel P(10, 11).

Even though, AIFF MVA LCDs in accordance with the present invention provide wide viewing angle at a low cost, some embodiments of the present invention use optical compensation methods to further increase the viewing angle. For example, some embodiments of the present invention use negative birefringence optical compensation films with vertical oriented optical axis on the top or bottom substrate or both top and bottom substrates to increase viewing angle. Other embodiments may use uniaxial optical compensation films or biaxial optical compensation films with a negative birefringence. In some embodiments, positive compensation films with a parallel optical axis orientation can add to the negative birefringence film with a vertical optical axis orientation. Furthermore, multiple films that include all combinations could be used. Other embodiments may use a circular polarizer to improve the optical transmission and viewing angle. Other embodiments may use a circular polarizer with the optical compensation films to further improve the optical transmission and viewing angle. Furthermore, some embodiments of the present invention use black matrix (BM) to cover fringe field amplifying regions (FFARs) to make the fringe field amplifying regions opaque. Use of the black matrix improves the contrast ratio of the display and may provide better color performance. In other embodiments, some or all of the black matrix may be removed (or omitted) to make the fringe field amplifying regions transparent, which would improve light transmittance in the display. Improved light transmittance can lower the power requirements of the display.

In the various embodiments of the present invention, novel structures and methods have been described for creating a multi-domain vertical alignment liquid crystal display without the use of physical features on the substrate. The various embodiments of the structures and methods of this invention that are described above are illustrative only of the principles of this invention and are not intended to limit the scope of the invention to the particular embodiment described. For example, in view of this disclosure those skilled in the art can define other pixel definitions, dot polarity patterns, pixel designs, color components, fringe field amplifying regions, vertical amplifying portions, horizontal amplifying portions, polarities, fringe fields, electrodes, substrates, films, and so forth, and use these alternative features to create a method or system according to the principles of this invention. Thus, the invention is limited only by the following claims.

What is claimed is:

1. A display comprising:
  a first pixel having
    a first first-pixel color component having a first first-pixel-first-component color dot;
    a first first-pixel fringe field amplifying region, wherein the first first-pixel fringe field amplifying region extends along a first side of the first first-pixel-first-component color dot and a second side of the first first-pixel-first-component color dot; and
    a first first-pixel switching element coupled to the first first-pixel color component; and
  a second pixel having
    a first second-pixel color component;
    a first second-pixel fringe field amplifying region; and
    a first second-pixel switching element; and
  a first fringe field amplifying region switching element coupled to the first first-pixel fringe field amplifying region and the first second-pixel fringe field amplifying region.

2. The display of claim 1, wherein the first first-pixel switching element and the first-second pixel switching element are configured to have a first polarity and the first fringe field amplifying region switching element is configured to have a second polarity.

3. The display of claim 1, wherein the first pixel further comprises:
   a second first-pixel color component aligned with the first first-pixel color component in a first dimension;
   a second first-pixel fringe field amplifying region aligned with the first first-pixel fringe field amplifying region in the first dimension; and
   a second first-pixel switching element coupled to the second first-pixel color component.

4. The display of claim 3 wherein the second pixel further comprises:
   a second second-pixel color component aligned with the first second-pixel color component in a first dimension;
   a second second-pixel fringe field amplifying region aligned with the first second-pixel fringe field amplifying region in the first dimension; and
   a second second-pixel switching element coupled to the second-pixel color component.

5. The display of claim 4, wherein the second first-pixel fringe field amplifying region and the second second-pixel fringe field amplifying region are coupled to the first fringe field amplifying region switching element.

6. The display of claim 1 further comprising:
   a third pixel having
      a first third-pixel color component;
      a first third-pixel fringe field amplifying region; and
      a first third-pixel switching element coupled to the first third-pixel color component; and
   a fourth pixel having
      a first fourth-pixel color component;
      a first fourth-pixel fringe field amplifying region; and
      a first fourth-pixel switching element;
   wherein the third pixel and the fourth pixel are on a second row of the display.

7. The display of claim 6, further comprising a second fringe field amplifying region switching element coupled to the first third-pixel fringe field amplifying region and the first fourth-pixel fringe field amplifying region.

8. The display of claim 7, wherein the first first-pixel switching element, the first second-pixel switching element; and second fringe field amplifying region switching element are configured to have a first polarity and the first fringe field amplifying region switching element, the first third-pixel switching element, and the first fourth-pixel switching element are configured to have a second polarity.

9. The display of claim 1, wherein the first pixel is on a first row of the display and the second pixel is on a second row of the display.

10. The display of claim 9, wherein the first second-pixel fringe field amplifying region is coupled to the first first-pixel color component.

11. The display of claim 9, wherein the first second-pixel fringe field amplifying region is coupled to the first first-pixel switching element.

12. The display of claim 11, wherein the first first-pixel switching element is configured to have a first polarity and the first second-pixel switching element is configured to have second polarity.

13. The display of claim 1, wherein the first first-pixel fringe field amplifying region comprises:
   a first first-pixel-first-fringe-field-amplifying-region vertical amplifying portion extending vertically along the first side of the first first-pixel-first-component color dot; and
   a first first-pixel-first-fringe-field-amplifying-region horizontal amplifying portion extending horizontally along the second side of the first first-pixel-first-component color dot.

14. The display of claim 13, wherein the first first-pixel color component further comprises a second first-pixel-first-component color dot aligned with the first first-pixel-first-component color dot in a first dimension.

15. The display of claim 14, wherein the first first-pixel-first-fringe-field-amplifying-region horizontal amplifying portion extends between the first first-pixel-first-component color dot and the second first-pixel-first-component color dot.

16. A display comprising:
   a first pixel having
      a first first-pixel color component having a first first-pixel-first-component color dot;
      a first first-pixel fringe field amplifying region, wherein the first first-pixel fringe field amplifying region extends along a first side of the first first-pixel-first-component color dot and a second side of the first first-pixel-first-component color dot;
      a first first-pixel switching element coupled to the first first-pixel color component;
      a second first-pixel color component aligned with the first first-pixel color component in a first dimension;
      a second first-pixel fringe field amplifying region aligned with the first first-pixel fringe field amplifying region in the first dimension; and
      a second first-pixel switching element coupled to the second first-pixel color component; and
   a second pixel having
      a first second-pixel color component;
      a first second-pixel fringe field amplifying region; and
      a first second-pixel switching element;
      a second second-pixel color component aligned with the first second-pixel color component in a first dimension;
      a second second-pixel fringe field amplifying region aligned with the first second-pixel fringe field amplifying region in the first dimension and coupled to the first first-pixel color component; and
      a second second-pixel switching element coupled to the second-pixel color component; and
   wherein the first pixel is on a first row of the display and the second pixel is on a second row of the display.

17. The display of claim 16, wherein the second second-pixel fringe field amplifying region is coupled to the second first-pixel switching element.

18. The display of claim 17, wherein the first first-pixel switching element and the second first-pixel switching element is configured to have a first polarity and the first second-pixel switching element and the second second-pixel switching element are configured to have second polarity.

19. The display of claim 17, wherein the first first-pixel switching element and the second second-pixel switching element is configured to have a first polarity and the first second-pixel switching element and the second first-pixel switching element are configured to have second polarity.

20. The display of claim 16, further comprising a third pixel on a third row of the display;
   wherein the third pixel further comprises:
   a first third-pixel color component;
   a second third-pixel color component;
   a first third-pixel fringe field amplifying region;
   a second third-pixel fringe field amplifying region;
   a first third-pixel switching element coupled to the first third-pixel color component; and a second third-pixel switching element coupled to the second third-pixel color component.

21. The display of claim 20, wherein the second second-pixel fringe field amplifying region is coupled the second third-pixel switching element.

22. The display of claim 21, wherein the first third-pixel fringe field amplifying region is coupled to the first second-pixel switching element.

23. The display of claim 22, wherein the first first-pixel switching element, the second second-pixel switching element, and the first third-pixel switching element are configured to have a first polarity; and the second first-pixel switching element, the first second-pixel switching element, and the second third-pixel switching element are configured to have a second polarity.

24. The display of claim 22, wherein the first first-pixel switching element and the second second-pixel switching element are aligned in the first dimension.

25. The display of claim 24, wherein the first second-pixel switching element and the second third-pixel switching element are aligned in the first dimension.

26. A display comprising:
a first pixel having
a first first-pixel color component having a first first-pixel-first-component color dot and a second first-pixel-first-component color dot aligned with the first first-pixel-first component color dot in a first dimension;
a first first-pixel fringe field amplifying region, wherein the first first-pixel fringe field amplifying region comprises:
a first first-pixel-first-fringe-field-amplifying-region vertical amplifying portion extending vertically along the first side of the first first-pixel-first-component color dot; and
a first first-pixel-first-fringe-field-amplifying-region horizontal amplifying portion extending horizontally along the second side of the first first-pixel-first-component color dot and between the first first-pixel-first-component color dot and the second first-pixel-first-component color dot; and
a first first-pixel switching element coupled to the first first-pixel color component; and
a second pixel having
a first second-pixel color component;
a first second-pixel fringe field amplifying region; and
a first second-pixel switching element; and
wherein the first first-pixel switching element is located within first-pixel-first-fringe-field-amplifying-region horizontal amplifying portion.

27. The display of claim 26, wherein the first first-pixel fringe field amplifying region further comprises a second first-pixel-first-fringe-field-amplifying-region horizontal amplifying portion extending horizontally along a third side of the second first-pixel-first-component color dot.

28. The display of claim 27, wherein the first first-pixel fringe field amplifying region further comprises a third first-pixel-first-fringe-field-amplifying-region horizontal amplifying portion extending horizontally along a third side of the first first-pixel-first-component color dot.

29. The display of claim 28, wherein the first the first first-pixel fringe field amplifying region further comprises a second first-pixel-first-fringe-field-amplifying-region vertical amplifying portion extending vertically along a fourth side of the first first-pixel-first-component color dot and a fourth side of the second first-pixel-first-component color dot.

30. The display of claim 27, wherein the first first-pixel color component further comprises a third first-pixel-first-component color dot aligned with the first first-pixel-first component color dot in the first dimension.

31. The display of claim 30, wherein the second first-pixel-first-fringe-field-amplifying-region horizontal amplifying portion extends along a first side of the third first-pixel-first-component color dot and wherein the first first-pixel-first-fringe-field-amplifying-region vertical amplifying portion extends along a second side of the third first-pixel-first-component color dot.

32. A display comprising:
a first pixel having
a first first-pixel color component having
a first first-pixel-first-component color dot;
a second first-pixel-first-component color dot aligned with the first first-pixel-first component color dot in a first dimension;
a third first-pixel-first-component color dot aligned with the first first-pixel-first component color dot in a second dimension;
a fourth first-pixel-first-component color dot aligned with the second first-pixel-first component color dot in a second dimension and aligned with the third first-pixel-first-component color dot in the first dimension; and
a first first-pixel fringe field amplifying region, wherein the first first-pixel fringe field amplifying region comprises:
a first first-pixel-first-fringe-field-amplifying-region vertical amplifying portion extending vertically along the first side of the first first-pixel-first-component color dot; and
a first first-pixel-first-fringe-field-amplifying-region horizontal amplifying portion extending horizontally along the second side of the first first-pixel-first-component color dot and between the first first-pixel-first-component color dot and the second first-pixel-first-component color dot; and
a first first-pixel switching element coupled to the first first-pixel color component; and
a second pixel having
a first second-pixel color component;
a first second-pixel fringe field amplifying region; and
a first second-pixel switching element.

33. The display of claim 32, wherein the first first-pixel-first-fringe-field-amplifying-region vertical amplifying portion extends between the second first-pixel-first-component color dot and the fourth first-pixel-first-component color dot.

34. The display of claim 33, wherein the first first-pixel fringe field amplifying region further comprises a second first-pixel-first-fringe-field-amplifying-region horizontal amplifying portion extending between the third first-pixel-first-component color dot and the fourth first-pixel-first-component color dot.

35. The display of claim 34,
wherein the first first-pixel color component further comprises:
a fifth first-pixel-first-component color dot aligned with the second first-pixel-first component color dot in the first dimension;
a sixth first-pixel-first-component color dot aligned with the fourth first-pixel-first component color dot in the first dimension and aligned with the fifth first-pixel-first-component color dot in the first dimension;
wherein the first first-pixel fringe field amplifying region further comprises a third first-pixel-first-fringe-field-amplifying-region horizontal amplifying portion extending between the second first-pixel-first-component color dot and the fifth first-pixel-first-component color dot; and a fourth first-pixel-first-fringe-field-amplifying-region horizontal amplifying portion extending between the fourth first-pixel-first-component color dot and the sixth first-pixel-first-component color dot; and wherein the first first-pixel-first-fringe-field-amplifying-region vertical amplifying portion extends between the fifth first-pixel-first-component color dot and the sixth first-pixel-first-component color dot.

36. The display of claim 35, wherein the first first-pixel color component further comprises:

a seventh first-pixel-first-component color dot aligned with the second first-pixel-first component color dot in the first dimension;

a eighth first-pixel-first-component color dot aligned with the sixth first-pixel-first component color dot in the first dimension and aligned with the fifth first-pixel-first-component color dot in the first dimension;

wherein the first first-pixel fringe field amplifying region further comprises a fifth first-pixel-first-fringe-field-amplifying-region horizontal amplifying portion extending between the fifth first-pixel-first-component color dot and the seventh first-pixel-first-component color dot; and a sixth first-pixel-first-fringe-field-amplifying-region horizontal amplifying portion extending between the sixth first-pixel-first-component color dot and the eighth first-pixel-first-component color dot; and wherein the first first-pixel-first-fringe-field-amplifying-region vertical amplifying portion extends between the seventh first-pixel-first-component color dot and the eighth first-pixel-first-component color dot.

* * * * *